(12) United States Patent
Ikeda et al.

(10) Patent No.: US 8,089,507 B2
(45) Date of Patent: Jan. 3, 2012

(54) RECORDING MEDIUM, PLAYBACK DEVICE, SYSTEM LSI, PLAYBACK METHOD, GLASSES, AND DISPLAY DEVICE FOR 3D IMAGES

(75) Inventors: Wataru Ikeda, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 212 days.

(21) Appl. No.: 12/566,989

(22) Filed: Sep. 25, 2009

(65) Prior Publication Data

US 2010/0208042 A1    Aug. 19, 2010

Related U.S. Application Data

(60) Provisional application No. 61/101,316, filed on Sep. 30, 2008.

(51) Int. Cl.
*H04N 13/00* (2006.01)
*H04N 13/04* (2006.01)
*H04N 5/919* (2006.01)
*H04N 5/935* (2006.01)
*H04N 13/02* (2006.01)
*H04N 5/84* (2006.01)
*H04N 5/85* (2006.01)

(52) U.S. Cl. ............ 348/43; 348/42; 386/330; 386/334
(58) Field of Classification Search ............... 348/42.43; 386/330, 334
See application file for complete search history.

(56) References Cited

U.S. PATENT DOCUMENTS

| | | | |
|---|---|---|---|
| 5,661,518 A * | 8/1997 | Palm et al. ...................... 348/42 |
| 5,923,869 A | 7/1999 | Kashiwagi et al. |
| 6,393,574 B1 | 5/2002 | Kashiwagi et al. |
| 6,441,844 B1 * | 8/2002 | Tatsuzawa ...................... 348/42 |
| 6,470,460 B1 | 10/2002 | Kashiwagi et al. |
| 6,573,819 B1 * | 6/2003 | Oshima et al. ................ 386/329 |
| 6,574,423 B1 | 6/2003 | Oshima et al. |
| 6,795,863 B1 * | 9/2004 | Doty, Jr. ........................ 709/231 |

(Continued)

FOREIGN PATENT DOCUMENTS

CA     2602713 A1 * 10/2006

(Continued)

OTHER PUBLICATIONS

R. Lawler, "Blu-ray Disc Association (still) working on a 3D standard, promises 1080p & backwards compatible discs", Engadget HD (online), Sep. 2, 2009.*

(Continued)

*Primary Examiner* — David Czekaj
*Assistant Examiner* — David N Werner
(74) *Attorney, Agent, or Firm* — Wenderoth, Lind & Ponack, L.L.P.

(57) ABSTRACT

A recording medium in which a left-view video stream and a right-view video stream are recorded in an interleaved transport stream file. The interleaved transport stream file is identified by a combination of (i) an equivalent identification number being equivalent with the file reference information and (ii) a file extension indicating that video streams are stored in the interleaved manner, the equivalent identification number. Among Extents that constitute the interleaved transport stream file, Extents constituting the left-view or right-view video stream are identified as a normal-format transport stream file by a combination of (i) the equivalent identification number being equivalent with the file reference information and (ii) a file extension indicating that video streams are stored in a normal manner.

9 Claims, 50 Drawing Sheets

U.S. PATENT DOCUMENTS

| | | | |
|---|---|---|---|
| 6,859,840 B2 * | 2/2005 | Singal et al. | 709/232 |
| 6,925,250 B1 | 8/2005 | Oshima et al. | |
| 2001/0053281 A1 | 12/2001 | Kashiwagi et al. | |
| 2001/0055474 A1 | 12/2001 | Kashiwagi et al. | |
| 2002/0001454 A1 | 1/2002 | Kashiwagi et al. | |
| 2002/0001455 A1 | 1/2002 | Kashiwagi et al. | |
| 2002/0003944 A1 | 1/2002 | Kashiwagi et al. | |
| 2002/0003945 A1 | 1/2002 | Kashiwagi et al. | |
| 2002/0003950 A1 | 1/2002 | Kashiwagi et al. | |
| 2002/0003951 A1 | 1/2002 | Kashiwagi et al. | |
| 2002/0025143 A1 | 2/2002 | Kashiwagi et al. | |
| 2003/0053797 A1 | 3/2003 | Oshima et al. | |
| 2003/0108341 A1 | 6/2003 | Oshima et al. | |
| 2003/0138238 A1 | 7/2003 | Kashiwagi et al. | |
| 2004/0175133 A1 | 9/2004 | Kashiwagi et al. | |
| 2004/0179820 A1 | 9/2004 | Kashiwagi et al. | |
| 2005/0180735 A1 | 8/2005 | Oshima et al. | |
| 2008/0056686 A1 | 3/2008 | Oshima et al. | |
| 2008/0063385 A1 | 3/2008 | Oshima et al. | |
| 2008/0063386 A1 | 3/2008 | Oshima et al. | |
| 2008/0101767 A1 | 5/2008 | Oshima et al. | |
| 2008/0292287 A1 | 11/2008 | Oshima et al. | |
| 2009/0066783 A1 * | 3/2009 | Lee et al. | 348/43 |
| 2009/0160932 A1 * | 6/2009 | Kim et al. | 348/42 |
| 2009/0220215 A1 | 9/2009 | Oshima et al. | |
| 2009/0252483 A1 | 10/2009 | Oshima et al. | |
| 2010/0098389 A1 | 4/2010 | Shimada | |
| 2010/0182403 A1 * | 7/2010 | Chun et al. | 348/43 |
| 2011/0032388 A1 * | 2/2011 | Manico et al. | 348/231.99 |

FOREIGN PATENT DOCUMENTS

| | | |
|---|---|---|
| JP | 2004-240469 | 8/2004 |
| JP | 2005-227424 | 8/2005 |
| JP | 3935507 | 3/2007 |
| JP | 2007-166651 | 6/2007 |
| WO | 97/32437 | 9/1997 |
| WO | WO 2007067020 A1 * | 6/2007 |
| WO | 2008/114595 | 9/2008 |

OTHER PUBLICATIONS

ITU-T H. 264 (Nov. 2007), pp. 339-340, <http://www.itu.int/rec/T-REC-H.264-200711-S/en/>.

Written Opinion issued Oct. 12, 2010 in International (PCT) Application No. PCT/JP2009/004554, together with English translation thereof.

Series H: Audiovisual and Timedia Systems, Infrastructure of audiovisual services—Coding of moving video, Advanced video coding for generic audiovisual services, ITU-T H.264, pp. 339-340, Nov. 2007.

* cited by examiner

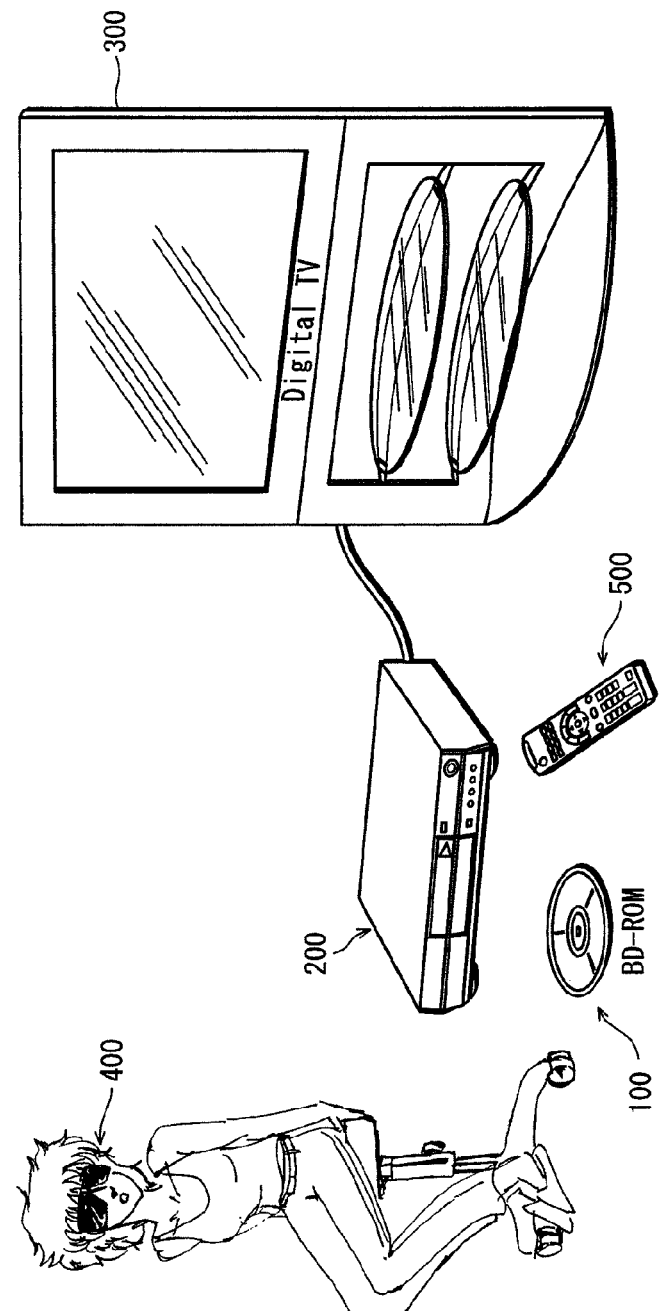
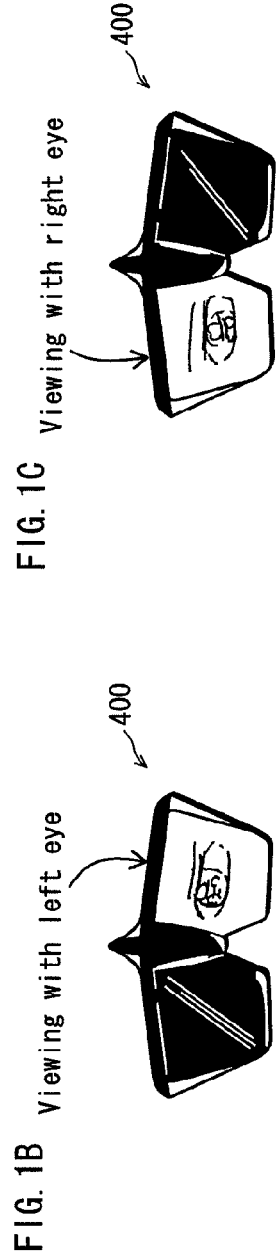
FIG. 1A
FIG. 1B Viewing with left eye
FIG. 1C Viewing with right eye

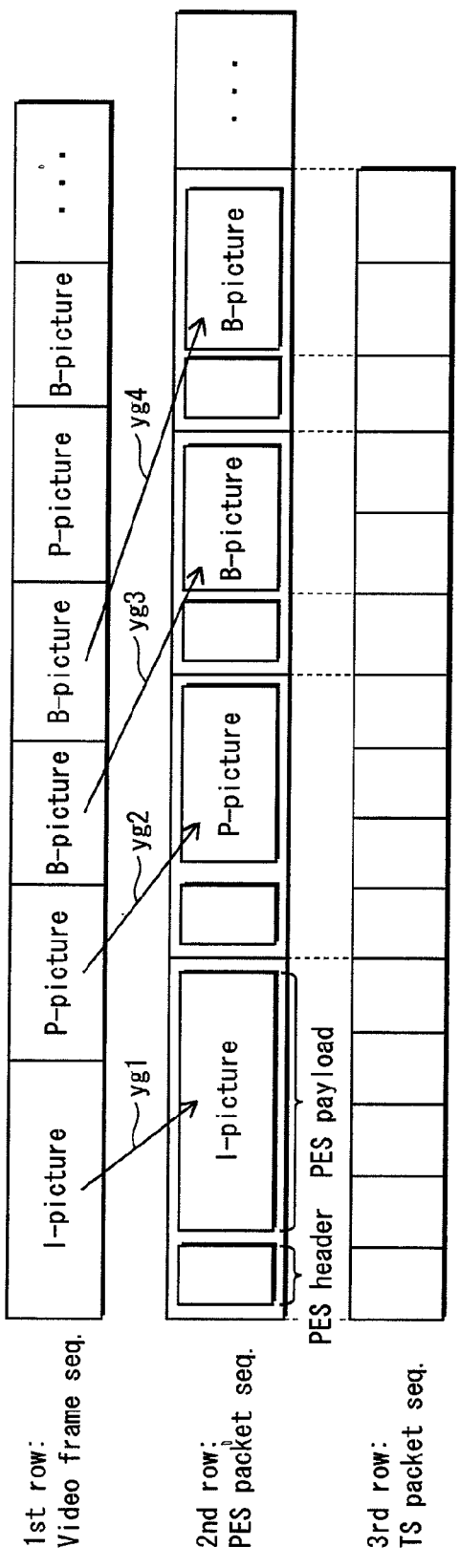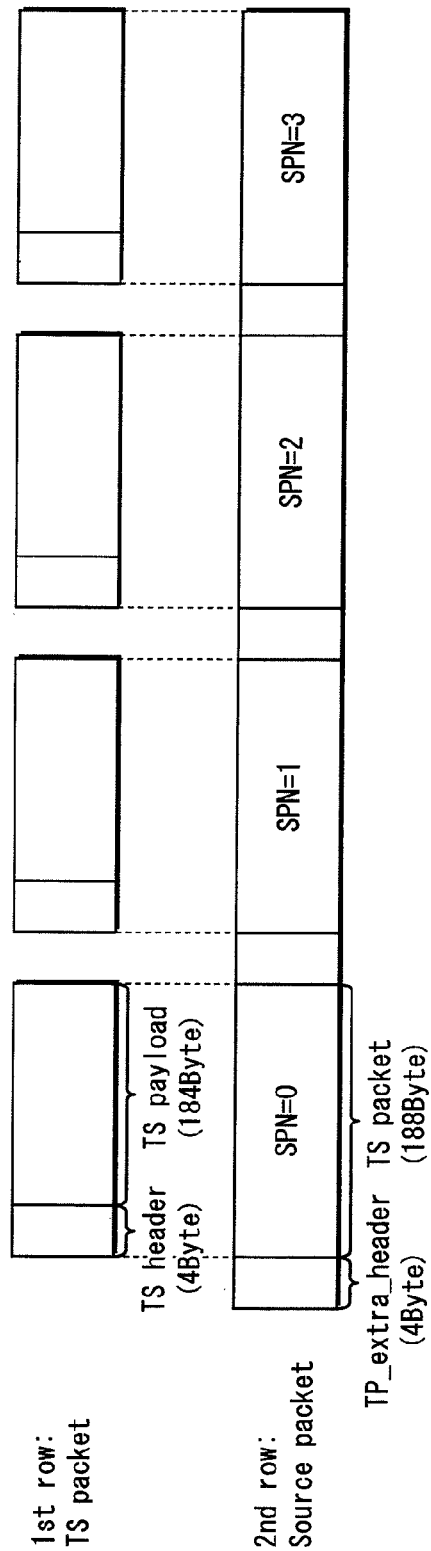

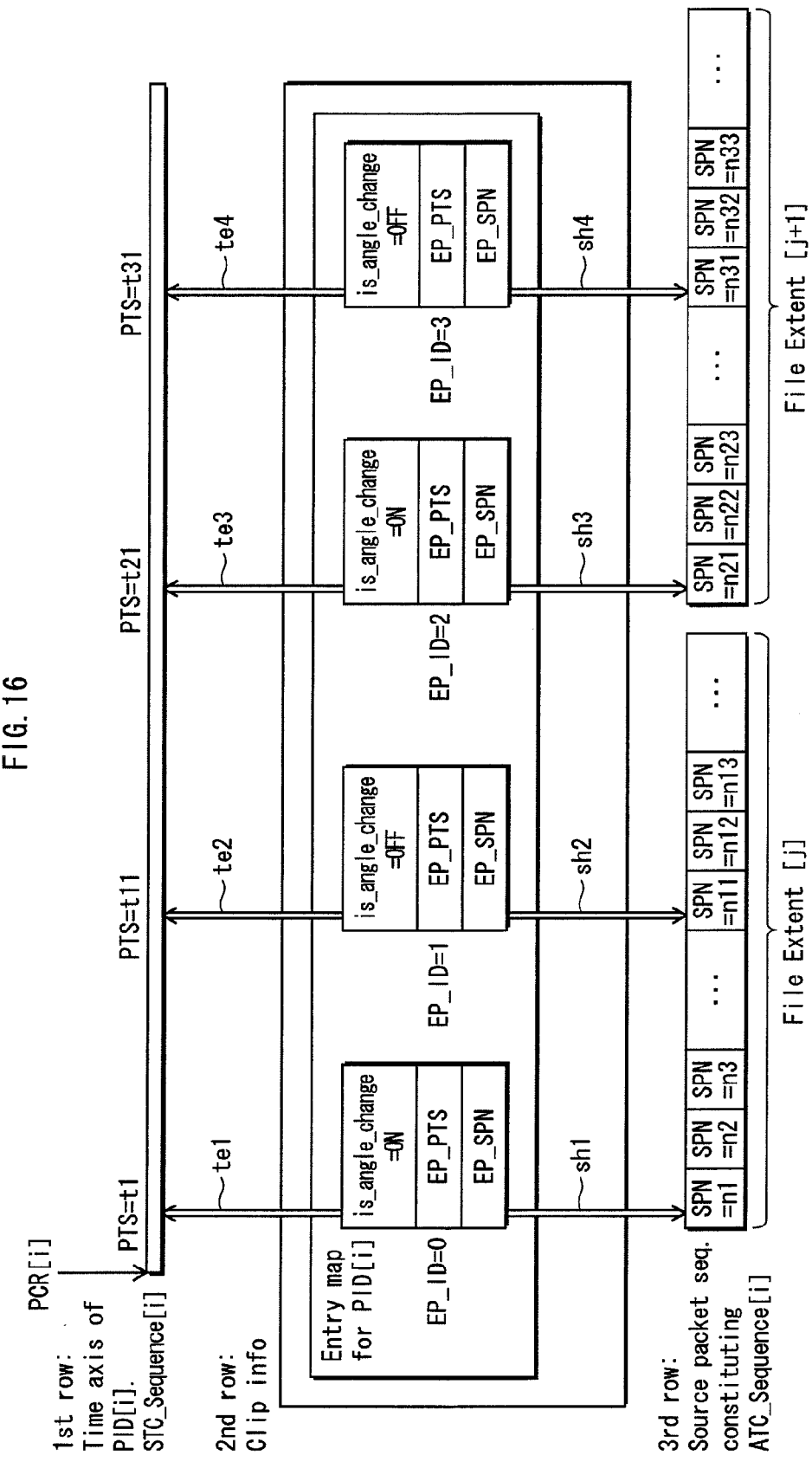

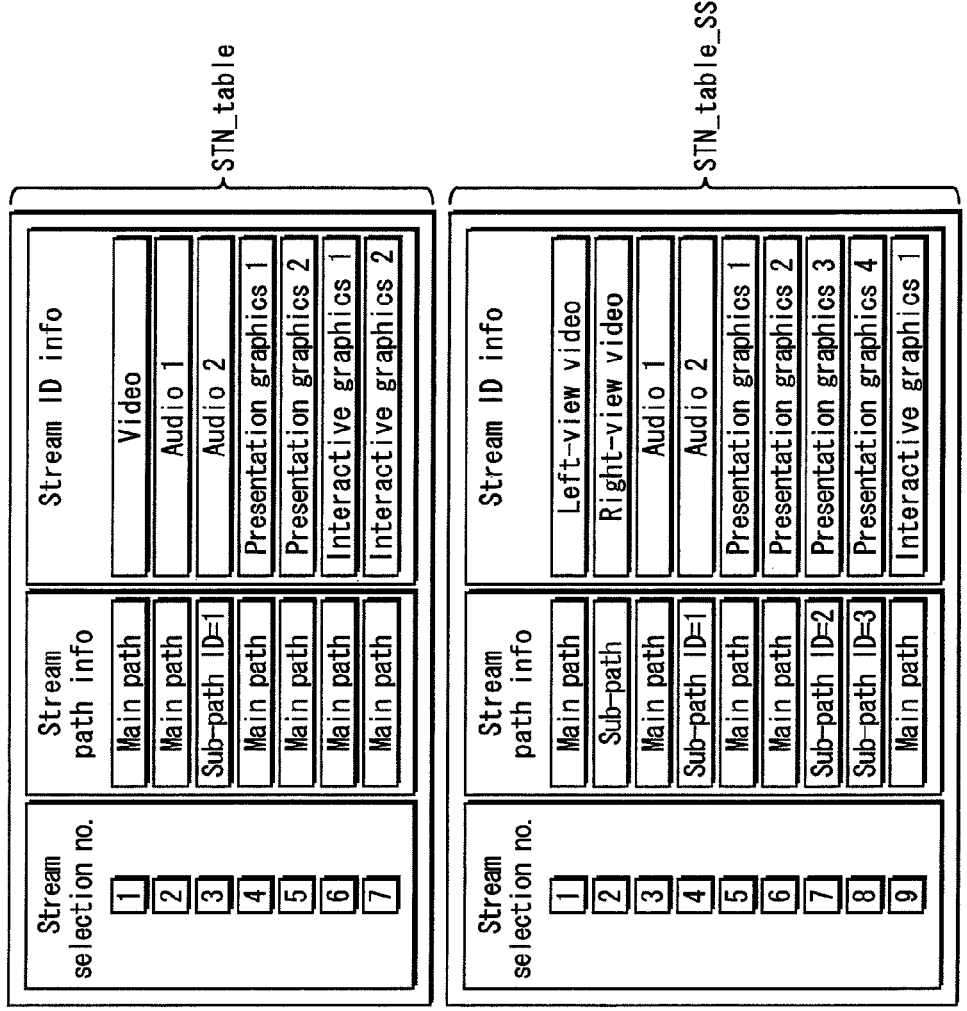
FIG. 22C
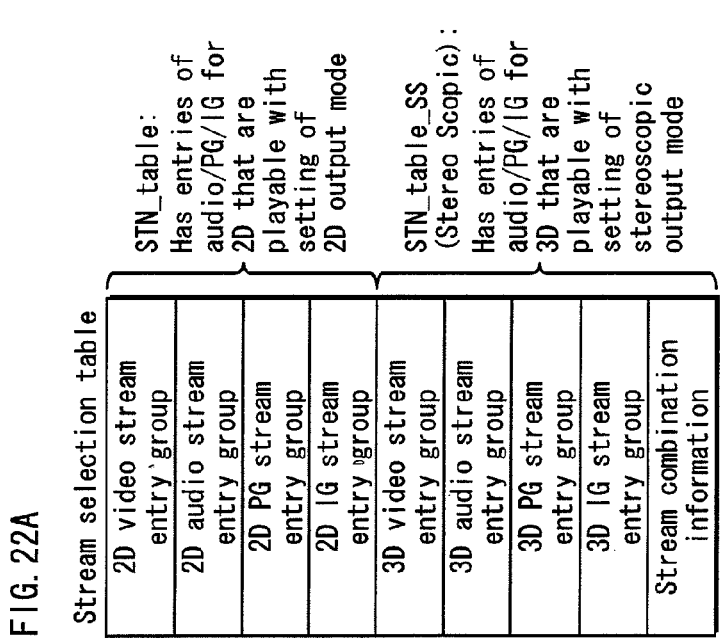
FIG. 22A
FIG. 22B

FIG. 43

| Difference in number of pixels between L and R images | Distance on 50-inch display | Distance on 150-inch display |
|---|---|---|
| 50 pixels in horizontal direction | 2.0cm | 6.0cm (Optimum) |
| 100 pixels in horizontal direction | 4.0cm | 12.0cm |
| 150 pixels in horizontal direction | 6.0cm (Optimum) | 18.0cm |

Distance on display is adjusted by UO or command for 3D stream depth change

FIG. 46
Player variable (system parameter)
... | PSR | 3D-Capability
| Bit position | Value | Indication by flag |
|---|---|---|
| b3 | 1 | Supporting 2-screen stereo playback system |
| b2 | 1 | Supporting side-by-side system |
| b1 | 0 | Supporting horizontally double system |
| b0 | 0 | Supporting 2D + depth info system |
Accessible also as property of player
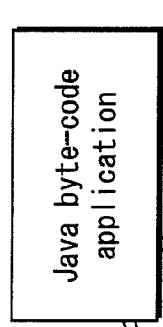
Java byte-code application
BD-ROM

RECORDING MEDIUM, PLAYBACK DEVICE, SYSTEM LSI, PLAYBACK METHOD, GLASSES, AND DISPLAY DEVICE FOR 3D IMAGES This application claims benefit of U.S. provisional application 61/101,316, filed Sep. 30, 2008.

BACKGROUND OF THE INVENTION (1) Field of the Invention

The present invention relates to a technology of recording 3D and 2D images.

(2) Description of the Related Art

The 2D images, also called planar images, are represented by pixels on an X-Y plane that is applied to the display screen of the display device.

In contrast, the 3D images have a depth in the Z-axis direction in addition to the pixels on the X-Y plane applied to the screen of the display device. The 3D images are presented to the viewers (users) by simultaneously playing back the left-view and right-view images to be viewed respectively by the left and right eyes so that a stereoscopic effect can be produced. The users would see, among the pixels constituting the 3D image, pixels having positive Z-axis coordinates in front of the display screen, and pixels having negative Z-axis coordinates behind the display screen.

It is preferable that an optical disc storing a 3D image has compatibility with a playback device that can play back only 2D images (hereinafter, such a playback device is referred to as "2D playback device"). This is because, otherwise, two types of discs for 3D and 2D images need to be produced so that the 2D playback device can play back the same content as that stored in a disc for 3D image. Such an arrangement will take a higher cost. It is accordingly necessary to provide an optical disc storing a 3D image that is played back as a 2D image by the 2D play back device, and as a 2D or 3D image by a play back device supporting both the 3D and 2D images (hereinafter, such a playback device is referred to as "2D/3D playback device").

Patent Document 1 identified below is one example of prior art documents describing technologies for ensuring the compatibility in playback between 2D and 3D images, with respect to optical discs storing 3D images.

[Prior Art Documents]

[Patent Literature 1]

Japanese Patent No. 3935507

SUMMARY OF THE INVENTION

The Problems the Invention is Going to Solve

In the stereoscopic playback, it is necessary to record the video streams for the left-eye and right-eye views of the user. The left-view and right-view video streams need to be converted into a certain recording format, and it is important to determine the recording format. According to a typical recording format, the left-view and right-view video streams are multiplexed at the level of the TS packet, and the result is recorded as one transport stream. However, with this method, the bit rates that can be assigned to the left-view and right-view video streams are low. This may deteriorate the image quality.

One concept for preventing the bit rates from becoming low is to store the left-view and right-view video streams into different transport stream files, and supply the left-view video stream from the optical disc, and the right-view video stream from the hard disk. In this case, since the TS packets can be supplied from the optical disc and the hard disk, it is possible to ensure a certain level of bit rate for each of the left-view and right-view video streams. This concept may be applied to a use format in which the left-view video stream is supplied from the optical disc, the right-view video stream is supplied from the network, and these video streams are combined to be played back by the user. However, with this concept, the left-view and right-view video streams cannot be stored into one optical disc. Accordingly, the concept is not suitable for a business format in which an optical disc storing the left-view and right-view video streams is sold as one product or rented over the counter. The movie industry will hesitate to take in the concept.

As one example of the method for recording the left-view and right-view video streams while ensuring the bit rates, proposed is a method in which the left-view and right-view video streams are converted into one transport stream in the interleave format, and the transport stream is recorded into an optical disc, as is realized in what is called multi-angle playback.

In the storage format in which the left-view and right-view video streams are converted into the interleave format and then stored into one transport stream file, the values of the Arrival Time Stamps (ATS) are not continuous in the Extents constituting the left-view video stream and in the Extents constituting the right-view video stream. As a result, the ATS value repeatedly change irregularly during the playback, increasing and decreasing, increasing and decreasing. This is difficult from the monotonous increase of the ATS value observed in the case of a normal video stream. Therefore, when such a transport stream file in the interleave format is subjected a playback by a 2D playback device, the normal operation of the 2D playback device cannot be ensured.

It is therefore an object of the present invention to provide a recording medium which can be played back by both the 3D playback device and the 2D playback device.

Means to Solve the Problems

The above-described object is fulfilled by a recording medium in which playlist information and stream files are recorded, wherein the playlist information includes one or more pieces of playback section information, the one or more pieces of playback section information include file reference information that specifies the stream files storing video streams, the stream files are an interleaved transport stream file and a normal-format transport stream file, in the interleaved transport stream file, a plurality of segments belonging to a left-view video stream and a plurality of segments belonging to a right-view video stream are arranged in an interleaved manner, the interleaved transport stream file being identified by a combination of an equivalent identification number and a file extension indicating that video streams are stored in the interleaved manner, the equivalent identification number being equivalent with the file reference information, and the normal-format transport stream file stores a base-view video stream, and is identified by a combination of the equivalent identification number and a file extension indicating that video streams are stored in a normal manner, the base-view video stream being either the left-view video stream or the right-view video stream that can be played back in a planar-view playback.

EFFECTS OF THE INVENTION

In the present invention, the transport stream file in the interleave format is identified by a combination of (i) an identification number that is equivalent with the file reference information and (ii) an extension indicating that it is a transport stream file in the interleave format. With this structure, when the output mode of the playback device is in the stereoscopic playback mode, it is possible to read out Extents constituting a transport stream file in the interleave format by identifying it from the file reference information included in the playlist information and an extension indicating that it is a transport stream file in the interleave format, and to playback the read-out Extents. With this structure, 2D playback devices cannot read out Extents constituting a transport stream file in the interleave format. This prevents the 2D playback devices from suffering from an erroneous operation or an unstable operation due to the change of the ATS value unique to the transport stream file in the interleave format, namely the repetitive, irregular change of the ATS value of increase and decrease.

Also, it is possible to preliminarily describe a predetermined piece of file reference information in the playlist information so as to read out and play back, in the 3D playback, a stream file in the interleave format having (i) a file name that is the same as the predetermined piece of file reference information and (ii) an extension indicating that it is a transport stream file in the interleave format, and in the 2D playback, a transport stream file having (i) a file name that is the same as the predetermined piece of file reference information and (ii) an extension indicating that it is normal-format transport stream file. This eliminates the need for creating respectively the 3D playlist information and the 2D playlist information, thus reducing the trouble of authoring.

It is also possible to access the Extents constituting the base-view video stream among Extents constituting transport stream files in the interleave format, by using (i) the file reference information included in the playlist information and (ii) an extension indicating that it is a normal-format transport stream file. It is thus possible to realize both the stereoscopic playback in the 3D playback device and the planar-view playback in the 2D playback device even if transport stream files for the planar view are not recorded separately from the transport stream files in the interleave format. This makes it possible to provide users with one BD-ROM in which a 3D movie work has been recorded. Since there is no need to record transport stream files for the planar view separately from the transport stream files in the interleave format, there is no need to sell a package containing both a recording medium with a 3D image and a recording medium with a 2D image, or sell them separately as different articles for sale. This does not increase the cost of distribution, nor increase the cost for inventory management in the retail and wholesale stores, and the movie industry can deal with 3D movie works in the same manner as existing 2D movie works.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 1A through 1C show an embodiment of the usage act of the recording medium, playback device, display device, and glasses;

FIGS. 7A and 7B illustrate how the video stream is stored in the PES packet sequences, and how they are converted into TS packets and source packets;

FIG. 16 shows how entry points are registered in an entry map;

FIGS. 22A to 22C show the stream selection table;

FIG. 26 shows the internal structure of the system target decoder 4 and the plane memory set 5a;

FIG. 43 shows the relationships between (i) the difference in the number of pixels between L and R images and (ii) the distance on the screen of the display devices;

FIG. 46 shows a bit assignment to the PSRs covering a plurality of 3D systems;

DESCRIPTION OF THE PREFERRED EMBODIMENTS

Embodiment 1

Figure 2:
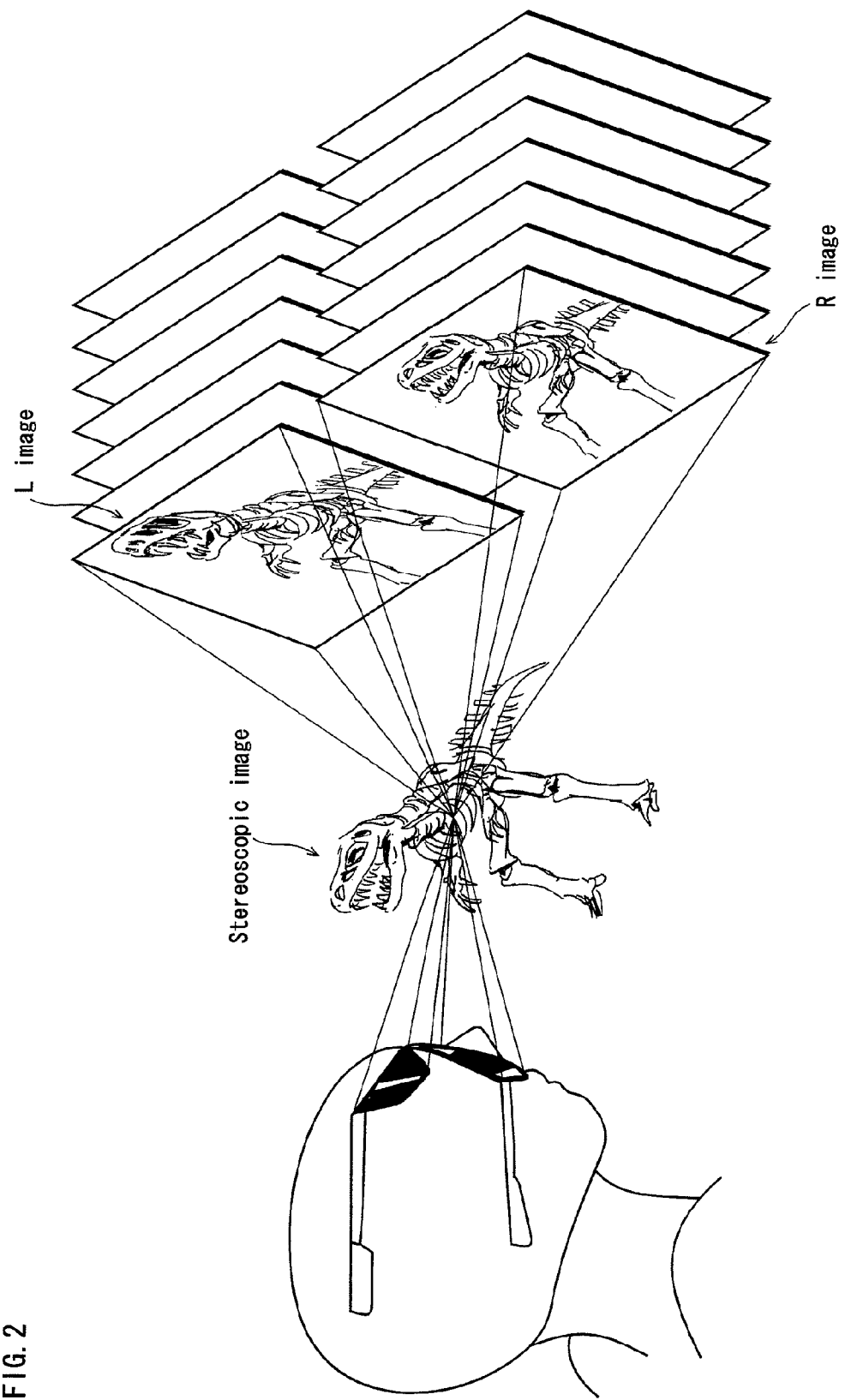
FIG. 2 shows the user's head on the left-hand side of the drawing and the images of a dinosaur skeleton seen respectively by the left eye and the right eye of the user on the right-hand side of the drawing.

The following describes an embodiment of a recording medium and a playback device provided with means for solving the above-described problems, with reference to the attached drawings. First, a brief description is give of the principle of the stereoscopic view.

In general, due to the difference in position between the right eye and the left eye, there is a little difference between an image seen by the right eye and an image seen by the left eye. It is this difference that enables the human beings to recognize the image they see in three dimensions. The stereoscopic display is realized by using the parallax of human beings, so that a planar image looks as is it is three-dimensional.

More specifically, there is a difference between the image seen by the right eye and the image seen by the left eye, the difference corresponding to parallax of human beings. The stereoscopic display is realized by displaying the two types of images alternately at regular short time intervals.

The "short time interval" may be a time period that is short enough to provide human beings, by the alternate displays, an illusion that they are seeing a three-dimensional object. The methods for realizing the stereoscopic viewing include one using a holography technology and one using a parallax image.

The former method, the holography technology, is characterized in that it can reproduce an object three-dimensionally in the same manner as a human being recognizes the object normally, and that, in regards with video generation, although it has established a technological theory, it requires (i) a computer that can perform an enormous amount of calculations to generate the video for holography in real time, and (ii) a display device having a resolution in which several thousands of lines can be drawn in a length of 1 mm. It is extremely difficult for the current technology to realize such a product, and thus products for commercial use have hardly been developed.

On the other hand, the latter method using a parallax image has a merit that a stereoscopic viewing can be realized only by preparing images for viewing with the right eye and the left eye. Some technologies including the sequential segregation method have been developed for practical use from the viewpoint of how to cause each of the right eye and the left eye to view only the images associated therewith.

The sequential segregation method is a method in which images for the left eye and right eye are alternately displayed in a time axis direction such that left and right scenes are overlaid in the brain by the effect of residual images of eyes, and the overlaid image is recognized as a stereoscopic image.

FIG. 1A shows the embodiment of the usage act of the recording medium, playback device, display device, and glasses. As shown in FIG. 1A, A BD-ROM 100 as one example of the recording medium and a playback device 200 constitute a home theater system, together with a television 300, 3D glasses 400, and a remote control 500, which is subject to the use by the user.

The BD-ROM 100 provides the home theater system with, for example, a movie work.

The playback device 200 is connected with the television 300 and plays back the BD-ROM 100.

The television 300 provides the user with an interactive operation environment by displaying a menu and the like as well as the movie work. The user needs to wear the 3D glasses 400 for the television 300 of the present embodiment to realize the stereoscopic viewing. Here, the 3D glasses 400 are not necessary when the television 300 displays images by the lenticular method. The television 300 for the lenticular method aligns pictures for the left and right eyes vertically in a screen at the same time. And a lenticular lens is provided on the surface of the display screen such that pixels constituting the picture for the left eye form an image only in the left eye and pixels constituting the picture for the right eye form an image only in the right eye. This enables the left and right eyes to see respectively pictures that have a parallax, thereby realizing a stereoscopic viewing.

The 3D glasses 400 are equipped with liquid-crystal shutters that enable the user to view a parallax image by the sequential segregation method or the polarization glasses method. Here, the parallax image is an image which is composed of a pair of (i) an image that enters only into the right eye and (ii) an image that enters only into the left eye, such that pictures respectively associated with the right and left eyes respectively enter the eyes of the user, thereby realizing the stereoscopic viewing. FIG. 1B shows the state of the 3D glasses 400 when the left-view image is displayed. At the instant when the left-view image is displayed on the screen, the liquid-crystal shutter for the left eye is in the light transmission state, and the liquid-crystal shutter for the right eye is in the light block state. FIG. 1C shows the state of the 3D glasses 400 when the right-view image is displayed. At the instant when the right-view image is displayed on the screen, the liquid-crystal shutter for the right eye is in the light transmission state, and the liquid-crystal shutter for the left eye is in the light block state.

The remote control 500 is a machine for receiving from the user operations onto the layered GUI. To receive the operations, the remote control 500 is equipped with a menu key, arrow keys, an enter key, a return key, and numeral keys, where the menu key is used to call a menu constituting the GUI, the arrow keys are used to move a focus among GUI components constituting the menu, the enter key is used to perform ENTER (determination) operation onto a GUI component constituting the menu, the return key is used to return to a higher layer in the layered menu.

This completes the description of the usage act of the recording medium and the playback device.

The present embodiment adopts a method in which parallax images to be used for the stereoscopic viewing are stored in an information recording medium.

The parallax image method is a method for realizing the stereoscopic viewing by preparing separately an image for the right eye and an image for the left eye, and causing the image for the right eye to enter only into the right eye and the image for the left eye enter only into the left eye. FIG. 2 shows the user's head on the left-hand side of the drawing and the images of a dinosaur skeleton seen respectively by the left eye and the right eye of the user on the right-hand side of the drawing. When the light transmission and block are repeated alternately for the right and left eyes, the left and right scenes are overlaid in the brain of the user by the effect of residual images of eyes, and the overlaid image is recognized as a stereoscopic image appearing in front of the user.

Among the parallax images, the image entering the left eye is called a left-eye image (L image), and the image entering the right eye is called a right-eye image (R image). A video composed of only L images is called a left-view video, and a video composed of only R images is called a right-view video. Also, the video streams which are obtained by digitizing and compress-encoding the left-view video and right-view video are called left-view video stream and right-view video stream, respectively.

Figure 3:
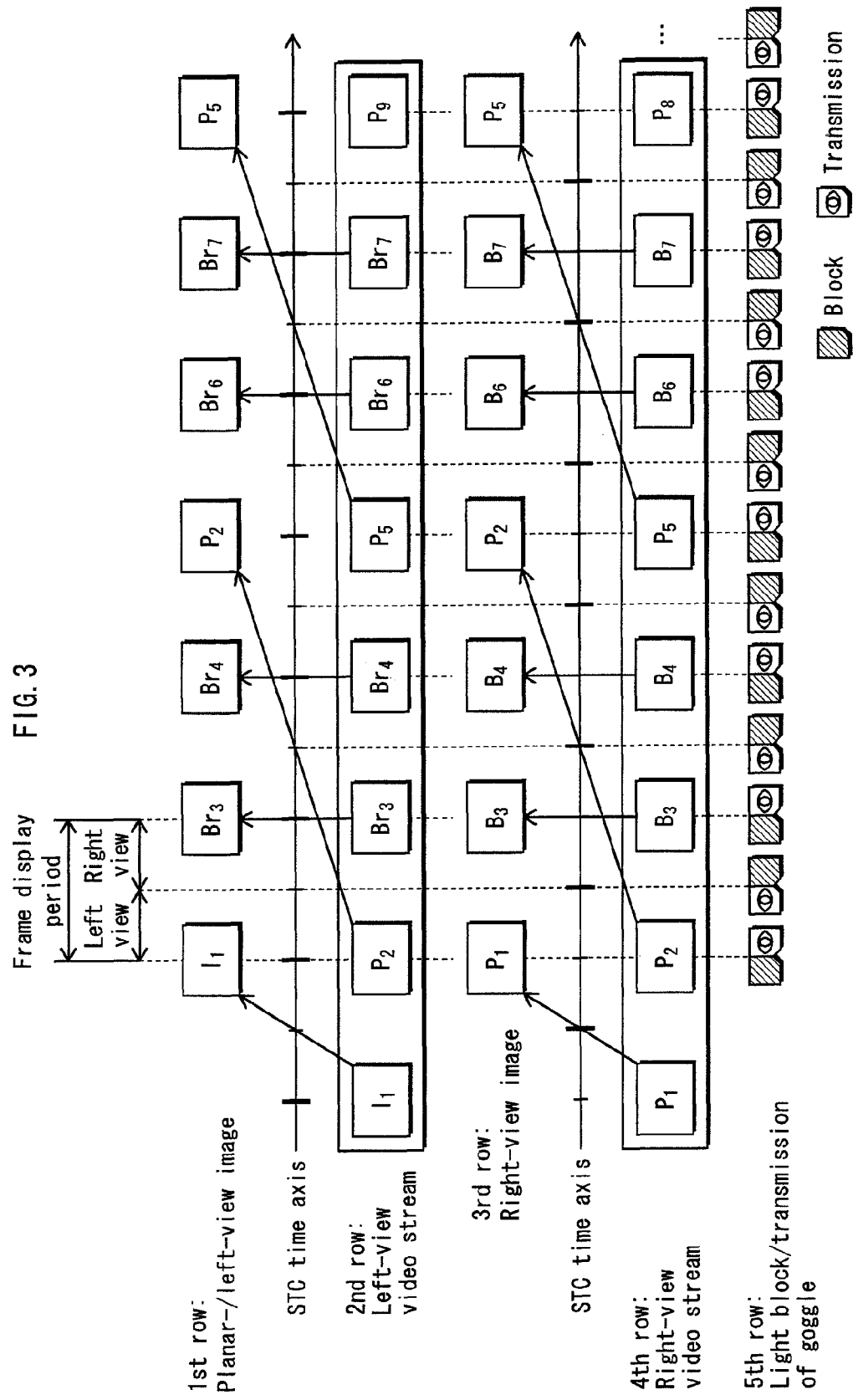
FIG. 3 shows one example of the internal structures of the left-view and right-view video streams for the stereoscopic viewing.

FIG. 3 shows one example of the internal structures of the left-view and right-view video streams for the stereoscopic viewing.

In the second row of FIG. 3, the internal structures of the left-view video stream is shown. This stream includes picture data I1, P2, Br3, Br4, P5, Br6, Br7, and P9. These picture data are decoded according to the Decode Time Stamps (DTS). The first row shows the left-eye image. The left-eye image is played back by playing back the decoded picture data I1, P2, Br3, Br4, P5, Br6, Br7, and P9 according to the PTS, in the order of I1, Br3, Br4, P2, Br6, Br7, and P5. In FIG. 3, a picture that has no reference picture and performs the intra-picture prediction encoding using only an encoding target picture is called I-picture. Note that the "picture" is a unit of encoding that includes both the frame and the field. Also, a picture that performs the inter-picture prediction encoding by referring to one processed picture is called P-picture; a picture that performs the inter-picture prediction encoding by simultaneously referring to two processed pictures is called B-picture; and a B-picture that is referred to by another picture is called Br-picture. Note that the frame is regarded as the video access unit when the frame structure is adopted, and the field is regarded as the video access unit when the field structure is adopted.

In the fourth row of FIG. 3, the internal structures of the right-view video stream is shown. This stream includes picture data P1, P2, B3, B4, P5, B6, B7, and P8. These picture data are decoded according to the DTS. The third row shows the right-eye image. The right-eye image is played back by playing back the decoded picture data P1, P2, B3, B4, P5, B6, B7, and P8 according to the PTS, in the order of P1, B3, B4, P2, B6, B7, and P5.

The fifth row shows how the state of the 3D glasses 400 is changed. As shown in the fifth row, when the left-eye image is viewed, the shutter for the right eye is closed, and when the right-eye image is viewed, the shutter for the left eye is closed.

These left-view and right-view video streams are compressed by the inter-picture prediction encoding using the correlated property between view points, as well as by the inter-picture prediction encoding using the correlated property in a time axis. The pictures constituting the right-view video stream are compressed by referring to the pictures constituting the left-view video stream having the same display times.

For example, the starting P-picture of the right-view video stream refers to the I-picture of the left-view video stream; the B-picture of the right-view video stream refers to the Br-picture of the left-view video stream; and the second P-picture of the right-view video stream refers to the P-picture of the left-view video stream.

One of the video compression methods using such a correlated property between view points is a corrected standard of MPEG-4 AVC/H.264 which is called Multi-view Video Coding (MVC). The Joint Video Team (JVT), which is a joint project of the ISO/IEC MPEG and the ITU-T VCEG, completed the formulation of the corrected standard of MPEG-4 AVC/H.264 in July 2008. The MVC is a standard for encoding, in bulk, images for a plurality of view points. Due to the use, in the prediction encoding, of the similarity of images between view points as well as the similarity of images in a time axis, the MVC has improved the compression efficiency compared with methods for encoding independent images for a plurality of view points.

A video stream, among the left-view video stream and the right-view video stream having been compress-encoded by the MVC, that can be decoded independently is called "base-view video stream". Also, a video stream, among the left-view video stream and the right-view video stream, that has been compress-encoded based on the inter-frame correlated property with each picture data constituting the base-view video stream, and that can be decoded only after the base-view video stream is decoded, is called "dependent-view stream".

From now on, production of the recording medium, namely, production act of recording medium will be described.

Figure 4:
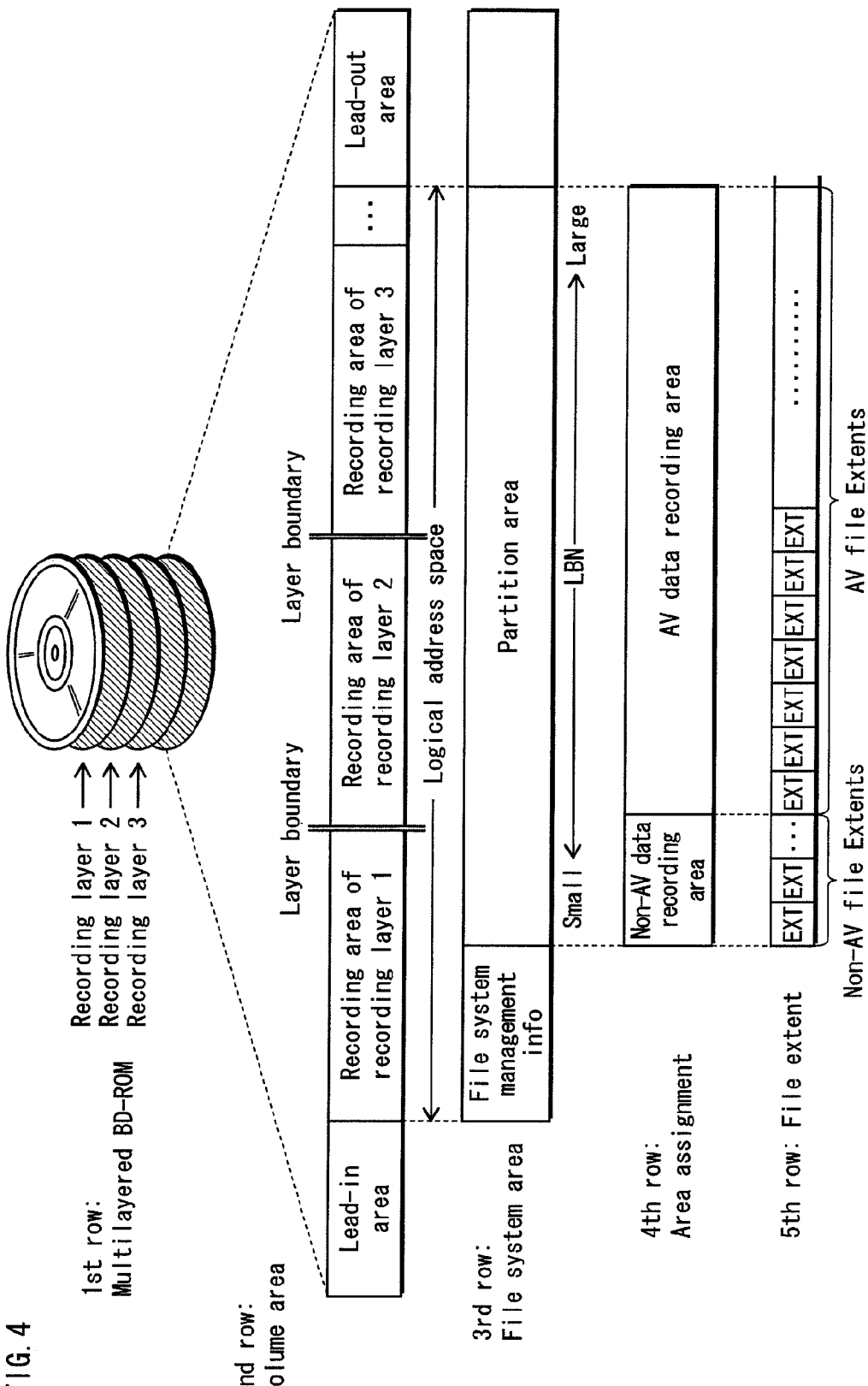
FIG. 4 shows an internal structure of a multi-layered optical disc.

FIG. 4 shows an internal structure of a multi-layered optical disc.

The first row of FIG. 4 shows a BD-ROM being a multi-layered optical disc. The second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording layers of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, sectors with consecutive logical addresses are also consecutive in the physical disposition on the optical disc. That is to say, data stored in the sectors with consecutive logical addresses can be read out without performing a seek operation. On the other hand, it is presumed that the logical addresses are not consecutive in the areas, such as boundaries between recording layers, where consecutive data reading is not possible.

In the volume area, file system management information is recorded immediately after the lead-in area. Following this, a partition area managed by the file system management information exists. The file system is a system that expresses data on the disc in units called directories and files. In the case of the BD-ROM 100, the file system is a UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

Among the files that are accessible on the file system, a file in which an AV stream, which is obtained by multiplexing a video stream and an audio stream, is stored is called "AV file". On the other hand, a file in which general data other than the AV stream is stored is called "non-AV file".

AV files in which AV streams in a transport stream format are stored are called "transport stream files", where the AV streams in the transport stream format are obtained by converting the Packetized Elementary Streams (PESs) such as video streams and audio streams into TS packets, and multiplexing the TS packets.

On the other hand, AV files in which AV streams in a system stream format are stored are called "system stream files", where the AV streams in the system stream format are obtained by converting the PES streams such as video streams and audio streams into pack sequences, and multiplexing the pack sequences.

The AV files recorded on the BD-ROM, BD-RE, or BD-R are the former, namely, transport stream files. Also, the AV files recorded on the DVD-Video, DVD-RW, DVD-R, or DVD-RAM are the latter, namely, system stream files, and are also called video objects.

The fourth row shows how the areas in the file system area managed by the file system are assigned. As shown in the fourth row, a non-AV data recording area exists on the innermost circumference side in the file system area; and an AV data recording area exists immediately following the non-AV data recording area. The fifth row shows the contents recorded in the non-AV data recording area and the AV data recording area. As shown in the fifth row, Extents constituting the AV files are recorded in the AV data recording area; and Extents constituting non-AV files, which are files other than the AV files, are recorded in the non-AV data recording area.

Figure 5:
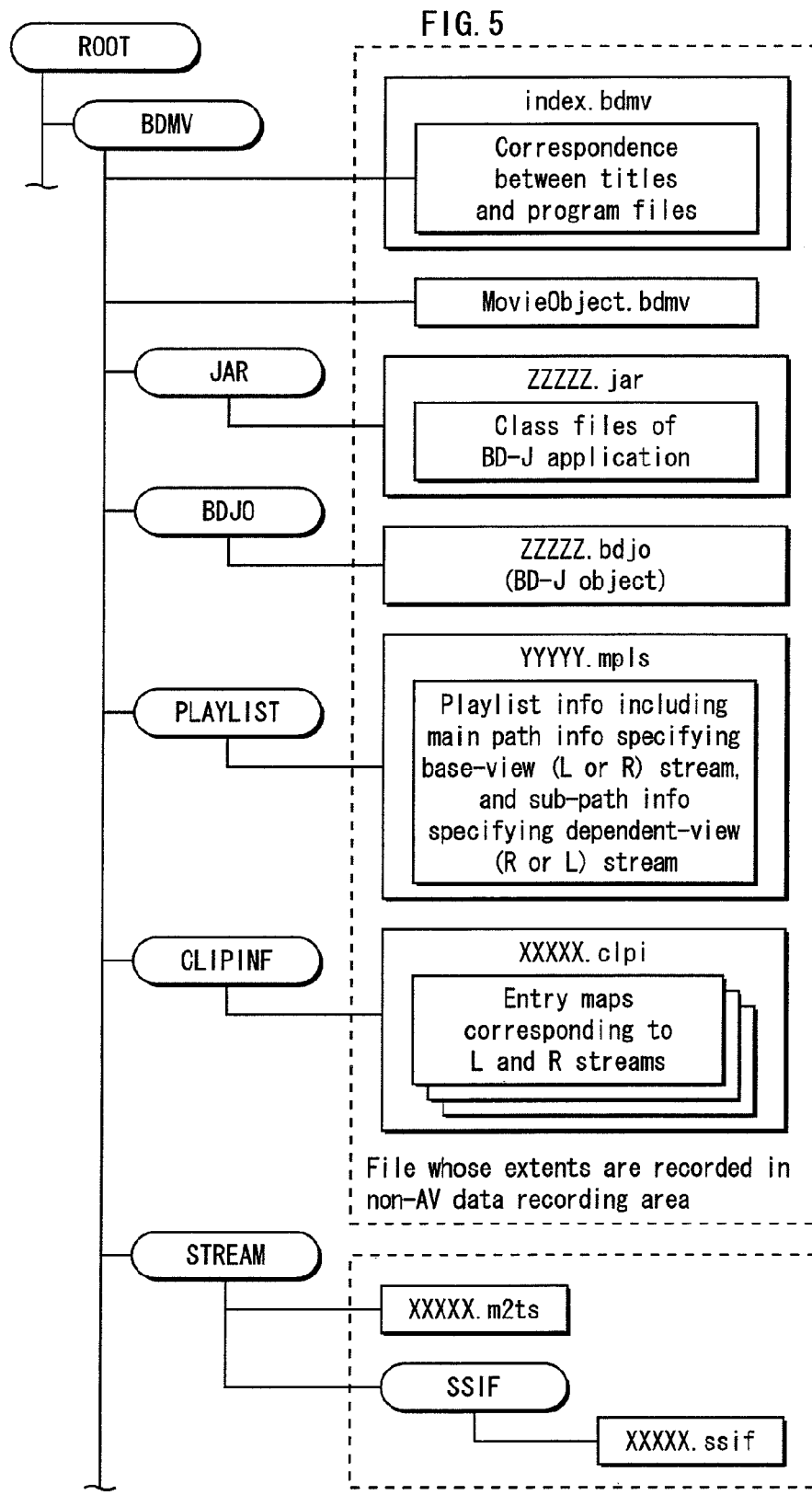
FIG. 5 shows the application format of the optical disc based on the file system.

FIG. 5 shows the application format of the optical disc based on the file system.

The BDMV directory is a directory in which data such as AV content and management information used in the BD-ROM are recorded. Five sub-directories called "PLAYLIST directory," "CLIPINF directory," "STREAM directory," "BDJO directory," "JAR directory," and "META directory" exist below the BDMV directory. Also, two types of files (i.e. index.bdmv and MovieObject.bdmv) are arranged under the BDMV directory.

A file "index.bdmv" (the file name "index.bdmv" is fixed) stores an index table that shows correspondence between title numbers of a plurality of titles available on the BD-ROM and program files (namely, BD-J objects or movie objects) defining each title. The index table is management information of the entire BD-ROM. The "index.bdmv" file is the first file that is read by a playback device after the BD-ROM is loaded into the playback device, so that the playback device is enabled to uniquely identify the disc. The index table is a table belonging to the highest layer for defining the title structure including all titles stored in the BD-ROM, top menu, and FirstPlay. The index table specifies a program file that is to be executed first among the general titles, top menu title, and FirstPlay title. The BD-ROM playback device refers to the index table and executes a predetermined program file each time a title or a menu is called. Here, the FirstPlay title is set by the content provider, and in which a program file, which is to be executed automatically when the disc is loaded, is set. The top menu title specifies a movie object or a BD-J object that is to be called when a command, such as a "return-to-menu" command, is executed by a user operation on the remote control. The "index.bdmv" file contains initial_output_mode information as information regarding the stereoscopic view. The initial_output_mode information defines how the initial state of the output mode of the playback device should be when the "index.bdmv" file is loaded. The producer side can define a desired output mode in the initial_output_mode information.

A file "MovieObject.bdmv" (the file name "MovieObject.bdmv" is fixed) stores one or more movie objects. The movie object is a program file that defines a control procedure to be performed by the playback device in the operation mode (HDMV mode) in which the control subject is a command interpreter. The movie object includes one or more commands and a mask flag, where the mask flag defines whether or not to mask a menu call or a title call when the call is performed by the user onto the GUI.

A program file (XXXXX.bdjo---"XXXXX" is variable, and the extension "bdjo" is fixed) to which an extension "bdjo" is given exists in the BDJO directory. The program file stores a BD-J object that defines a control procedure to be performed by the playback device in the operation mode (BD-J mode) in which the control subject is a Java™ virtual machine that is a byte code interpreter. The BD-J object includes an "application management table". The "application management table" in the BD-J object is a table that is used to cause the playback device to perform an application signaling, with the title being regarded as the life cycle. The application management table includes an "application identifier" and a "control code", where the "application identifier" indicates an application to be executed when a title corresponding to the BD-J object becomes a current title. BD-J applications whose life cycles are defined by the application management table are especially called "BD-J applications". The control code, when it is set to AutoRun, indicates that the application should be loaded onto the heap memory and be activated automatically; and when it is set to Present, indicates that the application should be loaded onto the heap memory and be activated after a call from another application is received. On the other hand, some BD-J applications do not end their operations even if the title is ended. Such BD-J applications are called "title unboundary applications".

A substance of such a Java™ application is a Java™ archive file (YYYYY.jar) stored in the JAR directory under the BDMV directory.

An application may be, for example, a Java™ application that is composed of one or more xlet programs having been loaded into a heap memory (also called work memory) of a virtual machine. The application is constituted from the xlet programs having been loaded into the work memory, and data.

In the "PLAYLIST directory", a playlist information file ("xxxxx.mpls"---"XXXXX" is variable, and the extension "mpls" is fixed) to which an extension "mpls" is given exists.

The "playlist" indicates a playback path defined by logically specifying a playback order of playback sections, where the playback sections are defined on a time axis of AV streams. The playlist has a role of defining a sequence of scenes to be displayed in order, by indicating which parts of which AV streams among a plurality of AV streams should be played back. The playlist information file stores playlist information which defines "patterns" of the playlists. The BD-J application starts a playback of a playlist by instructing a Java™ virtual machine to generate a JMF (Java Media Frame work) player instance for playing back the playlist information. The JMF player instance is data that is actually generated in the heap memory of the virtual machine based on a JMF player class.

In the "CLIPINF directory", a clip information file ("xxxxx.clpi"---"XXXXX" is variable, and the extension "clpi" is fixed) to which an extension "clpi" is given exists.

The Extents constituting the files existing in the directories explained up to now are recorded in the non-AV data area.

The "STREAM directory" is a directory storing a transport stream file. In the "STREAM directory", a transport stream file ("xxxxx.m2ts"---"XXXXX" is variable, and the extension "m2ts" is fixed) to which an extension "m2ts" is given exists.

The transport stream file in the STREAM directory stores an AV clip. The "AV clip" is composed of "pieces" of AV streams. That is to say, the AV clip is a set of packets storing sections of a plurality of types of PES streams such as a video stream, audio stream, and graphics stream. Each AV clip includes consecutive time stamps and provides a seamless AV playback for a predetermined period. The AV clip ensures a playback for a predetermined period on a time axis, where the length of the period is not fixed and may be, for example, one second, five seconds, or one minute.

Also, the AV clip contains packet management information (PCR, PMT, PAT) defined in the European digital broadcast standard, as information for managing and controlling a plurality of types of PES streams.

The PCR (Program Clock Reference) stores STC time information corresponding to an ATS that indicates the time when the PCR packet is transferred to a decoder, in order to achieve synchronization between an ATC (Arrival Time Clock) that is a time axis of ATSs, and an STC (System Time Clock) that is a time axis of PTSs and DTSs.

The PMT (Program Map Table) stores PIDs in the streams of video, audio, graphics and the like contained in the transport stream file, and attribute information of the streams corresponding to the PIDs. The PMT also has various descriptors relating to the AV clip. The descriptors have information such as copy control information showing whether copying of the AV clip is permitted or not permitted.

A PMT header is disposed at the top of the PMT. Information written in the PMT header includes the length of data included in the PMT to which the PMT header is attached. The PMT header is followed by a plurality of descriptors relating to the AV clip, Information such as the aforementioned copy control information is recited as the descriptors. The descriptors are followed by a plurality of pieces of stream information relating to the streams included in the transport stream file. Each piece of stream information is composed of stream descriptors which each describe a type of a stream, a PID of the stream, and attribute information (such as frame rate or aspect ratio) of the stream, where the stream type is used for identifying the compression codec of the stream or the like. There are as many stream descriptors as the streams existing in the AV clip.

The PAT (Program Association Table) shows a PID of a PMT used in the AV clip, and is registered by the PID arrangement of the PAT itself.

These PCR, PMT, and PAT, in the European digital broadcast standard, have a role of defining partial transport streams constituting one broadcast program (one program). This enables the playback device to cause the decoder to decode AV clips as if it deals with the partial transport streams constituting one broadcast program, conforming to the European digital broadcast standard. This structure is aimed to support compatibility between the BD-ROM playback devices and the terminal devices conforming to the European digital broadcast standard.

The AV clips include a "left-view AV clip" that is a set of packets storing sections of a plurality of types of PES streams for a left-view playback, such as a left-view video stream, a left-view graphics stream, and an audio stream that is to be played back together with these streams, where each left-view AV clip includes consecutive time stamps and ensures a seamless AV playback for a predetermined period. Furthermore, a left-view AV clip may be called a "2D/left-view AV clip" when it includes a base-view video stream and makes possible a planar-view playback. Note that in the following description, unless otherwise noted, it is assumed that a left-view video stream is a base-view video stream, and a left-view AV clip including a left-view video stream is a 2D/left-view AV clip.

The AV clips also include a "right-view AV clip" that is a set of packets storing sections of a plurality of types of PES streams for a right-view playback, such as a right-view video stream, a right-view graphics stream, and an audio stream that is to be played back together with these streams, where each right-view AV clip includes consecutive time stamps and ensures a seamless AV playback for a predetermined period.

The clip information file stored in the CLIPINF directory is information which indicates details of each AV clip such as what packets a left-view AV clip or a right-view AV clip is composed of, and is information that is read out into a memory before a corresponding AV clip is played back and is provided for reference in the playback device while the playback of the AV clip continues.

Up to now, the internal structure of the recording medium has been described. The following describes how to generate the recording medium shown in FIGS. 4 and 5, namely a form of a recording method.

The recording method of the present embodiment includes not only the above-described real-time recording in which AV files and non-AV files are generated in real time, and are written into the AV data recording area and the non-AV data recording area, but also a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording.

Figure 6:
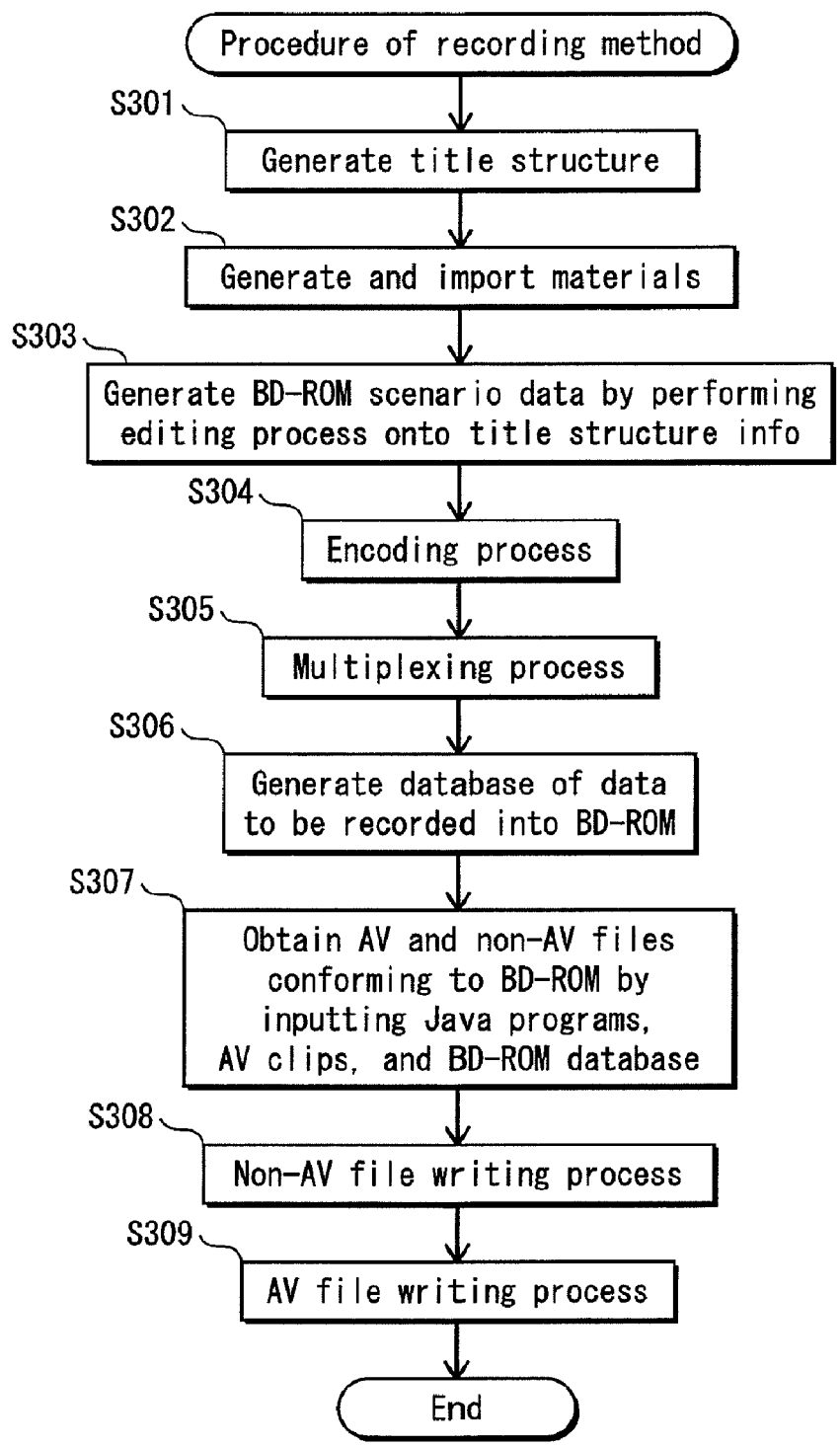
FIG. 6 is a flowchart showing the processing procedure of the recording method.

FIG. 6 is a flowchart showing the processing procedure of the recording method.

In step S301, the title structure of the BD-ROM is determined. In this process, title structure information is generated. The title structure information defines, using a tree structure, the relationships among playback units (such as the title, movie object, BD-J object, and playlist) in the BD-ROM. More specifically, the title structure information is generated by defining nodes that respectively corresponds to: "disc name" of the BD-ROM to be created; "title" that can be played back from index.bdmv; "movie object and BD-J object" constituting the title; and "playlist" that is played back from the movie object and BD-J object, and connecting these nodes with edges.

In step S302, a video, audio, still picture, and subtitle to be used for the title are imported.

In step S303, BD-ROM scenario data is generated by performing an editing process onto the title structure information in accordance with a user operation received via the GUI. Note that the BD-ROM scenario data is information for causing the playback device to play back an AV stream in units of titles. In the BD-ROM, a scenario is information defined as the index table, movie object, or playlist. The BD-ROM scenario data includes information of the materials constituting the streams, playback section, information indicating a playback route, a menu screen arrangement, and information of transition from the menu.

Step S304 is an encoding process in which PES streams are obtained by performing encoding based on the BD-ROM scenario data.

Step S305 is a multiplexing process in which AV clips are obtained by multiplexing the PES streams.

In step S306, a database of the data to be recorded into the BD-ROM is generated. Here, the database is a generic name of the index table, movie object, playlist, BD-object and the like defined in the BD-ROM as described above.

In step S307, an AV file and a non-AV file are generated in a file system format conforming to the BD-ROM, by using inputs of the Java™ program, the AV clip obtained in the multiplexing process, and the BD-ROM database.

Step S308 is a process of writing the non-AV file, and step S309 is a process of writing the AV file.

The multiplexing process of step S305 multiplexes source packet sequences constituting the video, audio, and graphics, and includes a first conversion process and a second conversion process. In the first conversion process, the video, audio, and graphics streams are converted into PES streams, and the PES streams are converted into transport streams. In the second conversion process, TS packets constituting the transport streams are converted into source packets.

In the process of writing the AV file, in step S309, the source packet sequences are written into consecutive areas in the recording medium, as extents of AV files.

The streams to be written in these processes are as follows.

Video Stream

The video stream is composed of a primary video and a secondary video of a movie. Here, the primary video is a normal video which is displayed as a parent image by picture-in-picture; and the secondary video is a video which is displayed on a small screen by picture-in-picture. The primary video is classified into a left-view video and a right-view video, and the secondary video is also classified into a left-view video and a right-view video.

The video stream may be encoded for recording, by MPEG-2, MPEG-4 AVC, SMPTE VC-1 or the like, as well as by MVC as described above.

Audio Stream

The audio stream represents the main audio part of the movie. The audio stream is compress-encoded for recording, by Dolby AC-3, Dolby Digital Plus, MLP, DTS, DTS-HD, linear PCM or the like. The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed.

Presentation Graphics Stream

The Presentation Graphics (PG) stream is a graphics stream representing graphics, such as movie subtitles and characters, that should be accurately synthesized with the picture. There are PG streams for a plurality of languages such as English, Japanese and French.

The PG stream is composed of functional segments such as: PCS (Presentation Control Segment); PDS (Pallet Define Segment); WDS (Window Define Segment); and ODS (Object Define Segment). The ODS is a functional segment that defines a graphics object as a subtitle.

The WDS is a functional segment that defines the amount of bits of a graphics object on the screen. The PDS is a functional segment that defines a color in drawing a graphics object. The PCS is a functional segment that defines a page control in displaying a subtitle. Such page control includes Cut-In/Out, Fade-In/Out, Color Change, Scroll, and Wipe-In/Out. It is possible with the page control by the PCS to achieve a display effect, for example, fading out the current subtitle while displaying the next subtitle.

In the playback of a graphics stream, the graphics decoder realizes the above-described accurate synchronization by running the hardware full out. More specifically, the graphics decoder runs the hardware full out by executing, by pipeline, two processes: a process of obtaining a graphics object by decoding the ODS belonging to a certain display unit and writing the obtained graphics object into the object buffer; and a process of obtaining a graphics object by decoding the ODS belonging to a preceding display unit and writing the obtained graphics object into the plane memory.

The PG stream is a stream that is not multiplexed into the transport stream but represents a subtitle. The text subtitle stream (also referred to as textST stream) is a stream of this kind, as well. The textST stream is a stream that represents the contents of subtitle by the character codes. A combination the PG stream and the textST stream is called "PGTextST stream" in the BD-ROM standard.

Interactive Graphics Stream

The Interactive Graphics (IG) stream is a graphics stream for achieving an interactive control via a remote control. The interactive control defined by the IG stream is an interactive control that is compatible with an interactive control on a DVD playback device. The IG stream is composed of functional segments such as: ICS (Interactive Composition Segment); PDS (Palette Definition Segment); ODS (Object Definition Segment); and END (END of Display Set Segment). The ODS is a functional segment that defines a graphics object. A button on the interactive screen is drawn by a plurality of such graphics objects. The PDS (Palette Definition Segment) is a functional segment that defines a color in drawing a graphics object. The ICS is a functional segment that achieves a state change in which the button state changes in accordance with a user operation. The ICS includes a button command that is executed when a confirmation operation is performed on a button. The Interactive Graphics stream represents an interactive screen that is created by arranging GUI commands on the screen.

FIG. 7A illustrates in more detail how the video stream is stored in the PES packet sequences. The first row in FIG. 7A shows a video frame sequence of the video stream. The second row shows a PES packet sequence. The third row shows a TS packet sequence obtained by converting the PES packet sequence. As shown by arrows yg1, yg2, yg3 and yg4, the video stream is composed of a plurality of video presentation units (I picture, B picture, P picture). The video stream is divided up into the individual pictures, and each picture is stored in the payload of a PES packet. Each PES packet has a PES header storing a PTS (Presentation Time-Stamp) that is a display time of the picture stored in the payload of the PES packet, and a DTS (Decoding Time-Stamp) that is a decoding time of the picture stored in the payload of the PES packet.

<TS Packet Sequence>

FIG. 7B shows the format of the TS packets ultimately written in the AV clip. The first row shows a TS packet sequence. The second row shows a source packet sequence.

As shown in the first row of FIG. 7B, each TS packet is a fixed-length packet consisting of a 4-byte "TS header" carrying information such as a PID identifying the stream, and a 184-byte "TS payload" storing data. The PES packets are divided and stored in the TS payloads.

As shown in the second row, each TS packet is attached with a 4-byte TP_Extra_Header to be converted into a 192-byte source packet. Such 192-byte source packets are written in an AV clip. The TP_Extra_Header stores information such as an ATS (Arrival_Time_Stamp). The ATS shows a transfer start time at which the TS packet is to be transferred to a PID filter. The source packets are arranged in the AV clip as shown in the third row. The numbers incrementing from the head of the AV clip are called SPNs (source packet numbers).

<Multiplexing of AV Clips>

Figure 8:
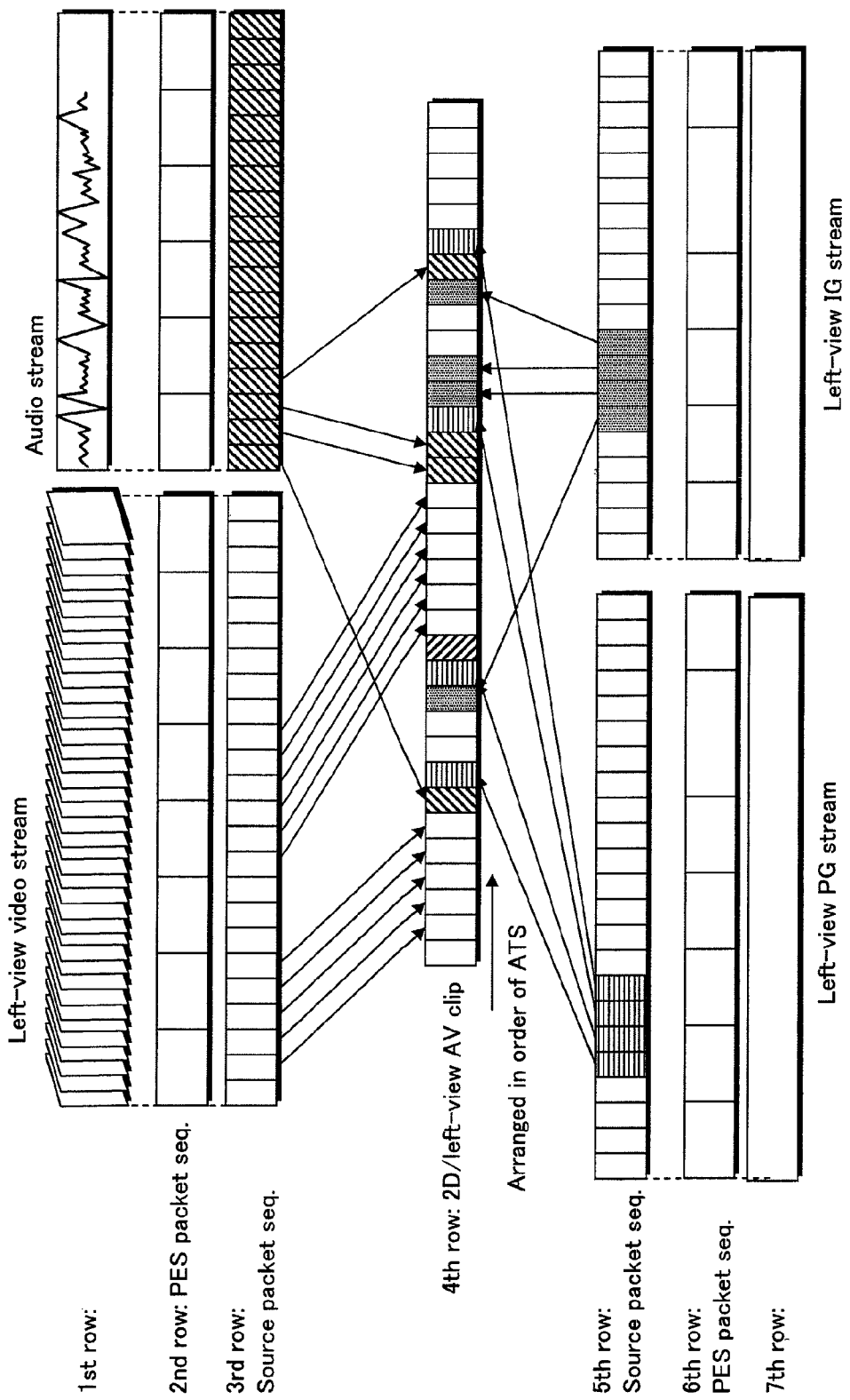
FIG. 8 schematically shows how the left-view AV clips are multiplexed.

FIG. 8 schematically shows how the left-view AV clips are multiplexed. First, a left-view video stream and an audio stream (First row) are respectively converted into PES packet sequences (Second row), and further converted into source packets sequences, respectively (Third row). Similarly, a left-view presentation graphics stream and a left-view interactive graphics stream (Seventh row) are converted into PES packet sequences, respectively (Sixth row), and further converted into source packet sequences, respectively (Fifth row). The video, audio, and graphics source packets obtained in this way are arranged in the order indicated by their ATSs. This is because the source packets should be read out into the read buffer according to their ATSs. A left-view AV clip (Fourth row) is composed of these source packets having been arranged in this way. The size of the left-view AV clip has been predetermined so as not to cause the read buffer underflow, and the left-view AV clip is a target of recording into the recording medium.

A group of source packets whose ATSs are continuous in the Arrival Time Clock (ATC) time axis is called an ATC sequence. Also, a group of source packets whose Decode Time Stamps (DTSs) and Presentation Time Stamps (PTSs) are continuous in the System Time Clock (STC) time axis is called an STC sequences.

Figure 9:
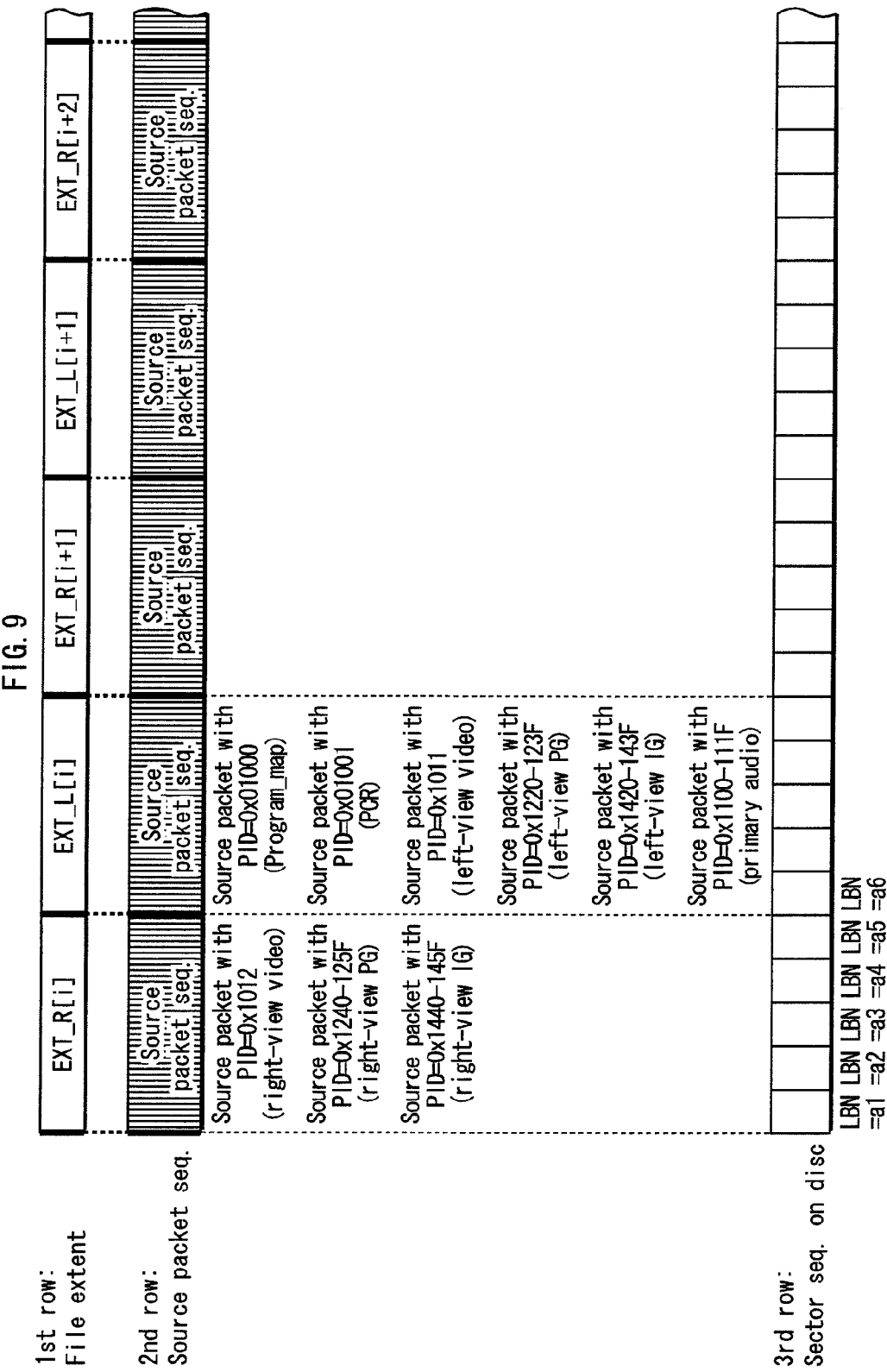
FIG. 9 shows the internal structure of the Extents obtained by the recording method.

FIG. 9 shows Extents obtained by the recording method. The first row shows Extents EXT_L[i], EXT_L[i+1], EXT_R[i], and EXT_R[i+1] that constitute an AV file.

The second row shows source packet sequences which belong to each Extent.

The Extents shown in the first row are obtained by arranging a group of source packets constituting the right-view AV clip and a group of source packets constituting the left-view AV clip, by the interleave arrangement. The interleave arrangement in the case of FIG. 9 is to record alternately each set of source packets constituting the right-view AV clip and each set of source packets constituting the left-view AV clip, by regarding each set as one Extent, and thereby with a regularity that they are arranged in the order of "right-view", "left-view", "right-view", "left-view", . . . .

Here, the variables "i" and "i+1" in the parentheses indicate serial numbers of Extents to be played back. According to this notation, it is understood that the two Extents having the variable "i", namely EXT_L[i] and EXT_R[i] are played back simultaneously, and the two Extents having the variable "i+1", namely EXT_L[i+1] and EXT_R[i+1] are played back simultaneously.

The size of Extent EXT_L[i] is called SEXT_L[i]; and the size of Extent EXT_R[i] is called SEXT_R[i].

A description is given of how these sizes SEXT_R[i] and SEXT_R[i] are determined. The Extents in this example are read out into the two buffers (the right-view read buffer and the left-view read buffer) alternately, to be provided to the video decoder. Accordingly, it is necessary to determine the sizes SEXT_R[i] and SEXT_R[i] by taking into consideration the times required to fill up the right-view read buffer and the left-view read buffer. That is to say, it is necessary to determine the capacity of the right-view read buffer to satisfy the following relationship:

Capacity of right-view read buffer=$R$max1×"time required to fill up left-view read buffer with jumps", where "Rmax1" represents the rate of transfer to the right-view read buffer. Here, the "jump" has the same meaning as the disc seek. This is because the continuous areas available for recording in the BD-ROM have a limit, and a left-view video stream and a right-view video stream may not necessarily be recorded to be adjacent to each other, but may be recorded in separate areas.

Next, the "time required to fill up left-view read buffer with jumps" is considered. TS packets are accumulated in the left-view read buffer at a transfer rate of Rud−Rmax2. The "Rud−Rmax2" means a difference between Rmax2 and Rud, where Rmax2 represents the rate of output from the left-view read buffer, and Rud represents the rate of input to the left-view read buffer. Therefore, the time required to fill up the left-view read buffer is represented as "RB2/(Rud−Rmax2)".

Here, when the data is read into the left-view read buffer, it is necessary to take into consideration the jump time (Tjump) required to jump from the right-view AV clip to the left-view AV clip, and the jump time (Tjump) required to jump from the left-view AV clip to the right-view AV clip. Therefore, the time required to fill up the left-view read buffer is represented as:

(2×Tjump+RB2/(Rud−Rmax2).

When the rate of transfer to the right-view read buffer is represented as Rmax1, all source packets in the right-view read buffer should be output at the transfer rate Rmax1, in the above-described accumulation time of the left-view read buffer.

Therefore, the capacity "RB1" of the right-view read buffer is represented as:

$RB1 \geq R\text{max}1 \times [2 \times T\text{jump} + RB2/[\text{Rud} - R\text{max}2]$.

The capacity "RB2" of the left-view read buffer can be obtained in a similar manner and is represented as:

$RB2 \geq R\text{max}2 \times [2 \times T\text{jump} + RB1/[\text{Rud} - R\text{max}1]$.

The specific value of the capacity of each of the right-view read buffer and the left-view read buffer is 1.5 MB or less. In the present embodiment, Extent sizes SEXT_R and SEXT_L are each set to be equal to or substantially equal to the capacity of each of the right-view read buffer and the left-view read buffer. Up to now, how the right-view and left-view AV clips are recorded has been described. Next, the internal structure of the right-view and left-view AV clips will be described. First, the internal structure of Extents EXT_R[i] and EXT_L[i] will be described with reference to FIG. 9.

Extent EXT_L[i] is composed of the following source packets.

A source packet having packet ID "0x01000" constitutes a program_map. A source packet having packet ID "0x01001" constitutes a PCR.

A source packet having packet ID "0x1011" constitutes a left-view video stream.

Source packets having packet IDs "0x1220" through "0x123F" constitute a left-view PG stream.

Source packets having packet IDs "0x1420" through "0x143F" constitute a left-view IG stream.

Source packets having packet IDs "0x1100" through "0x111F" constitute an audio stream.

Extent EXT_R[i] is composed of the following source packets.

A source packet having packet ID "0x1012" constitutes a right-view video stream. Source packets having packet IDs "0x1240" through "0x125F" constitute a right-view PG stream. Source packets having packet IDs "0x1440" through "0x145F" constitute a right-view IG stream.

(Location of Extents in Volume Area)

Extents are formed on a plurality of sectors that are physically continuous in the partition area. The partition area is an area accessed by the file system and includes an "area in which file set descriptor is recorded", "area in which end descriptor is recorded", "ROOT directory area", "BDMV directory area", "JAR directory area", "BDJO directory area", "PLAYLIST directory area", "CLIPINF directory area", and "STREAM directory area". The following explains these areas.

The "file set descriptor" includes a logical block number (LBN) that indicates a sector in which the file entry of the ROOT directory is recorded, among directory areas. The "end descriptor" indicates an end of the file set descriptor.

Next is a detailed description of the directory areas. The above-described directory areas have an internal structure in common. That is to say, each of the "directory areas" is composed of a "file entry", "directory file", and "file recording area of lower file".

The "file entry" includes a "descriptor tag", "ICB tag", and "allocation descriptor".

The "descriptor tag" is a tag that indicates the entity having the descriptor tag is a file entry.

The "ICB tag" indicates attribute information concerning the file entry itself.

The "allocation descriptor" includes a logical block number (LBN) that indicates a recording position of the directory file. Up to now, the file entry has been described. Next is a detailed description of the directory file.

The "directory file" includes a "file identification descriptor of lower directory" and "file identification descriptor of lower file".

The "file identification descriptor of lower directory" is information that is referenced to access a lower directory that belongs to the directory file itself, and is composed of identification information of the lower directorY, the length of the directory name of the lower directory, a file entry address that indicates the logical block number of the block in which the file entry of the lower directory is recorded, and the directory name of the lower directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file.

The file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the JAR directory, BDJO directory, CLIPINF directory, and STREAM directory.

The "file recording area of lower file" is an area in which the substance of the lower file that belongs to a directory. A "file entry" of the lower entry and one or more "Extents" are recorded in the "file recording area of lower file".

The "file entry" includes a "descriptor tag", "ICB tag", and "allocation descriptor".

The "descriptor tag" is a tag that indicates the entity having the descriptor tag is a file entry. The tag is classified into a file entry descriptor, a space bit map descriptor, and the like. In the case of the file entry, "261" indicating the file entry is described in the descriptor tag.

The "ICB tag" indicates attribute information concerning the file entry itself.

The "allocation descriptor" includes a logical block number (LBN) that indicates a recording position of an Extent that constitutes a lower file belonging to a directory. The allocation descriptor includes data indicating an Extent length, and a logical block number that indicates a recording position of an Extent. Here, when the higher two bits of the data indicating the Extent length are set to "0", it is indicated that the Extent is an assigned and recorded Extent; and when the higher two bits are set to "1", it is indicated that the Extent is an assigned and not-recorded Extent. When they are set to "0", it is indicated that the Extent is an Extent that continues from the allocation descriptor. When a lower file belonging to a directory is sectioned into a plurality of Extents, the file entry has a plurality of allocation descriptors for each Extent.

By referring to the allocation descriptors of the above-described file entries, it is possible to recognize addresses of Extents that constitute the playlist information file, clip information file, transport stream file, BD-J object file, and JAR archive file.

The transport stream file that constitutes the main feature of the present application is a file recording area that exists in the directory area of the directory to which the file belongs. It is possible to access the transport stream file by tracing the file identification descriptors of the directory files, and the allocation descriptors of the file entries.

The above-described AV stream, Index.bdmv, JAR file, and BD-J object are recorded on the BD-ROM in accordance with the file structure and the directory structure. Therefore, the playback device can read out these into the memory by performing a system call for the file open.

Here, the file open is a process in which directories are searched for a file with use of a file name that is given by the system call, and if the file is detected, FCB (File Control Block) is ensured, and the number of file handle is returned. The FCB is generated by copying the contents of the directory entry of the target file, onto the memory. In this file open, the transport stream file with extension "m2ts" is identified by a file path using the STREAM directory, and the transport stream file with extension "ssif" is identified by a file path using the STREAM directory and the SSIF directory. This is because the transport stream files with extension "ssif" are stored in the STREAM directory and the SSIF directory.

The following describes how the Extents shown in FIG. 9 are dealt with in the above-described file structure.

Figure 10:
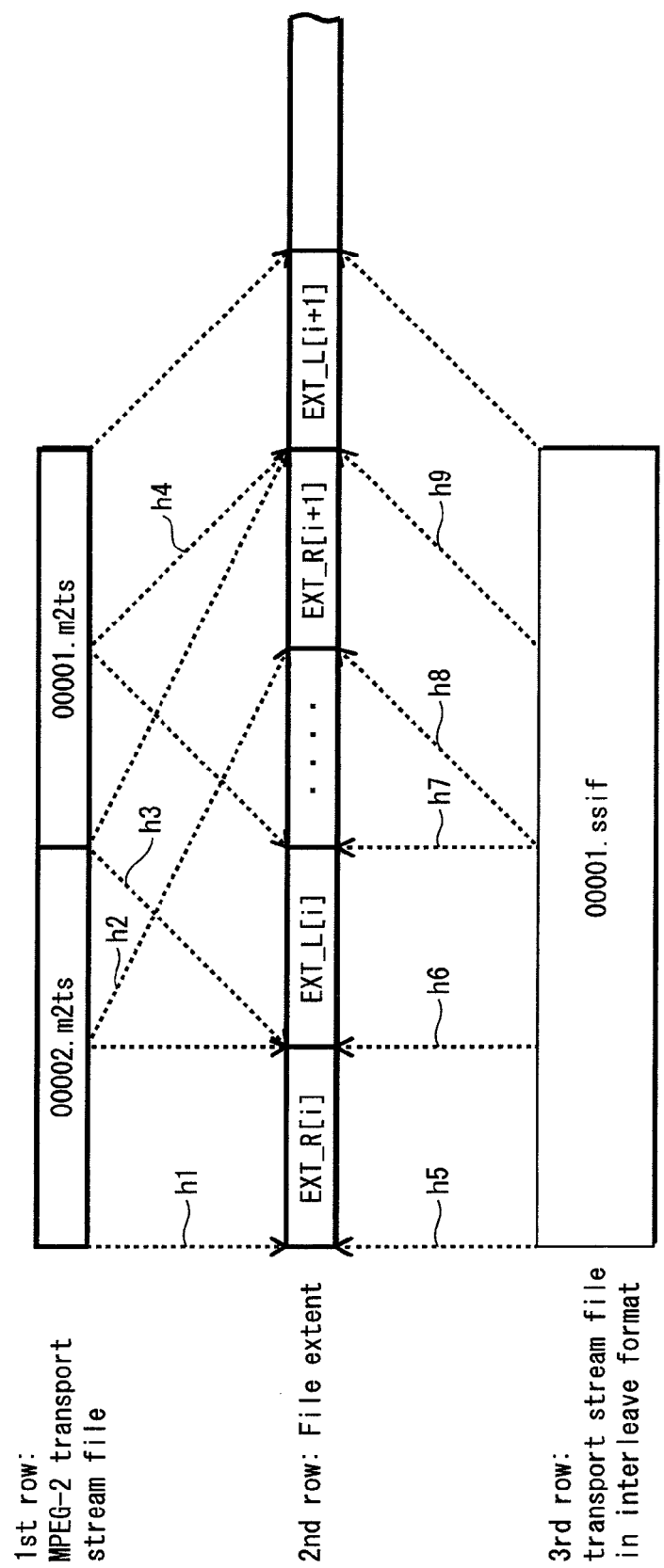
FIG. 10 shows the correspondence between the Extents and the transport stream files.

FIG. 10 shows the correspondence between the Extents and the transport stream files.

The first row shows transport stream files "00001.m2ts" and "00002.m2ts" that are in an ordinary transport stream format. The second row shows right-view and left-view Extents. The third row shows transport stream file "00001.ssif" in the interleave format.

The dotted arrows h1, h2, h3, and h4 indicate to which files Extents EXT_R[i] and EXT_L[i] belong, by the allocation identifiers. It is understood from the belonging relationships indicated by the arrows h1 and h2 that Extents EXT_L[i] and EXT_L[i+1] are registered as Extents of "00001.m2ts".

It is understood from the belonging relationships indicated by the arrows h3 and h4 that Extents EXT_R[i] and EXT_R[i+1] are registered as Extents of "00002.m2ts".

It is understood from the belonging relationships indicated by the arrows h5, h6, h7, and h8 that Extents EXT_R[i], EXT_L[i], EXT_R[i+1], and EXT_L[i+1] are registered as Extents of "00001.ssif". It is understood from this description that Extents EXT_L[i] and EXT_L[i+1] have duality in that they belong to both "00001.ssif" and "00001.m2ts". The extension "ssif" stands for StereoScopic Interleave File, and indicates that the file is in the interleave format for the stereoscopic playback.

Figure 11:
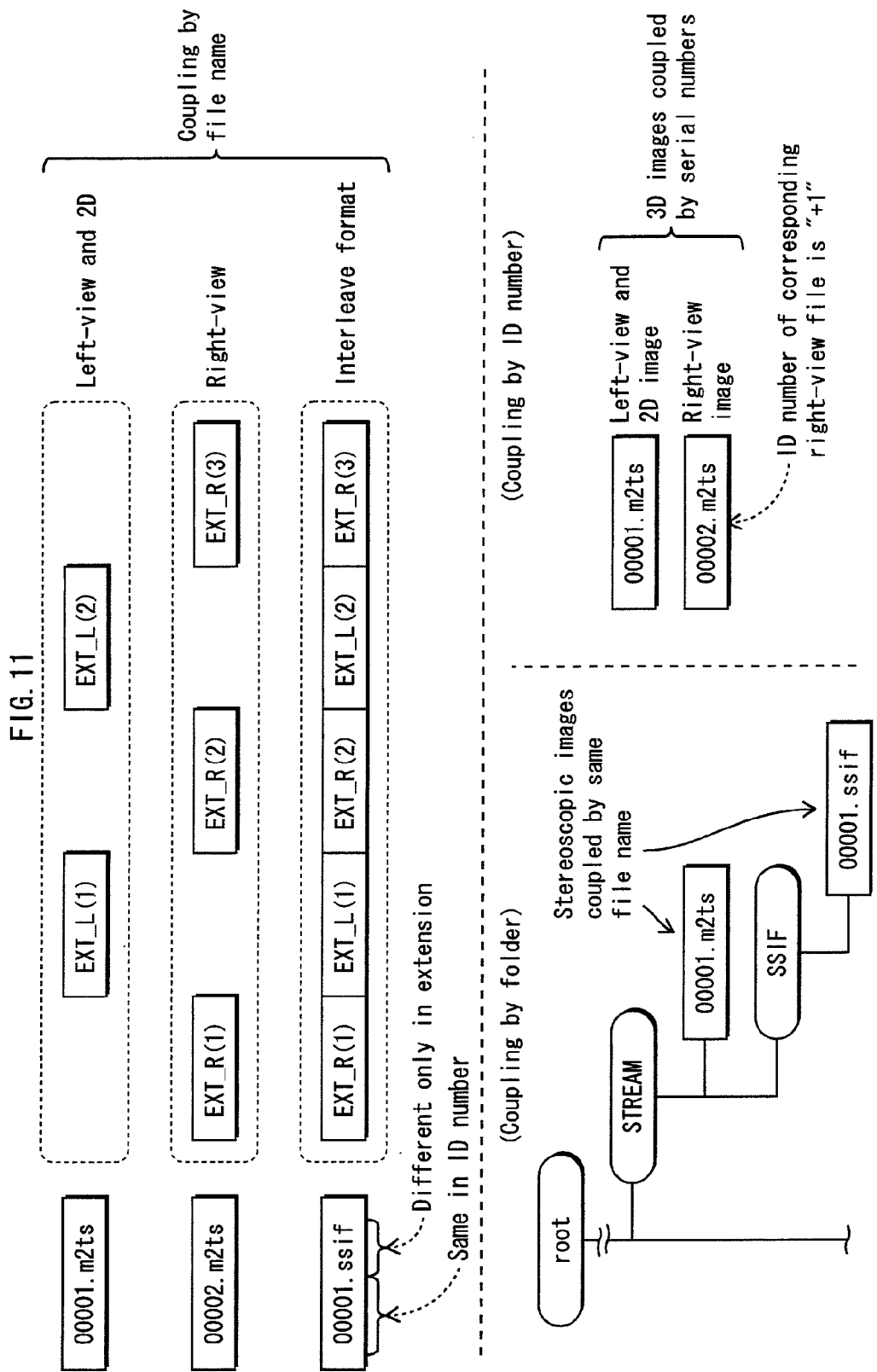
FIG. 11 shows methods for coupling a transport stream file in the interleaved format and a transport stream file for the left-view.

FIG. 11 shows methods for coupling a left-view AV clip and a right-view AV clip that correspond to each other.

The upper part of FIG. 11 shows the Extents that constitute respective transport stream files.

Of these, Extents EXT_L[i] and EXT_L[i+1] are played back as a 2D image.

Not all playback devices necessarily support the 3D playback system. Therefore, it is preferable that even a BD-ROM including a 3D image supports a 2D playback. It should be noted here that the playback devices supporting only the 2D playback do not identify the data structure extended for the 3D. The 2D playback devices need to access only the 2D playlists and 2D AV clips by using a conventional identification method provided to the 2D playback devices. In view of this, the left-view video streams are stored in a file format that can be recognized by the 2D playback devices.

There are a plurality of methods for coupling a left-view AV clip with a right-view AV clip. According to the first method, the left-view file is assigned with the same file name as that in the 2D playback system so that the left-view file can be used in the 2D playback as well, and transport stream files in the interleave format have a different extension. The lower-left part of FIG. 11 shows that files "000001.m2ts" and "000001.ssif" are coupled with each other by the same file name "000001", although the former is in the 2D format and the latter is in the 3D format.

In a conventional 2D playback device, the playlist refers to only the left-view AV clips, and therefore the 2D playback device plays back only the AV clips for 2D. On the other hand, In a 3D playback device, although the playlist refers to only the left-view AV clips, when it finds a file that has the same identification number and a different extension, it judges that the file is a transport stream files in the interleave format for the 3D image, and outputs left view and right view.

The second method is to use different folders. The left-view files are stored in folders with conventional folder names (for example, "STREAM"), but right-view files are stored in folders with folder names unique to 3D (for example, "SSIF"), with the same file name "00001". In the 2D playback device, the playlist refers to only files in the "STREAM" folder, but in the 3D playback device, the playlist refers to files having the same file name in the "STREAM" and "SSIF" folders simultaneously, making it possible to associate the left view and the right view.

The third method uses the identification numbers. That is to say, this method associates the files based on a predetermined rule regarding the identification numbers. For example, when the identification number of the left view is "00001", the identification number of the right view is "00002" that is made by adding "1" to the identification number of the left view. This is only one example, and not limited to this, for example, the identification number of the right view may be made by adding "10000" to the identification number of the left view.

In this example, the images to be played back by conventional 2D playback devices are left-view images. However, the images may be right-view images. Also, the playlist may include information that indicates which of the left-view image and the right-view image is defined as the image to be played back by conventional 2D playback devices.

When a coupling method is to be realized, the playback device side requires a mechanism for detecting the coupled files, and a mechanism for detecting the file based on a predetermined rule, and playing back files that are not referenced by the playlist. The 3D supporting playback devices require the above-described mechanisms when they use any of such coupling methods. However, with this structure, there is no need for using different types of playlists to play back both the 2D and 3D images, and it is possible to make the playlist operate safely in the conventional 2D playback devices that are already prevalent.

Up to now, transport stream files storing AV clips have been described. Next is a detailed description of how to record the above-described transport stream files into the recording medium, namely, the procedure for writing the AV files into the AV data area (AV file writing process).

Figure 12:
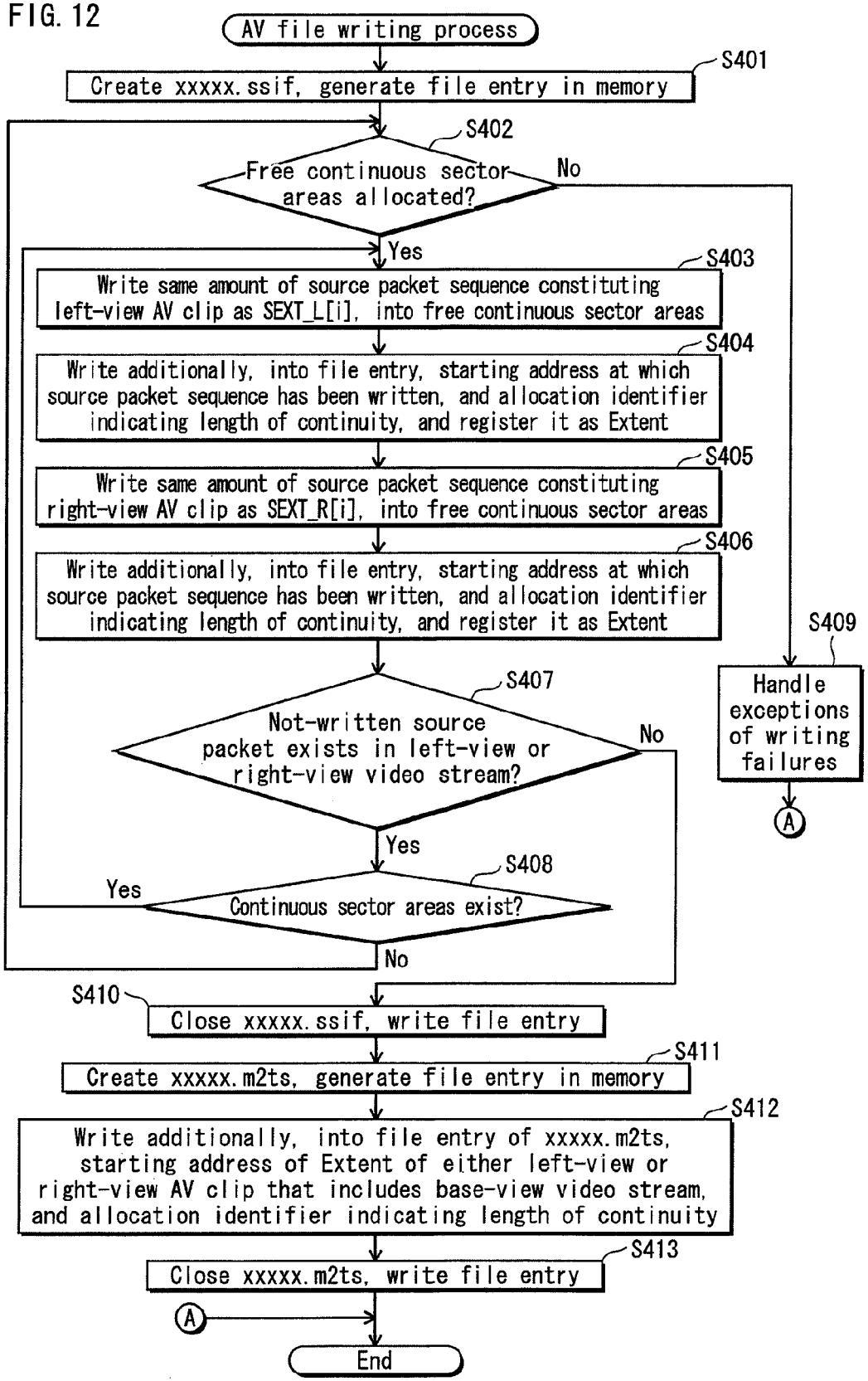
FIG. 12 is a flowchart of the AV file writing process.

FIG. 12 is a flowchart of the AV file writing process.

In step S401, "xxxxx.ssif" is created, and a file entry is generated in the memory of the recording device. In step S402, it is judged whether or not free continuous sector areas have been allocated. When it is judged that free continuous sector areas have been allocated, steps S403 through S408 are performed. When it is judged that free continuous sector areas have not been allocated, the control goes to step S409 in which exceptions of writing failures are handled, and the recording method is ended.

Steps S403 through S408 form a loop in which the process of steps S403 through S406 and S408 is repeated until it is judged "No" in step S407.

In step S403, the same amount of a source packet sequence constituting the left-view AV clip as SEXT_L[i] is written into the free continuous sector areas. In step S404, the starting address at which the source packet sequence has been written, and the allocation identifier indicating the length of continuity, are additionally written into the file entry, and is registered as an Extent.

In step S405, the same amount of a source packet sequence constituting the right-view AV clip as SEXT_R[i] is written into the free continuous sector areas. In step S406, the starting address at which the source packet sequence has been written, and the allocation identifier indicating the length of continuity, are additionally written into the file entry, and is registered as an Extent.

Step S407 defines the condition for ending the loop. In step S407, it is judged whether or not a not-written source packet exists in the left-view video stream or the right-view video stream. When a not-written source packet exists, the control moves to step S408 to continue the process in the loop. When a not-written source packet does not exist, the control moves to step S410.

In step S408, it is judged whether or not continuous sector areas exist. When continuous sector areas exist, the control moves to step S403. When continuous sector areas do not exist, the control returns to step S402.

In step S410, "xxxxx.ssif" is closed, and the file entry is written into the recording medium. In step S411, "xxxxx.m2ts" is created, and a file entry of "xxxxx.m2ts" is generated in the memory. In step S412, the starting address of an Extent of either the left-view AV clip or the right-view AV clip that includes the base-view video stream, and the allocation identifier indicating the length of continuity, are additionally written into the file entry of "xxxxx.m2ts". In step S413, "xxxxx.m2ts" is closed, and the file entry is written.

This completes the explanation of the AV file writing process. Next is a description of the clip information file.

<Clip Information File>

Figure 13:
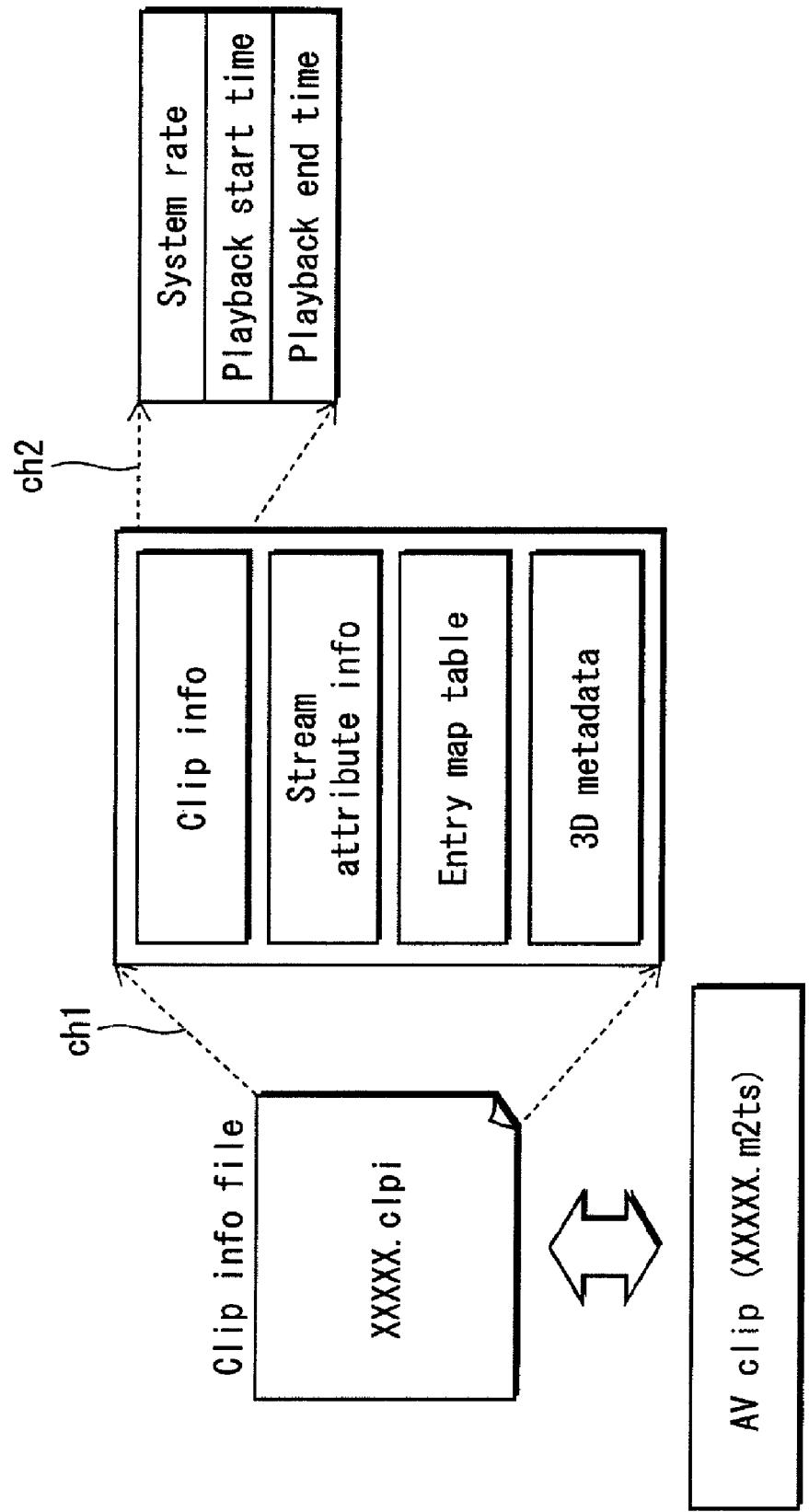
FIG. 13 shows the internal structure of the clip information file.

FIG. 13 shows the internal structure of the clip information file. As shown in FIG. 13, each clip information file is management information for an AV clip, and the clip information files correspond to the AV clips on a one-to-one basis. The lead line ch1 indicates the close-up of the internal structure of the clip information file. As indicated by the lead line ch1, the clip information file is composed of "clip information", "stream attribute information", "entry map table", and "3D metadata".

As indicated by the lead line ch2, the clip information is composed of "system rate", "playback start time", and "playback end time". The system rate indicates a maximum transfer rate at which TS packets constituting an AV clip are transferred to the PID filter of the system target decoder which will be described later. The interval between ATSs included in an AV clip is set to be equal to or smaller than the system rate. The playback start time is a PTS of the starting video frame of the AV clip. The playback end time is set to a value that is obtained by adding one frame of playback interval to the PTS of the ending video frame of the AV clip.

Figure 14:
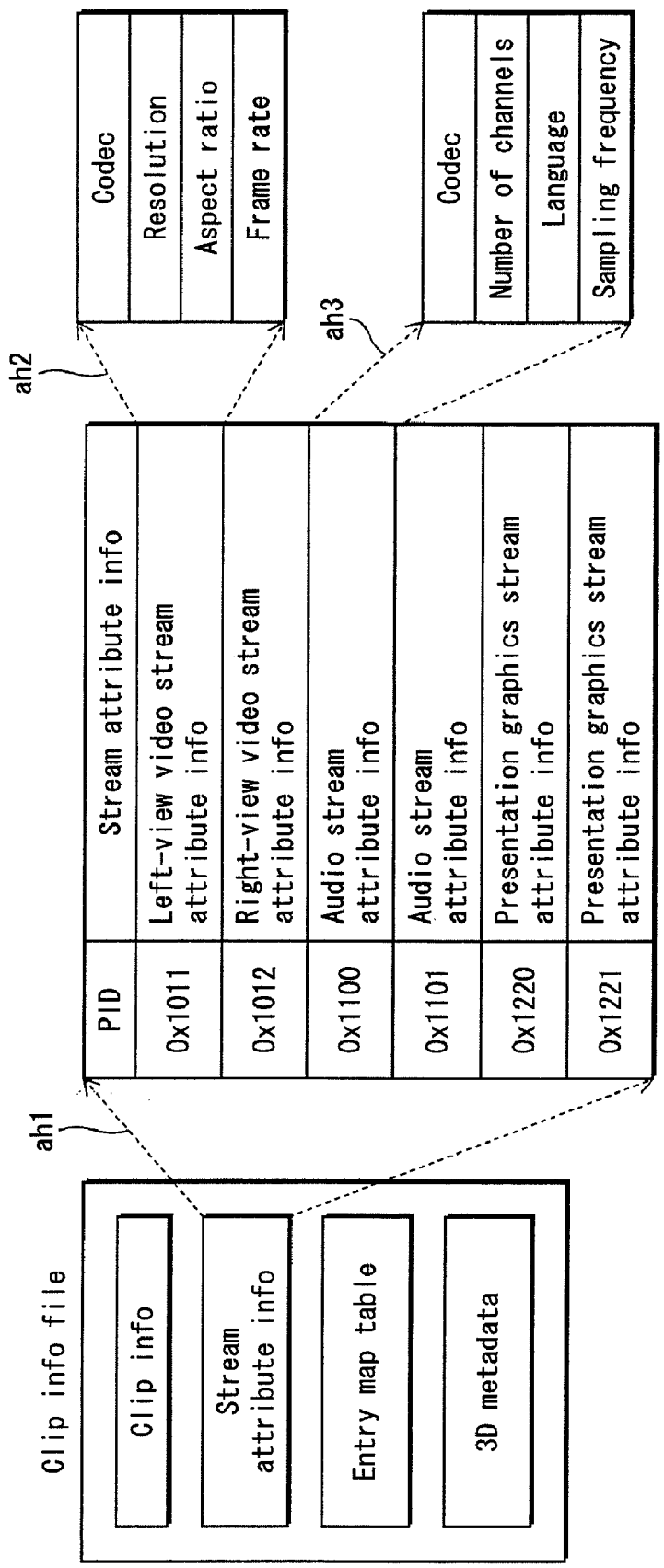
FIG. 14 shows the stream attribute information included in the clip information file.

FIG. 14 shows the stream attribute information included in the clip information file.

The lead line ah1 indicates the close-up of the internal structure of the stream attribute information.

As indicated by the lead line ah1, the stream attribute information includes: stream attribute information of the left-view video stream constituted from the TS packet having packet ID "0x1011"; stream attribute information of the right-view video stream constituted from the TS packet having packet ID "0x1012"; stream attribute information of the audio stream constituted from the TS packets having packet IDs "0x1100" and "0x1101"; and stream attribute information of the PG stream constituted from the TS packets having packet IDs "0x1220" and "0x1221". As understood from this, the stream attribute information indicates what attributes the PES streams have, where the PES streams are constituted from a plurality of types of source packets. As indicated by the lead line ah1, attribute information of each stream included in the AV clip is registered for each PID.

Figure 15A:
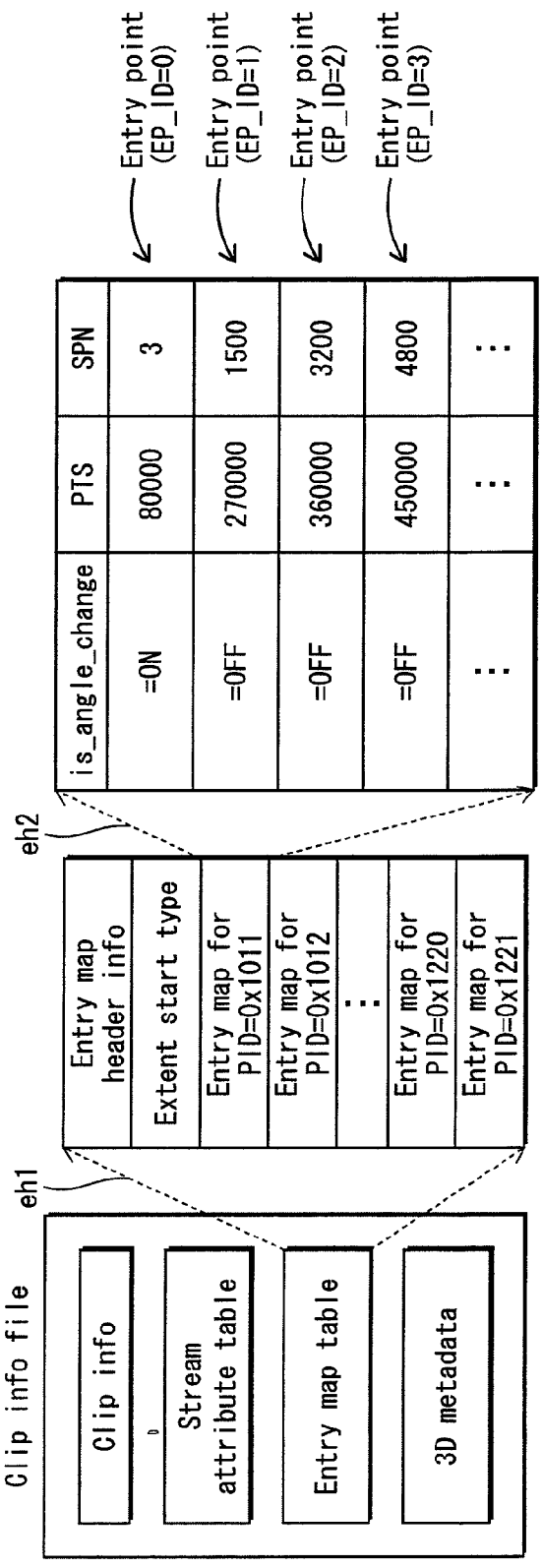
FIGS. 15A and 15B show the entry map table in the clip information file.
Figure 15B:
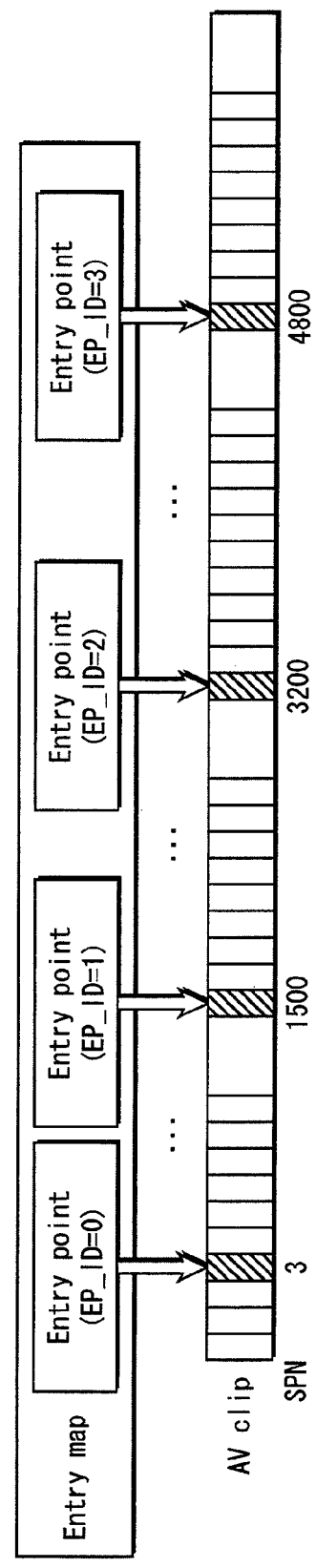

FIGS. 15A and 15B show the entry map table included in the clip information file.

FIG. 15A shows an outline of the structure of the entry map table. The lead line eh1 indicates the close-up of the internal structure of the entry map table. As indicated by the lead line eh1, the entry map table includes "entry map table header information", "Extent start type", "entry map for PID=0x1011", "entry map for PID=0x1012", "entry map for PID=0x1220", and "entry map for PID=0x1221".

The "entry map table header information" stores information such as the PIDs of video stream indicated by the entry maps, and values of entry points.

The "Extent start type" indicates which of an Extent constituting the left-view video stream and an Extent constituting the right-view video stream is disposed first.

The "entry map for PID=0x1011", "entry map for PID=0x1012", "entry map for PID=0x1220", and "entry map for PID=0x1221" are entry maps for each PES stream constituted from a plurality of types of source packets. Each entry map includes "entry points", each of which is composed of a pair of PTS and SPN values. Also, and identification number of the entry point is called an "entry point ID" (hereinafter referred to as EP_ID), where the EP_ID of the first entry point is "0", and after this, the EP_ID for each entry point in the serial order is incremented by "1". By using the entry maps, the playback device can identify a source packet position corresponding to an arbitrary position on the time axis of the video stream. For example, when a special playback such as a fast forward or rewinding is to be performed, I-pictures registered in the entry maps can be identified, selected, and played back. This makes it possible to process efficiently without analyzing the AV clip. Also, the entry maps are created for each video stream which is multiplexed in the AV clip, and are managed by the PIDs.

The lead line eh2 indicates the close-up of the internal structure of the entry map for PID=0x1011. The entry map for PID=0x1011 includes entry points corresponding to EP_ID=0, EP_ID=1, EP_ID=2, and EP_ID=3. The entry point corresponding to EP_ID=0 indicates a correspondence among the is_angle_change flag having been set to "ON", SPN=3, and PTS=80000. The entry point corresponding to EP_ID=1 indicates a correspondence among the is_angle_change flag having been set to "OFF", SPN=1500, and PTS=270000.

The entry point corresponding to EP_ID=2 indicates a correspondence among the is_angle_change flag having been set to "OFF", SPN=3200, and PTS=360000. The entry point corresponding to EP_ID=3 indicates a correspondence among the is_angle_change flag having been set to "OFF", SPN=4800, and PTS=450000. Here, the is_angle_change flag indicates whether or not it is possible to decode independent of the entry point itself. When the video stream has been encoded by the MVC or MPEG-4AVC and an IDR picture exists in the entry point, this flag is set to "ON". When a Non-IDR picture exists in the entry point, this flag is set to "OFF".

FIG. 15B shows which source packets are indicated by the entry points included in the entry map corresponding to the TS packet having the PID=0x1011 shown in FIG. 15A. The entry point corresponding to EP_ID=0 indicates SPN=3, and this source packet number is associated with PTS=80000. The entry point corresponding to EP_ID=1 indicates SPN=1500, and this source packet number is associated with PTS=270000.

The entry point corresponding to EP_ID=2 indicates SPN=3200, and this source packet number is associated with PTS=360000. The entry point corresponding to EP_ID=3 indicates SPN=4800, and this source packet number is associated with PTS=450000.

FIG. 16 shows how entry points are registered in an entry map. The first row of FIG. 16 shows the time axis defined by the STC sequence. The second row shows the entry map included in the clip information. The third row shows a source packet sequence constituting the ATC sequence. When the entry map specifies a source packet corresponding to SPN=n1 among the ATC sequence, the PTS of the entry map is set to "PTS=t1" on the time axis of the STC sequence. With this arrangement, it is possible to cause the playback device to perform a random access to the source packet corresponding to SPN=n1 in the ATC sequence at the time "PTS=t1". Also, when the entry map specifies a source packet corresponding to SPN=n21 among the ATC sequence, the PTS of the entry map is set to "PTS=t21" on the time axis of the STC sequence. With this arrangement, it is possible to cause the playback device to perform a random access to the source packet corresponding to SPN=n21 in the ATC sequence at the time "PTS=t21".

By using the entry maps, the playback device can identify a file position of AV clip corresponding to an arbitrary position on the time axis of the video stream. For example, when a special playback such as a fast forward or rewinding is to be performed, I-pictures registered in the entry maps can be identified, selected, and played back. This makes it possible to process efficiently without analyzing the AV clip.

This completes the explanation of the entry map table. Next is a detailed description of the 3D metadata.

The 3D metadata is a group of metadata defining various information that are required for the stereoscopic playback. The 3D metadata includes a plurality of offset entries. Each offset entry is associated with a plurality of PIDs and a plurality of display times. When a PES stream is to be played back, it is possible to define, for each PID and for each display time, how much offsets should be used to realize the stereoscopic view at a plurality of display times of the PES stream.

This completes the explanation of the clip information file. Next is a detailed description of the playlist information.

It is difficult to switch seamlessly between the 2D playback and the 3D playback due to the difference between them in the structure of the decoder and display plane. It is thus difficult to switch seamlessly between the 2D playitem and the 3D playitem.

Figure 17:
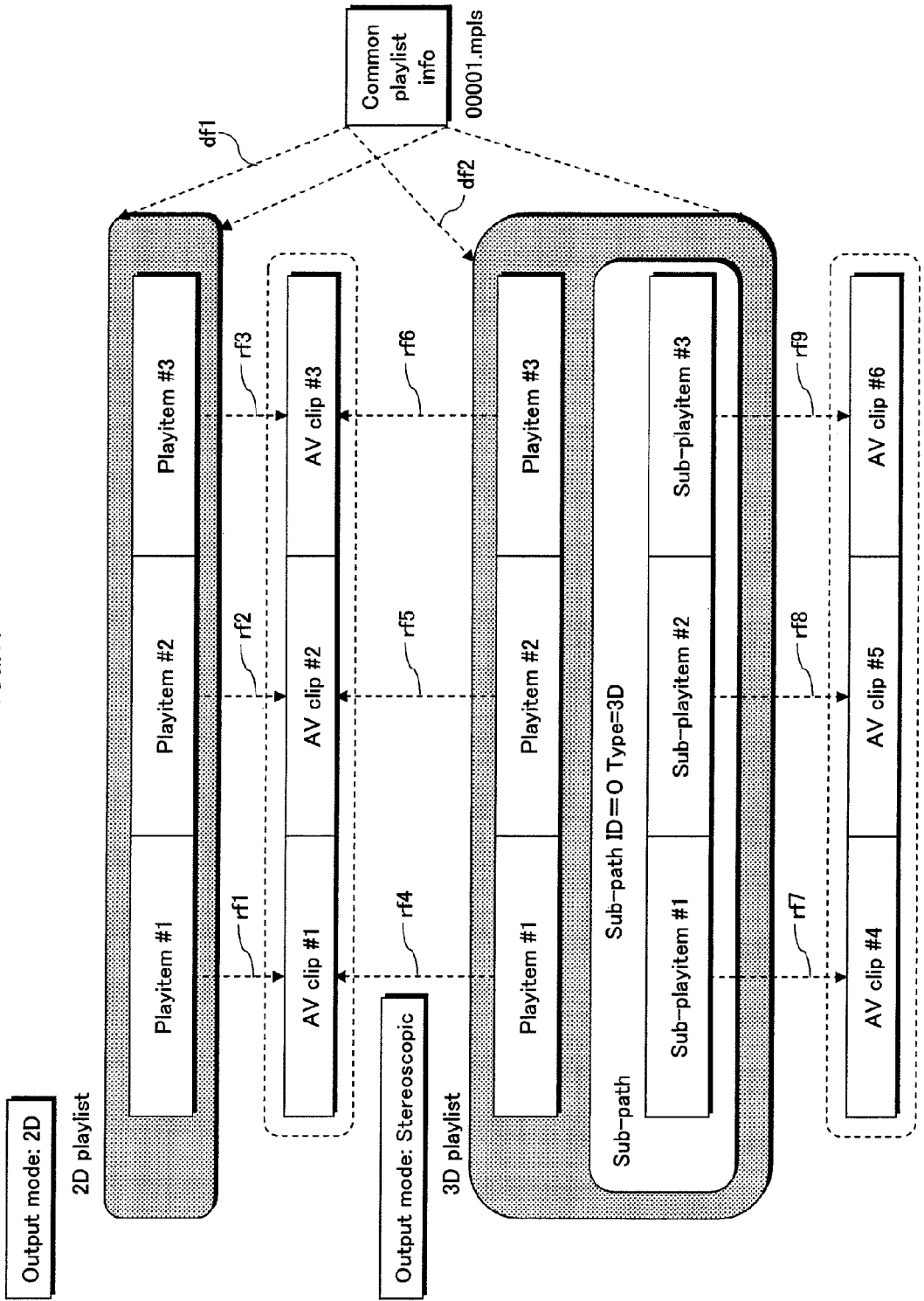
FIG. 17 shows a playlist in which 2D playitems and 3D playitems are not mixed.

FIG. 17 shows a playlist in which 2D playitems and 3D playitems are not mixed. With this arrangement, the playback device does not need to change the playback environment. The playlist in this example includes a "main path" and one or more "sub-paths".

The "main path" includes one or more playitems. In the example shown in FIG. 17, the main path is composed of playitems #1, #2, and #3.

The "sub-paths" indicate playback paths that are played back together with the main path. The sub-paths are assigned with IDs (sub-path IDs) in the order of registration in the playlist. The sub-path ID is used to identify a sub-path. The sub-path is classified into the sync type and the non-sync type, where the sub-path of the sync type is played back in synchronization with the main path, and the sub-path of the non-sync type is played back not in synchronization with the main path. Either of the types is described in the "sub-path type". The sub-path includes one or more sub-playitems, and each sub-playitem includes one or more pieces of sub-playitem information.

The "playitem" includes a stream selection table. The stream selection table is information indicating stream numbers of elementary streams that are permitted to be played back by the playitems and sub-playitems. Details of the playlist information, playitem information, sub-playitem information, and stream selection table will be described in later embodiments.

AV clips #1, #2, and #3 are played back as 2D images, and are played back as left-view images in the 3D playback.

AV clips #4, #5, and #6 are played back as right-view images in the 3D playback.

The main path of the 2D playlist refers to AV clips #1, #2, and #3 storing the left-view AV clips, as indicated by signs rf1, rf2, and rf3.

The 3D playlist includes a main path that refers to left-view AV clips as indicated by signs rf4, rf5, and rf6. The 3D playlist also includes a sub-path that refers to right-view AV clips. The sub-path refers to AV clips #4, #5, and #6 storing the right-view AV clips, as indicated by signs rf7, rf8, and rf9. The sub-path is set to synchronize with the main path on the time axis. With this structure, the 2D playlist and the 3D playlist can share the left-view AV clips, and the 3D playlist can associate the left-view AV clips with the right-view AV clips to synchronize with each other on the time axis.

In this example shown in FIG. 17, the playitems #1, #2, and #3 in the 2D playlist and the playitems #1, #2, and #3 in the 3D playlist both refer to the AV clips #1, #2, and #3. As a result, when the playlist information that defines the 2D playlist and the 3D playlist is to be described, it is possible to use a description that is common to the 2D playlist and the 3D playlist (see signs df1 and df2). Accordingly, by preliminarily describing the playlist information for realizing the 3D playlist, the playlist functions as the 3D playlist when the playback device is in the stereoscopic output mode, and functions as the 2D playlist when the playback device is in the 2D output mode. The 2D playlist and the 3D playlist shown in FIG. 17 are therefore interpreted as the 2D playlist and the 3D playlist respectively depending on the output mode of the playback device that interprets the playlist. This structure reduces the trouble of authoring that should be performed by a person in charge.

Figure 18:
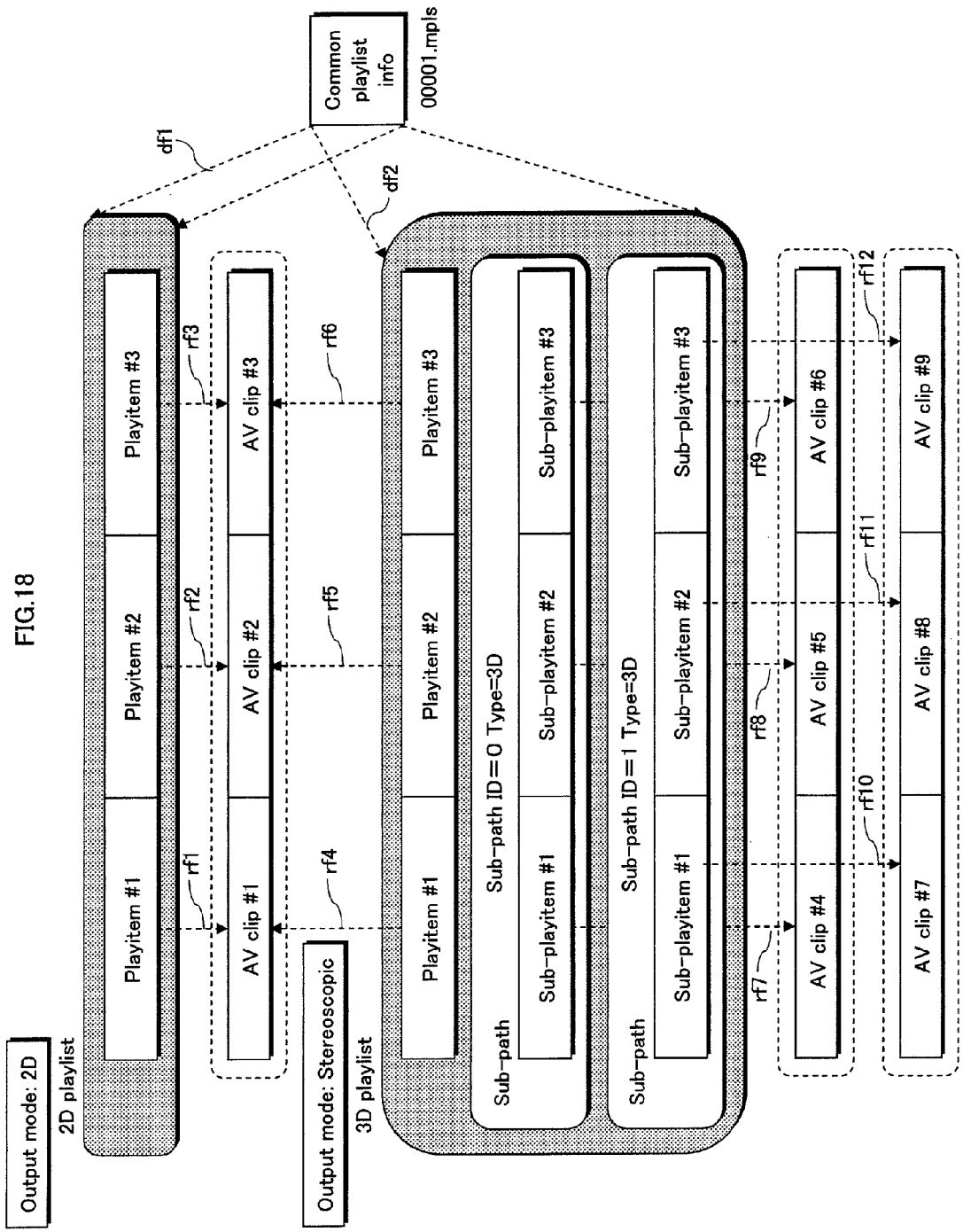
FIG. 18 shows playlists, where the 3D playlist has one more sub-path compared with the 3D playlist shown in FIG. 17.

FIG. 18 shows playlists, where the 3D playlist has one more sub-path compared with the 3D playlist shown in FIG. 17. The 3D playlist shown in FIG. 17 includes only one sub-path that corresponds to sub-path ID=0, while the 3D playlist shown in FIG. 18 additionally includes a sub-path that corresponds to sub-path ID=1 and refers to AV clips #7, #8, and #9. Two or more sub-paths for defining the right-view can define as many different angles of the right-views. Also, as many groups of AV clips as the number of angles are prepared, and sub-paths are provided in one-to-one correspondence with the angles.

In the example shown in FIG. 18, AV clips #1, #2, and #3 and AV clips #4, #5, and #6 both store right views, but are different in the angle at which the right eye view the subject.

The sub-path that corresponds to sub-path ID=0 refers to AV clips #4, #5, and #6, as indicated by signs rf7, rf8, and rf9, and the sub-path that corresponds to sub-path ID=1 refers to AV clips #7, #8, and #9, as indicated by signs rf10, rf11, and rf12. With this structure, it is possible to select a sub-path that is to be played back in synchronization with the main path storing the left view, based on the size of the screen of the display device and the preference indicated by the user. This makes it possible to display a stereoscopic image by using a parallax image that is comfortable to the user.

In regards with the playlist information for realizing the 3D playlist having the above-described structure, the playlist functions as the 3D playlist when the playback device is in the stereoscopic output mode, and functions as the 2D playlist when the playback device is in the 2D output mode. The 2D playlist and the 3D playlist shown in FIG. 18 are therefore interpreted as the 2D playlist and the 3D playlist respectively depending on the output mode of the playback device that interprets the playlist, providing optimum outputs. This structure reduces the trouble of authoring that should be performed by a person in charge.

Figure 19:
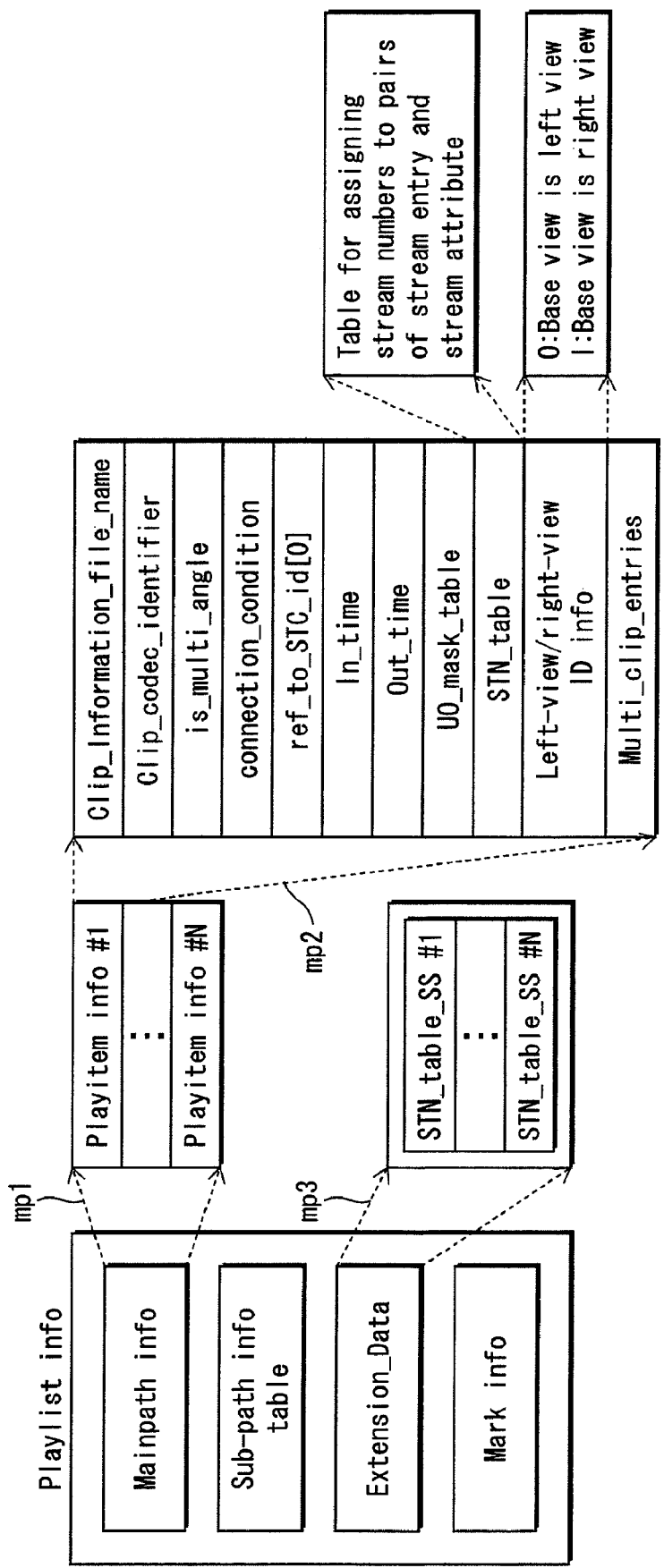
FIG. 19 shows the data structure of the playList information.

FIG. 19 shows the data structure of the playList information. As indicated by the lead line mp1 in FIG. 19, the playList information includes: "MainPath information", "SubPath information table", "Extension_Data", and "Mark information".

First, a description is given of the MainPath information. The lead line mp1 indicates the close-up of the internal structure of the MainPath information. As indicated by the lead line mp1, the MainPath information is composed of a plurality of pieces of PlayItem information: PlayItem information #1, . . . #N. The PlayItem information defines one or more logical playback sections that constitute the MainPath. The lead line hs1 in the drawing indicates the close-up of the structure of the PlayItem information. As indicated by the lead line hs1, the PlayItem information is composed of: "Clip_Information_file_name" that indicates the file name of the playback section information of the AVClip to which the IN point and the OUT point of the playback section belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id[0]" that indicates uniquely the STC_Sequence targeted by the PlayItem; "In_time" that is time information indicating the start point of the playback section; "Out_time" that is time information indicating the end point of the playback section; "UO_mask_table" that indicates which user operation should be masked by the PlayItem; "STN_table"; "left-view/right-view identification information"; and "multi_clip_entry".

The following describes the "STN_table", "left-view/right-view identification information", and "multi_clip_entry".

The "STN_table (Stream Number_table)" is a table in which logical stream numbers are assigned to pairs of (i) a stream entry including a packet ID and (ii) a stream attribute. The order of the pairs of a stream entry and a stream attribute in the STN_table indicates a priority order of the corresponding streams. This STN_table is provided for the 2D playback, and an STN_table for the 3D playback is provided independent of this table.

The "left-view/right-view identification information" is base-view video stream specification information that specifies which of the left-view video stream and the right-view video stream is the base-view video stream. When it is "0", the left-view/right-view identification information indicates that the base-view video stream is the left-view video stream; and when it is "1", the left-view/right-view identification information indicates that the base-view video stream is the right-view video stream.

The "connection_condition" indicates a forward PlayItem and a connection type. When the connection_condition of a PlayItem is "1", it indicates that the AV clip specified by the Playitem is not ensured to be connected seamlessly with the AV clip specified by the Playitem that precedes the Playitem. When the connection_condition of a Playitem is "5" or "6", it indicates that the AV clip specified by the Playitem is ensured to be connected seamlessly with the AV clip specified by the Playitem that precedes the Playitem.

When the connection_condition is "5", the STCs between Playitems may be discontinuous. That is to say, the video display start time of the start of the starting AV clip of the post-connection Playitem may be discontinuous from the video display end time of the end of the ending AV clip of the pre-connection Playitem. It should be noted here that the AV clips need to be generated so that the decoding by the system target decoder does not fail when a playback is performed after the AV clip of the post-connection Playitem is input into the PID filter of the system target decoder immediately after the AV clip of the pre-connection Playitem is input into the PID filter of the system target decoder, where the system target decoder will be described later. Also, there are some limiting conditions. For example, the audio end frame of the AV clip of the pre-connection Playitem should overlap, on the playback time axis, with the audio start frame of the post-connection Playitem.

When the connection_condition is "6", an AV clip of the pre-connection Playitem connected with an AV clip of the post-connection Playitem should be able to be played back as one AV clip. That is to say, the STCs should be continuous and the ATCs should be continuous through the AV clips of the pre-connection Playitem and post-connection Playitem.

The "multi_clip_entry" is information that identifies AV clips representing images of different angles when a multi-angle section is formed by the Playitem.

This completes the description of the main path information. Next, a detailed description is given of the sub-path information table.

Figure 20:
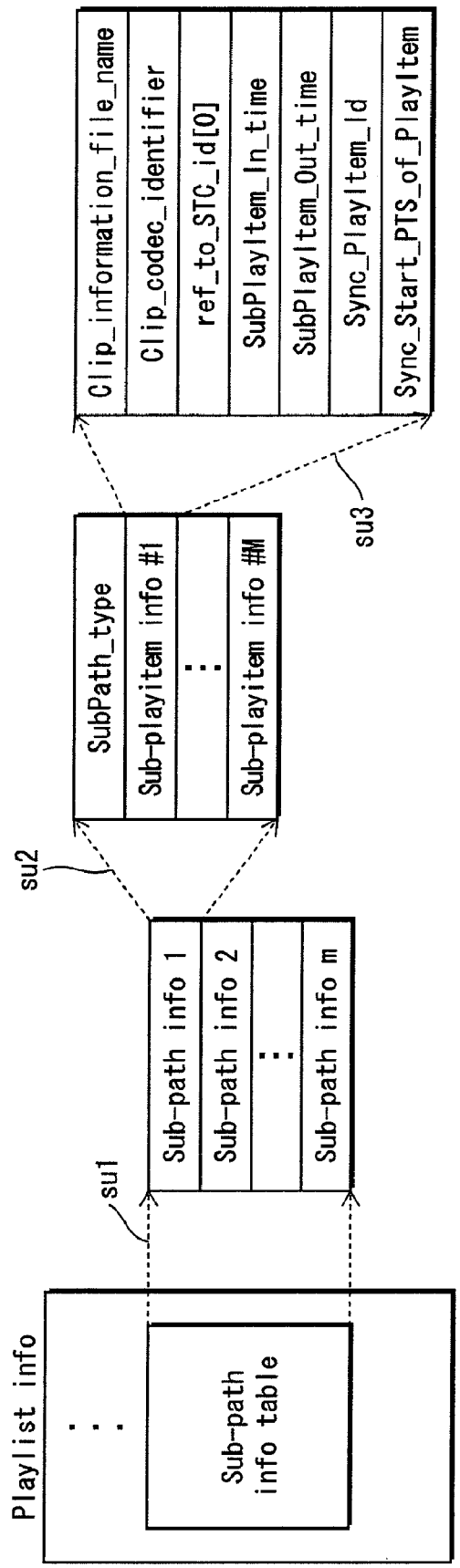
FIG. 20 shows the internal structure of the Subpath information table.

FIG. 20 shows the internal structure of the Subpath information table. The lead line su1 indicates the close-up of the internal structure of the clip information table. As indicated by the lead line su1, the clip information table includes a plurality of pieces of sub-path information 1, 2, 3, . . . m. These pieces of sub-path information are instances that have derived from one class structure, and the pieces of sub-path information have a common internal structure. The lead line su2 indicates the close-up of the internal structure that is common to the pieces of sub-path information. As indicated by the lead line su2, each piece of SubPath information includes: SubPath_type that indicates the type of sub-path; and one or more pieces of SubPlayItem information (SubPlayItem information #1 . . . "m). The lead line su3 indicates the close-up of the structure of the SubPlayItem information. As the lead line su3 indicates, the SubPlayItem information includes: "Clip_information_file_name", "Clip_codec_identifier", "ref_to_STC_id[0]", "SubPlayItem_$_{In}$_time", "SubPlayItem_Out_time", "sync_PlayItem_id", and "sync_start_PTS_of_PlayItem". The following is a description of the internal structure of the SubPlayItem information.

The "Clip_information_file_name" is information that, with the file name of Clip information written therein, uniquely specifies a SubClip that corresponds to the SubPlayItem.

The "Clip_codec_identifier" indicates an encoding method of the AVClip.

The "ref_to_STC_id [0]" uniquely indicates a STC_Sequence that is the target of the SubPlayItem.

The "SubPlayItem_In_time" is information that indicates the start point of SubPlayItem in the playback time axis of the SubClip.

The "SubPlayItem_Out_time" is information that indicates the end point of SubPlayItem in the playback time axis of the SubClip.

The "sync_PlayItem_id" is information that uniquely specifies, among PlayItems constituting the MainPath, a PlayItem with which the SubPlayItem is to be synchronized. The "SubPlayItem_In_time" is present on the playback time axis of the PlayItem specified by the "sync_PlayItem_id".

The "syn.c_start_PTS_of_PlayItem" indicates, with the time accuracy of 45 KHz, the position of the start point of the SubPlayItem specified by the SubPlayItem_In_time, on the playback time axis of the PlayItem specified by the "sync_PlayItem_id".

Figure 21:
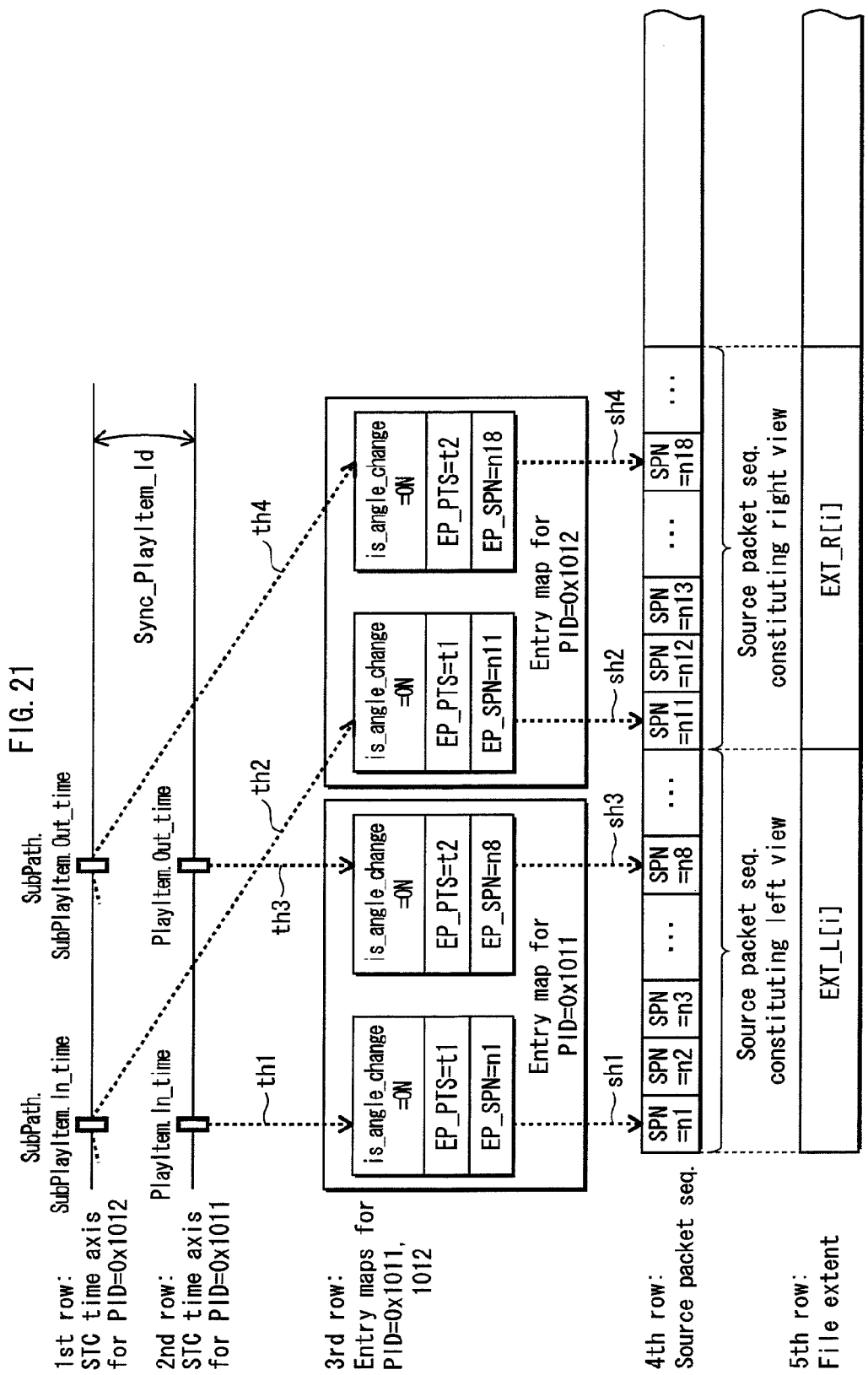
FIG. 21 shows playback sections defined for the left and right views.

FIG. 21 shows playback sections defined for the left and right views. FIG. 21 is based on FIG. 16. The second row of FIG. 21 shows a time axis on which In_Time and Out_Time of PlayItem are indicated in correspondence with FIG. 16. Similarly, the first row of FIG. 21 shows a time axis on which In_Time and Out_Time of SubPlayItem are indicated. The third to fifth rows of FIG. 21 also correspond to FIG. 16. The I-pictures of the left and right views are located at the same point on the time axis. Up to now, the data structure of the playlist information has been described.

This completes the explanation of the sub-path information. Next is a detailed description of the entry mark information.

The entry mark information can be attached at a position within a playback section defined by the playitem. Namely, the entry mark information is attached at a position that can be a playback start point in the playitem, and is used for a random-access playback. For example, during a playback of a movie title, the chapter playback is realized when an entry mark is attached to a chapter start position.

This completes the description of the entry mark information. Next is a detailed explanation of the extension data.

The extension data is an extension unique to the 3D playlist and is not compatible with the 2D playlist. The extension data stores STN_table_SS#1-#N. Each STN_table_SS corresponds to a different piece of playitem information, and is a table in which logical stream numbers are assigned to pairs of a stream entry a stream attribute for 3D playback. The order of the pairs of a stream entry and a stream attribute in the STN_table_SS indicates a priority order of the corresponding streams. The stream selection table is constituted from the STN_table in the playitem information and the STN_table_SS in the extension data.

The following describes the stream selection table which is included in the above-described internal structure of the playitem information.

FIG. 22A shows the stream selection table. The stream selection table is composed of a plurality of stream entries. As indicated by the parenthesis signs "}", The stream entries are classified into: (i) stream entries that are defined in the STN_table; and (ii) stream entries that are defined in the STN_table_SS.

As the stream entries of the STN_table, the audio/PG/IG for 2D that are playable in the 2D output mode can be registered. For this reason, the STN_table includes a 2D video stream entry group, a 2D audio stream entry group, a 2D PG stream entry group, and a 2D IG stream entry group, and the packet identifiers of the video, audio, PG, and IG streams can be described in these stream entry groups.

As the stream entries of the STN_table_SS, the audio/PG/IG for 3D that are playable in the stereoscopic playback mode can be registered. For this reason, the STN_table_SS includes a 3D video stream entry group, a 3D audio stream entry group, a 3D PG stream entry group, a 3D IG stream entry group, and stream combination information, and the packet identifiers of the video, audio, PG, and IG streams can be described in these stream entry groups.

FIG. 22B shows the structural elements that are common to the stream entries. As shown in FIG. 22B, each stream entry of the stream selection table includes "stream selection number", "stream path information", and "stream identification information".

The "stream selection number" is a number attached to each stream entry in the stream selection table, and is incremented by one in the order starting with "stream entry 1". The "stream selection number" is used for identification of the streams by the playback device.

The "stream path information" is information that indicates an AV clip in which the stream indicated by the stream identification information is multiplexed. For example, when the "stream path information" is "main path", it indicates an AV clip of the playitem; and when the "stream path information" is "sub-path ID=1", it indicates an AV clip of a subplayitem that corresponds to the playback section of the playitem, in the sub-path indicated by the sub-path ID.

The "stream identification information" is information such as the PID, and indicates a stream multiplexed in the referenced AV clip. Each stream entry also includes attribute information of each stream. Here, the attribute information is information that indicates characteristics of each stream. For example, in the case of audio, presentation graphics, or interactive graphics, the attribute information includes a language attribute or the like.

In the STN_table_SS, the stream entries for the left-view and right-view video streams have the same values with respect to, for example, the frame rate, resolution, and video format. For this reason, the stream entry may include a flag that indicates either the left-view video stream or the right-view video stream.

This completes the description of the stream selection table. Next, a detailed description is given of the left-view/right-view identification information.

It has been presumed in the description that the left view is the main, and the left view is displayed in the 2D display. However, it may be set that the right view is the main. The present embodiment is provided with information that indicates which of the left view and the right view is the main and is displayed in the 2D display. In other words, the information indicates which of the left view and the right view is the base-view video stream. The information indicating this is the left-view/right-view identification information.

It appears to be typical that in the studio, the left-view video is generated as a 2D video. However, some creators might desire to create the right-view video as a 2D video. Since there is such a possibility, the left-view/right-view identification information, which indicates which of the left-view and the right-view is the base-view, is provided to be set for each piece of playitem information.

Figure 23:
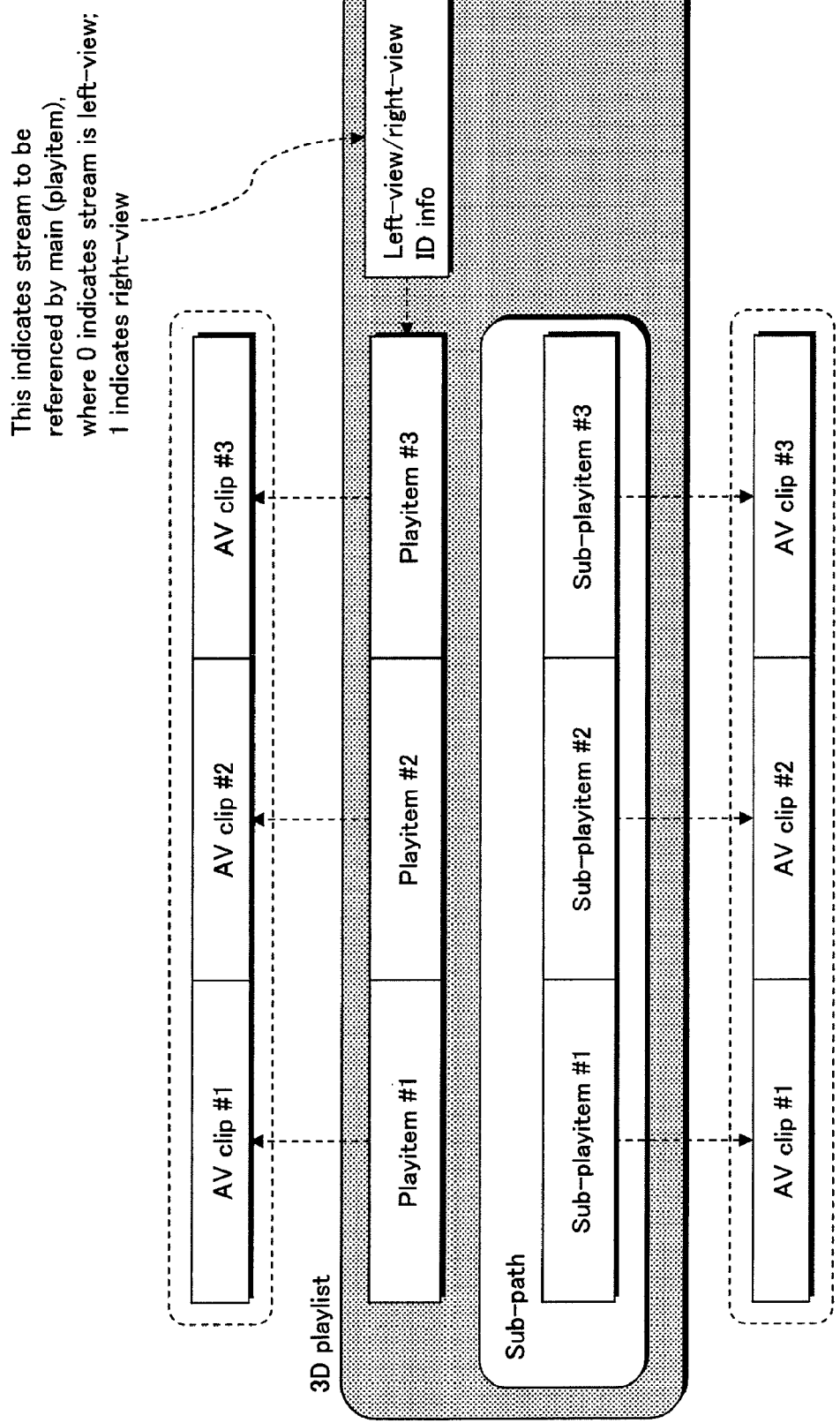
FIG. 23 shows a 3D playlist that is made by adding the left-view/right-view identification information to the 3D playlist shown in FIG. 17.

FIG. 23 shows a 3D playlist that is made by adding the left-view/right-view identification information to the 3D playlist shown in FIG. 17. With this information, when the right-view video stream is specified as the base-view video stream, first the right-view video stream is input into the video decoder to obtain non-compressed picture data, even if the right view is specified by the sub-path information. Then, the motion compensation is performed based on the non-compressed picture data obtained by decoding the right-view video stream. This structure makes the selection of either the left or right view as the base view flexible.

Each stream and the left-view/right-view identification information can be output the display device, and the display device can use the left-view/right-view identification information to distinguish between the left-view and right-view streams. When a pair of glasses of the shutter method is used, it is necessary to recognize which of the left-view image and the right-view image is the main image that is to be referenced by the playitem, in order to synchronize displays between the glasses and the display device. Therefore, switch signals are sent to the glasses so that the light passes through the left glass of the shutter-method glasses when the left view is displayed, and the light passes through the right glass of the shutter-method glasses when the right view is displayed.

The distinction between the left view and the right view is also necessary even in the naked-eye stereoscopic view method in which the display device has a screen embedded with a prism, such as a lenticular. Therefore, this information is also used this method to distinguish between the left view and the right view.

Up to now, the left-view/right-view identification information has been described. The left-view/right-view identification information is provided on the assumption that either the left-view image or the right-view image among the parallax images can be played back as a planar image. However, such a view may not be suitable for being used a planar image, depending on the parallax image.

The following describes the left-view image and the right-view image that are not suitable for being used a planar image.

Figure 24:
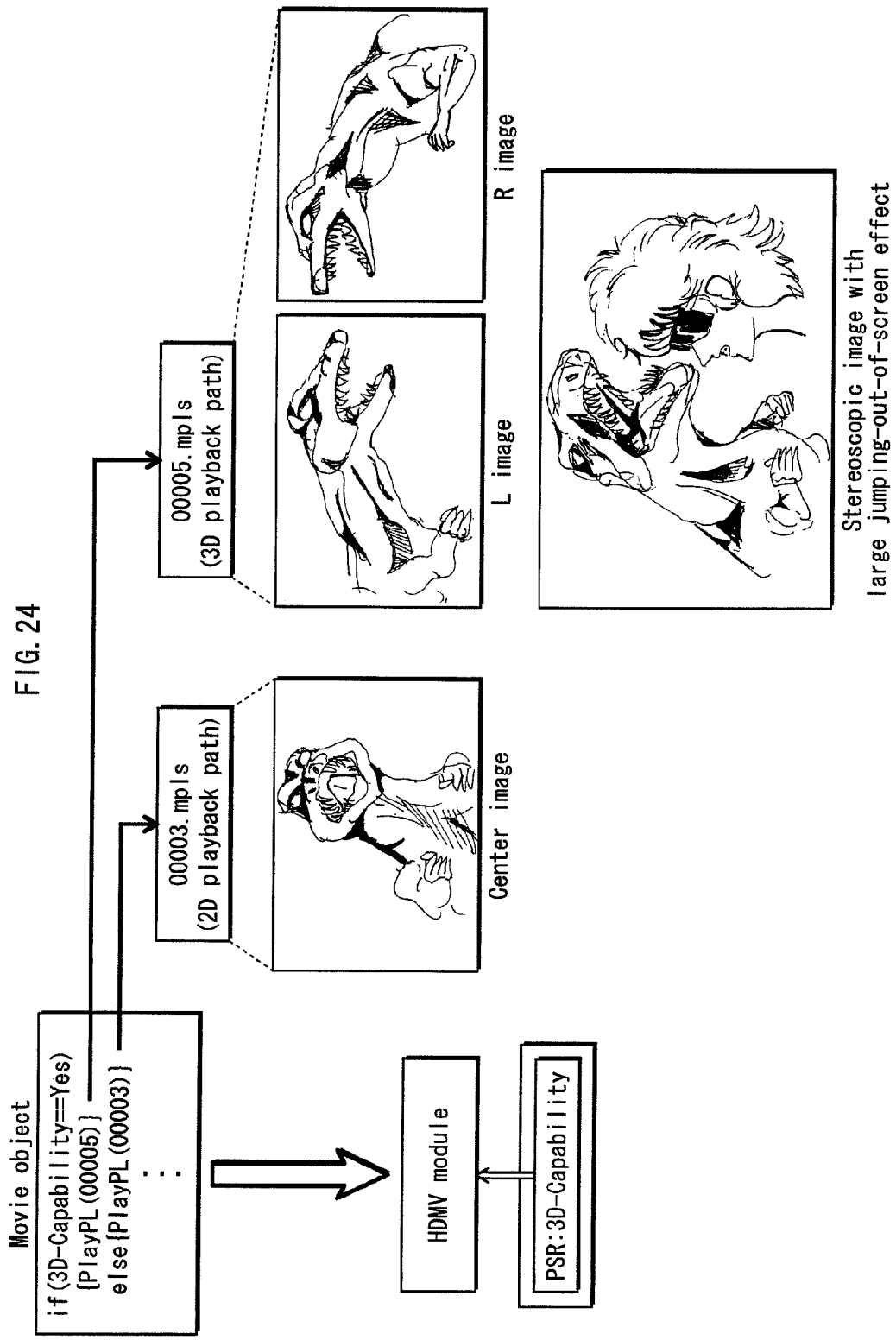
FIG. 24 shows two pieces of playlist information which differently define the left-view image, right-view image, and center image.

FIG. 24 shows two pieces of playlist information which differently define the left-view image, right-view image, and center image. The lower-right portion of FIG. 24 shows a stereoscopic image that is aimed to produce an effect that the user sees a dinosaur just in front of his/her eyes. This stereoscopic image is made from an L image and an R image like those shown above the stereoscopic image in FIG. 24. As understood from the example shown in FIG. 24, the L image and the R image constituting a stereoscopic image with a large jumping-out-of-screen effect show respective side views of the subject that is to "jump out of the screen" (in this example, the dinosaur). In such a case, when the left-view video stream is used as a video stream for the planar view, the user would view the subject to be extending horizontally long, providing an odd feeling to the user. In view of this, it is set that, when the device is in the 2D mode, a piece of playlist information that specifies a video stream representing the center image is selected as the current playlist.

In FIG. 24, the "00005.mpls" specifies the left-view and right-view video streams with a large jumping-out-of-screen effect, as the main path information and the sub-path information, respectively.

Also, the "00003.mpls" specifies the center-image video stream, using the main path. The movie object in the upper-left portion of FIG. 24 is described so that either 00005.mpls or 00003.mpls is selected for playback depending on the 3D playback capability (3D-Capability) of the playback device (the "if" statement in the drawing).

This completes the description of implementation acts of the recording medium and recording method. The following describes the playback device in detail.

Figure 25:
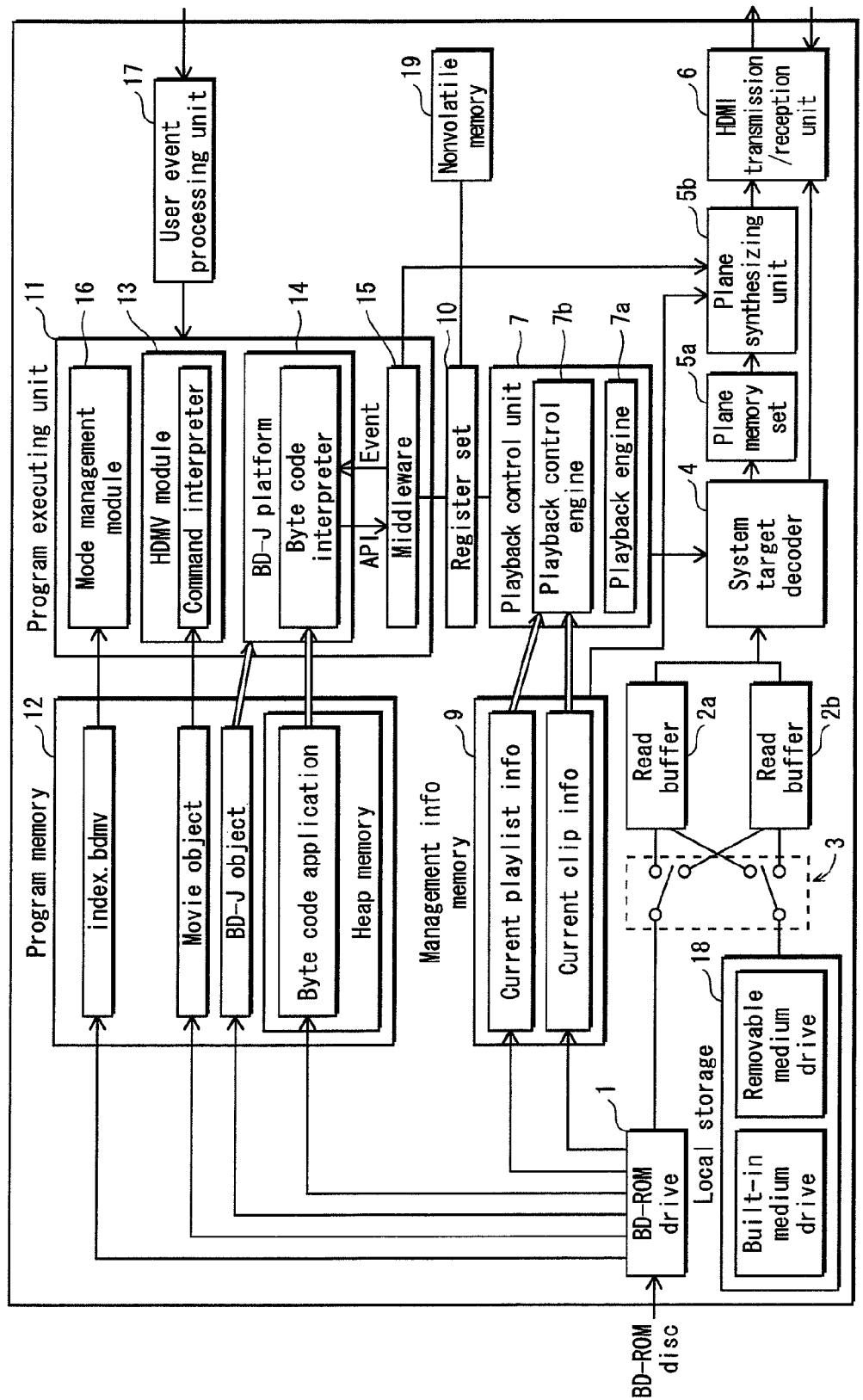
FIG. 25 shows the structure of a 2D/3D playback device.

FIG. 25 shows the structure of a 2D/3D playback device. The 2D/3D playback device includes a BD-ROM drive 1, a read buffer 2a, a read buffer 2b, a switch 3, a system target decoder 4, a plane memory set 5a, a plane synthesizing unit 5b, an HDMI transmission/reception unit 6, a playback control unit 7, a management information memory 9, a register set 10, a program executing unit 11, a program memory 12, an HDMV module 13, a BD-J platform 14, a middleware 15, a mode management module 16, a user event processing unit 17, a local storage 18, and a nonvolatile memory 19.

The BD-ROM drive 1, like a 2D playback device, reads out data from a BD-ROM disc based on a request from the playback control unit 7. AV clips read out from the BD-ROM disc are transferred to the read buffer 2a or 2b.

When a 3D image is to be played back, the playback control unit 7 issues a read request that instructs to read out the 2D/left-view AV clip and the right-view AV clip alternately in units of Extents. The BD-ROM drive 1 reads out Extents constituting the 2D/left-view AV clip into the read buffer 2a, and reads out Extents constituting the right-view AV clip into the read buffer 2b. When a 3D image is to be played back, the BD-ROM drive 1 should have a higher reading speed than the BD-ROM drive for a 2D playback device, since it is necessary to read out both the 2D/left-view AV clip and the right-view AV clip simultaneously.

The read buffer 2a is a buffer that may be realized by, for example, a dual-port memory, and stores the data of the 2D/left-view AV clips read out by the BD-ROM drive 1.

The read buffer 2b is a buffer that may be realized by, for example, a dual-port memory, and stores the data of the right-view AV clips read out by the BD-ROM drive 1.

The switch 3 is used to switch the source of data to be input into the read buffers, between the BD-ROM drive 1 and the local storage 18.

The system target decoder 4 decodes the streams by performing the demultiplexing process onto the source packets read out into the read buffer 2a and the read buffer 2b.

The plane memory set 5a is composed of a plurality of plane memories. The plane memories include those for storing a left-view video plane, a right-view video plane, a secondary video plane, an interactive graphics plane (IG plane), and a presentation graphics plane (PG plane).

The plane synthesizing unit 5b superposes the left-view video plane, right-view video plane, secondary video plane, IG plane, PG plane, and GFX plane in an instant, and displays the superposed image onto a screen such as a TV screen. In displaying this, the plane synthesizing unit 5b crops a set of the secondary video plane, IG plane, and PG plane for the left view and the right view alternately, and synthesizes the cropped set of the secondary video plane, IG plane, and PG plane with the left-view video plane or the right-view video plane. The image resulted from the synthesizing is transferred to the GFX superposing process.

The plane synthesizing unit 5b crops graphics for the left view and the right view from the IG plane alternately, by using the offset information specified from the API, and outputs, to the television, an image in which the left-view video plane or the right-view video plane, the secondary video plane, IG plane, and PG plane are superposed.

When the image is to be output to the television or the like, the output is conformed to the 3D system. When it is necessary to play back the left-view image and the right-view image alternately by using the shutter glasses, the image is output as it is. When the image is to be output to, for example, the lenticular television, a temporary buffer is prepared, the left-view image is first transferred into the temporary buffer, and the left-view image and the right-view image are output simultaneously after the right-view image is transferred.

The HDMI transmission/reception unit 6 includes an interface conforming to, for example, the HDMI standard, where HDMI stands for High Definition Multimedia Interface. The HDMI transmission/reception unit 6 performs data transmission/reception in conformance with the HDMI standard between the playback device and a device (in this example, a television 300) with which the playback device is connected by the HDMI connection. The picture data stored in the video and the non-compressed audio data decoded by the management information memory 9 are transferred to the television 300 via the HDMI transmission/reception unit 6. The television 300 holds, for example, (i) information indicating whether or not it supports a stereoscopic display, (ii) information regarding resolution for a planar display, and (iii) information regarding resolution for a stereoscopic display. Upon receiving a request from the playback device via the HDMI transmission/reception unit 6, the television 300 returns the requested necessary information (for example, (i) information indicating whether or not it supports a stereoscopic display, (ii) information regarding resolution for a planar display, and (iii) information regarding resolution for a stereoscopic display) to the playback device. In this way, the playback device can obtain the information indicating whether or not the television 300 supports a stereoscopic display, from the television 300 via the HDMI transmission/reception unit 6.

The playback control unit 7 includes a playback engine 7*a* and a playback control engine 7*b*. When it is instructed from the program executing unit 11 or the like to playback a 3D playlist, the playback control unit 7 identifies a 2D/left-view AV clip of a playitem that is the playback target among the 3D playlist, and identifies a right-view AV clip of a sub-playitem in the 3D sub-path that should be played back in synchronization with the playitem. After this, the playback control unit 7 interprets the entry map of the corresponding clip information file, and requests the BD-ROM drive 1 to alternately read out the Extent of the 2D/left-view AV clip and the Extent of the right-view AV clip, starting with the playback start point, based on the Extent start type that indicates which of an Extent constituting the left-view video stream and an Extent constituting the right-view video stream is disposed first. When the playback is started, the first Extent is read out into the read buffer 2*a* or the read buffer 2*b* completely, and then the transfer from the read buffer 2*a* and the read buffer 2*b* to the system target decoder 4 is started. When playing back the 3D playlist, the playback control unit 7 notifies the plane synthesizing unit 5*b* of the 3D metadata that is included in the clip information file that corresponds to the 2D/left-view AV clip.

The playback engine 7*a* executes AV playback functions. The AV playback functions in the playback device are a group of traditional functions succeeded from CD and DVD players. The AV playback functions include: Play, Stop, Pause On, Pause Off, Still Off, Forward Play (with specification of the playback speed by an immediate value), Backward Play (with specification of the playback speed by an immediate value), Audio Change, Picture Data Change for Secondary Video, and Angle Change.

The playback control engine 7*b* performs playlist playback functions. The playlist playback functions mean that, among the above-described AV playback functions, the Play and Stop functions are performed in accordance with the current playlist information and the current clip information, where the current playlist information constitutes the current playlist.

The management information memory 9 is a memory for storing the current playlist information and the current clip information. The current playlist information is a piece of playlist information that is currently a target of processing, among a plurality of pieces of playlist information that can be accessed from the BD-ROM, built-in medium drive, or removable medium drive. The current clip information is a piece of clip information that is currently a target of processing, among a plurality of pieces of clip information that can be accessed from the BD-ROM, built-in medium drive, or removable medium drive.

The register set 10 is a player status/setting register set that is a set of registers including: a player status register for storing a playlist playback status; a player setting register for storing configuration information indicating the configuration of the playback device; and a general-purpose register for storing arbitrary information that is to be used by contents. Here, the playlist playback status indicates playback statuses such as which of various pieces of AV data information described in the playlist is used, and at what position (time) the currently played-back portion of the playlist is.

When the playlist playback status changes, the playback control engine 7*b* stores the changed playlist playback status into the register set 10. Also, in accordance with an instruction received from an application which is run by the command interpreter that is an operator in the HDMV mode, or run by the Java™ platform that is an operator in the BD-J mode, a value specified by the application may be stored, or a stored value may be transferred to the application.

The program executing unit 11 is a processor for executing a program stored in a BD program file. Operating according to the stored program, the program executing unit 11 performs the following controls: (1) instructing the playback control unit 7 to play back a playlist; and (2) transferring, to the system target decoder, PNG/JPEG that represents a menu or graphics for a game so that it is displayed on the screen. These controls can be performed freely in accordance with construction of the program, and how the controls are performed is determined by the process of programming the BD-J application in the authoring process.

The program memory 12 stores a current dynamic scenario which is provided to the command interpreter that is an operator in the HDMV mode, and to the Java™ platform that is an operator in the BD-J mode. The current dynamic scenario is a current execution target that is one of Index.bdmv, BD-J object, and movie object recorded in the BD-ROM. The program memory 12 includes a heap memory.

The heap memory is a stack region for storing byte codes of the system application, byte codes of the BD-J application, system parameters used by the system application, and application parameters used by the BD-J application.

The HDMV module 13 is a DVD virtual player that is an operator in the HDMV mode, and is a performer in the HDMV mode. The HDMV module 13 has a command interpreter, and performs the control in the HDMV mode by interpreting and executing the navigation command constituting the movie object. The navigation command is described in a syntax that resembles a syntax used in the DVD-Video. Accordingly, it is possible to realize a DVD-Video-like playback control by executing the navigation command.

The BD-J platform 14 is a Java™ platform that is an operator in the BD-J mode, and is fully implemented with Java2 Micro_Edition (J2ME) Personal Basis Profile (PBP 1.0), and Globally Executable MHP specification (GEM1.0.2) for package media targets. The BD-J platform 14 is composed of a class loader, a byte code interpreter, and an application manager.

The class loader is one of system applications, and loads a BD-J application by reading out byte codes from the class file existing in the JAR archive file, and storing the byte codes into the heap memory.

The byte code interpreter is what is called a Java™ virtual machine. The byte code interpreter converts (i) the byte codes constituting the BD-J application stored in the heap memory and (ii) the byte codes constituting the system application, into native codes, and causes the MPU to execute the native codes.

The application manager is one of system applications, and performs application signaling for the BD-J application based on the application management table in the BD-J object, such as starting or ending a BD-J application. This completes the internal structure of the BD-J platform.

The middleware 15 is an operating system for the embedded software, and is composed of a kernel and a device driver. The kernel provides the BD-J application with a function unique to the playback device, in response to a call for the Application Programming Interface (API) from the BD-J application. The middleware 15 also realizes controlling the hardware, such as starting the interruption handler by sending an interruption signal.

The mode management module 16 holds Index.bdmv that was read out from the BD-ROM, built-in medium drive, or removable medium drive, and performs a mode management and a branch control. The management by the mode management is a module assignment to cause either the BD-J platform or the HDMV module to execute the dynamic scenario.

The user event processing unit 17 receive a user operation via a remote control, and causes the program executing unit 11 or the playback control unit 7 to perform a process as instructed by the received user operation. For example, when the user presses a button on the remote control, the user event processing unit 17 instructs the program executing unit 11 to execute a command included in the button. For example, when the user presses a fast forward/rewind button on the remote control, the user event processing unit 17 instructs the playback control unit 7 to execute the fast forward/rewind process onto the AV clip of the currently played-back playlist.

The local storage 18 includes the built-in medium drive for accessing a hard disc, and the removable medium drive for accessing a semiconductor memory card, and stores downloaded additional contents, data to be used by applications, and other data. An area for storing the additional contents is divided into as many small areas as BD-ROMs. Also, an area for storing data used by applications is divided into as many small areas as the applications.

The nonvolatile memory 19 is a recording medium that is, for example, a readable/writable memory, and is a medium such as a flash memory or FeRAM that can preserve the recorded data even if a power is not supplied thereto. The nonvolatile memory 19 is used to store a backup of the register set 10.

Figure 26:
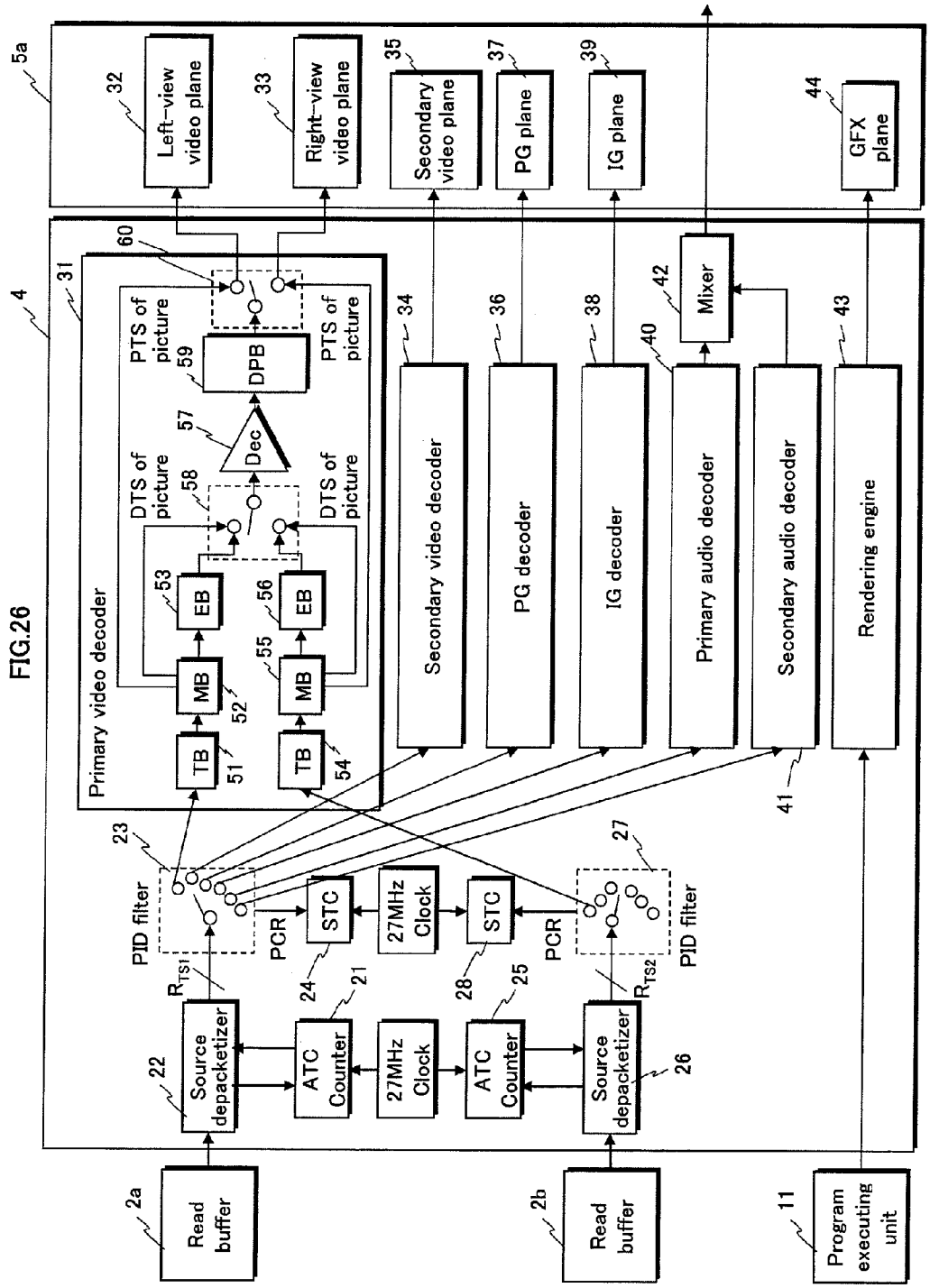

Next, the internal structure of the system target decoder 4 and the plane memory set 5a will be described. FIG. 26 shows the internal structure of the system target decoder 4 and the plane memory set 5a. As shown in FIG. 26, the system target decoder 4 and the plane memory set 5a include an ATC counter 21, a source depacketizer 22, a PID filter 23, an STC counter 24, an ATC counter 25, a source depacketizer 26, a PID filter 27, a primary video decoder 31, a left-view video plane 32, a right-view video plane 33, a secondary video decoder 34, a secondary video plane 35, a PG decoder 36, a PG plane 37, an IG decoder 38, an IG plane 39, a primary audio decoder 40, a secondary audio decoder 41, a mixer 42, a rendering engine 43, and a GFX plane 44.

The ATC counter 21 generates an Arrival Time Clock (ATC) for adjusting the operation timing within the playback device.

The source depacketizer 22, after a source packet is stored in the read buffer 2a, transfers a TS packet of the source packet to the PID filter. More specifically, the source depacketizer 22 transfers the TS packet to the PID filer according to the recording rate of the AV clip, at the instant when the value of the ATC generated by the ATC counter and the value of the ATS of the source packet become identical. In transferring the TS packet, the source depacketizer 22 adjusts the time of input into the decoder in accordance with the ATS of the source packet.

The PID filter 23 transfers, among the TS packets output from the source depacketizer 22, TS packets having a PID that matches a PID required for playback, to the primary video decoder 31, the secondary video decoder 34, the IG decoder 38, the PG decoder 36, the primary audio decoder 40, or the secondary audio decoder 41.

The STC counter 24 generates an System Time Clock (STC) for adjusting the operation timing of the decoders.

The ATC counter 25 generates an Arrival Time Clock (ATC) for adjusting the operation timing within the playback device.

The source depacketizer 26, after a source packet is stored in the read buffer 2b, transfers a TS packet of the source packet to the PID filter. More specifically, the source depacketizer 26 transfers the TS packet to the PID filer according to the system rate of the AV clip, at the instant when the value of the ATC generated by the ATC counter and the value of the ATS of the source packet become identical. In transferring the TS packet, the source depacketizer 26 adjusts the time of input into the decoder in accordance with the ATS of the source packet.

The PID filter 27 transfers, among the TS packets output from the source depacketizer 26, TS packets having a PID that matches a PID written in the stream selection table of the current playitem, to the primary video decoder, in accordance with the PID.

The primary video decoder 31 decodes the left-view video stream, and writes the decoding result, namely, a non-compressed video frame, into the left-view video plane 32.

The left-view video plane 32 is a plane memory that can store picture data with a resolution of, for example, 1920× 2160 (1280×1440).

The right-view video plane 33 is a plane memory that can store picture data with a resolution of, for example, 1920× 2160 (1280×1440).

The secondary video decoder 34, having the same structure as the primary video plane, performs decoding of an input secondary video stream, and writes resultant pictures to the secondary video plane in accordance with respective display times (PTS).

The secondary video plane 35 stores picture data for the secondary video that is output from the system target decoder 4 as a result of decoding the secondary video stream.

The PG decoder 36 extracts and decodes a presentation graphics stream from the TS packets input from the source depacketizer, and writes the resultant non-compressed graphics data to the PG plane in accordance with respective display times (PTS).

The PG plane 37 stores non-compressed graphics object that is obtained by decoding the presentation graphics stream.

The IG decoder 38 extracts and decodes an interactive graphics stream from the TS packets input from the source depacketizer, and writes the resultant non-compressed graphics object to the IG plane in accordance with respective display times (PTS).

The IG plane 39 stores non-compressed graphics object that is obtained by decoding the interactive graphics stream.

The primary audio decoder 40 decodes the primary audio stream.

The secondary audio decoder 41 decodes the secondary audio stream.

The mixer 42 mixes the decoding result of the primary audio decoder 40 with the decoding result of the secondary audio decoder 41.

The rendering engine 43 decodes graphics data such as JPEG or PNG that is used by the BD-J application when rendering a menu.

The GFX plane 44 is a plane memory into which graphics data such as JPEG or PNG is written after it is decoded.

Next, the internal structure of the primary video decoder 31 will be explained. The primary video decoder 31 is composed of a TB 51, an MB 52, an EB 53, a TB 54, an MB 55, an EB 56, a video decoder 57, a buffer switch 58, a DPB 59, and a picture switch 60.

The Transport Buffer (TB) 51 is a buffer for temporarily storing TS packets containing the left-view video stream, as they are after being output from the PID filter 23.

The Multiplexed Buffer (MB) 52 is a buffer for temporarily storing PES packets when the video stream is output from the TB to the EB. When the data is transferred from the TB to the MB, the TS headers are removed from the TS packets.

The Elementary Buffer (EB) 53 is a buffer for storing video access units in the encoded state. When the data is transferred from the MB to the EB, the PES headers are removed.

The Transport Buffer (TB) 54 is a buffer for temporarily storing TS packets containing the right-view video stream, as they are after being output from the PID filter.

The Multiplexed Buffer (MB) 55 is a buffer for temporarily storing PES packets when the video stream is output from the TB to the EB. When the data is transferred from the TB to the MB, the TS headers are removed from the TS packets.

The Elementary Buffer (EB) 56 is a buffer for storing video access units in the encoded state. When the data is transferred from the MB to the EB, the PES headers are removed.

The video decoder 57 generates a frame/field image by decoding each access unit constituting the video elementary stream at predetermined decoding times (DTSs). Since there are a plurality of compress-encoding methods, such as MPEG2, MPEG4 AVC, and VC1, that can be used to compress-encode the video stream that is to be multiplexed into the AV clip, the decoding method of the video decoder 57 is selected in accordance with the stream attribute. When it decodes the picture data constituting the base-view video stream, the video decoder 57 performs a motion compensation using the picture data, which exist in the future and past directions, as reference pictures. When it decodes each picture data constituting the dependent-view video stream, the video decoder 57 performs a motion compensation using the picture data, which constitute the base-view video stream, as reference pictures. After the picture data are decoded in this way, the video decoder 57 transfers the decoded frame/field image to the DPB 59, and transfers the corresponding frame/field image to the picture switch at the timing of the display time (PTS).

The buffer switch 58 determines from which of the EB 53 and the EB 56 the next access unit should be extracted, by using the decode switch information that was obtained when the video decoder 57 decoded the video access units, and transfers a picture from either the EB 53 or the EB 56 to the video decoder 57 at the timing of the decoding time (DTS) assigned to the video access unit. Since the DTSs of the left-view video stream and the right-view video stream are set to arrive alternately in units of pictures on the time axis, it is preferable that the video access units are transferred to the video decoder 57 in units of pictures when decoding is performed ahead of schedule disregarding the DTSs.

The Decoded Picture Buffer (DPB) 59 is a buffer for temporarily storing the decoded frame/field image. The DPB 59 is used by the video decoder 57 to refer to the decoded pictures when the video decoder 57 decodes a video access unit such as the P-picture or the B-picture having been encoded by the inter-picture prediction encoding.

The picture switch 60, when the decoded frame/field image transferred from the video decoder 57 is to be written into a video plane, switches the writing destination between the left-view video plane and the right-view video plane. When the left-view stream is targeted, non-compressed picture data is written into the left-view video plane in a moment, and when the right-view stream is targeted, non-compressed picture data is written into the right-view video plane in a moment.

Figure 27:
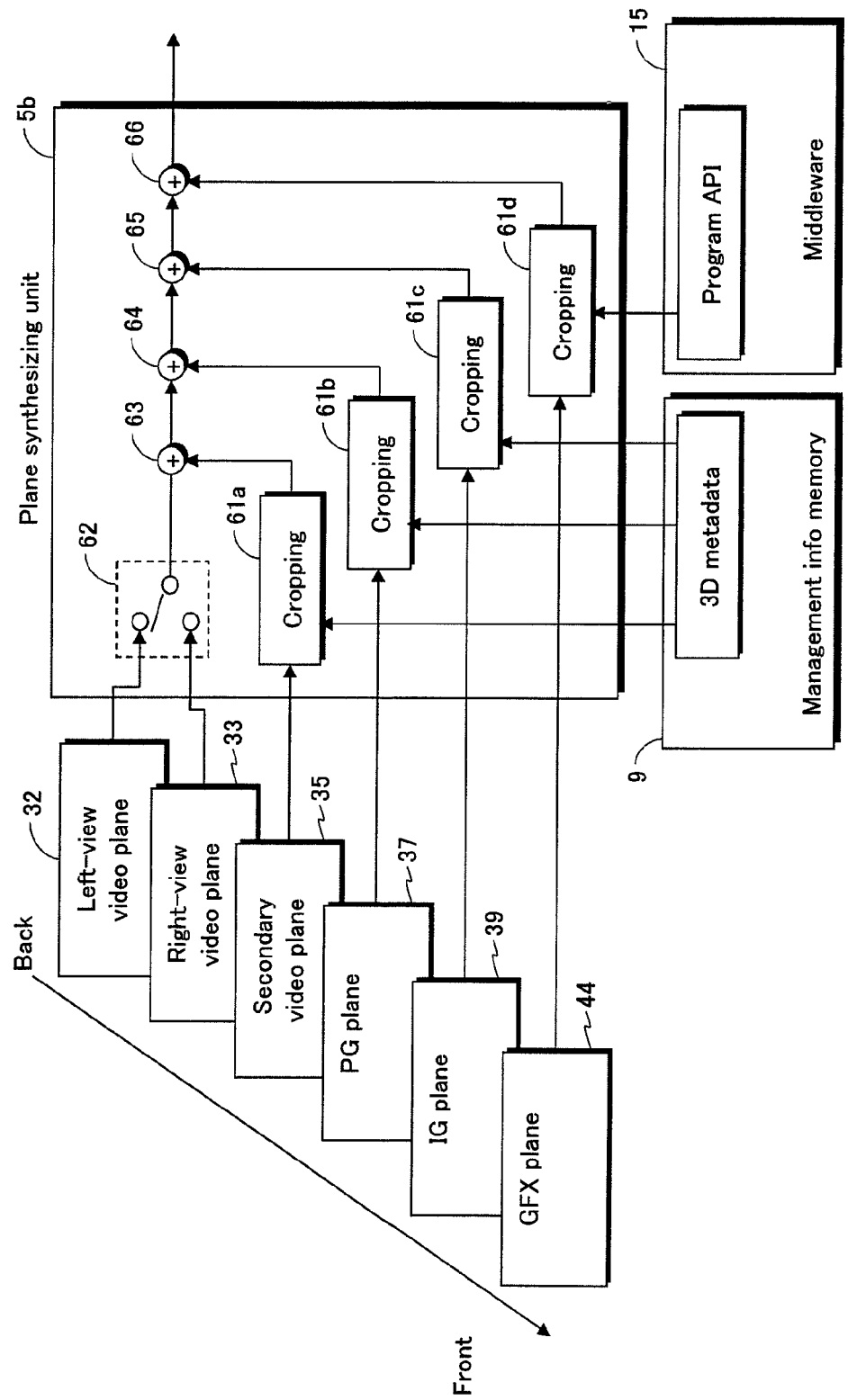
FIG. 27 shows the internal structure of the plane synthesizing unit 5b.

FIG. 27 shows the internal structure of the plane synthesizing unit 5b. As shown in FIG. 27, the plane synthesizing unit 5b includes cropping units 61a, 61b, and 61c for cropping the non-compressed picture data stored in the plane and graphics data based on the 3D metadata, a cropping unit 61d for cropping the non-compressed graphics data stored in the plane based on the program API, a switch 62 for switching between the left-view video plane 32 and the right-view video plane 33 to receive an output therefrom, and addition units 63, 64, 65, and 66 for performing addition of planes.

The plane memories include a left-view video plane, a right-view video plane, a secondary video plane, a PG plane, an IG plane, and a GFX plane which are arranged in the stated order. Into the left-view video plane and the right-view video plane, the image data is written alternately at the timing of PTS by the system target decoder 4. The plane synthesizing unit 5b selects either the left-view video plane or the right-view video plane into which the image data is written at the timing of PTS, and transfers the data from the selected video plane to the superposing process so that it is superposed with the secondary video plane, PG plane, and IG plane.

In this method, different contents are stored into the left-view video plane and the right-view video plane to realize the stereoscopic view. However, not limited to this, even if the same content is stored into the left-view video plane and the right-view video plane, it is possible to realize a pseudo stereoscopic view by assigning different coordinates to the pixels in the left-view video plane and the right-view video plane. Among the above-described plane memories, the PG plane realizes a stereoscopic view by changing the coordinates of pixels in the plane memory. In the following, how the stereoscopic view is realized with the PG plane is described.

Figure 28:
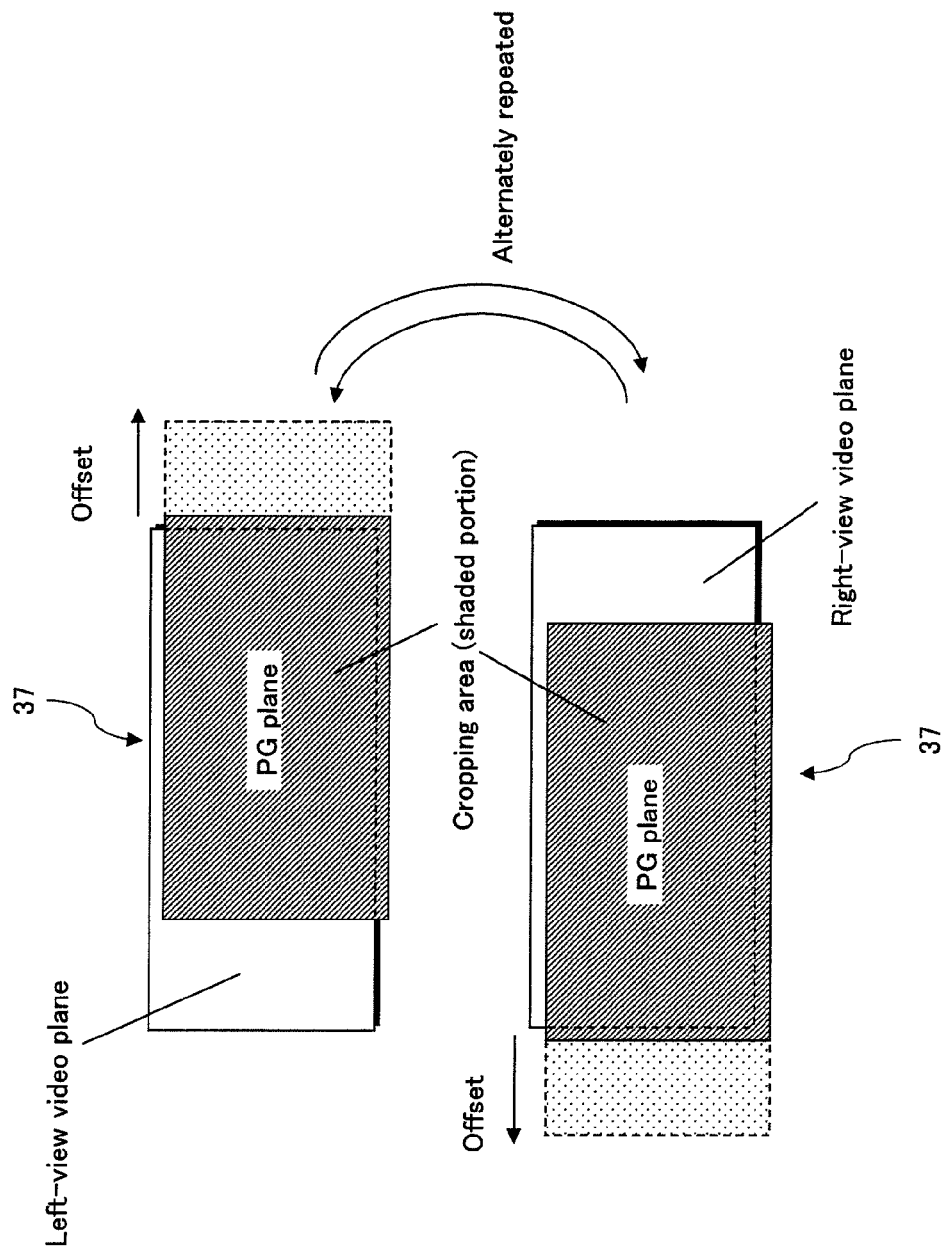
FIG. 28 shows how PG planes are synthesized.

FIG. 28 shows how PG planes are synthesized.

A description is given of how to synthesize the PG planes, with reference to an example of PG planes shown in FIG. 28. The plane synthesizing unit 5b obtains an offset value that corresponds to the current display time, from one of the offset entries existing in the 3D metadata, the one that corresponds to the PID of the currently played-back presentation graphics. When the image plane to be superposed is the left-view video plane, the plane synthesizing unit 5b shifts the coordinates of the image data stored in the PG plane towards the positive direction of the X axis by the offset value. The plane synthesizing unit 5b then crops the PG plane to prevent it from overlapping with the left-view video plane, and provides it to be synthesized with the other planes (see the upper portion of FIG. 28).

When the image plane to be superposed is the right-view video plane, the plane synthesizing unit 5b shifts the coordinates of the image data stored in the PG plane towards the negative direction of the X axis by the offset value. The plane synthesizing unit 5b then crops the PG plane to prevent it from overlapping with the left-view video plane, and provides it to be synthesized with the other planes (see the lower portion of FIG. 28). The IG plane and the secondary video plane are processed in the same manner.

Figure 29:
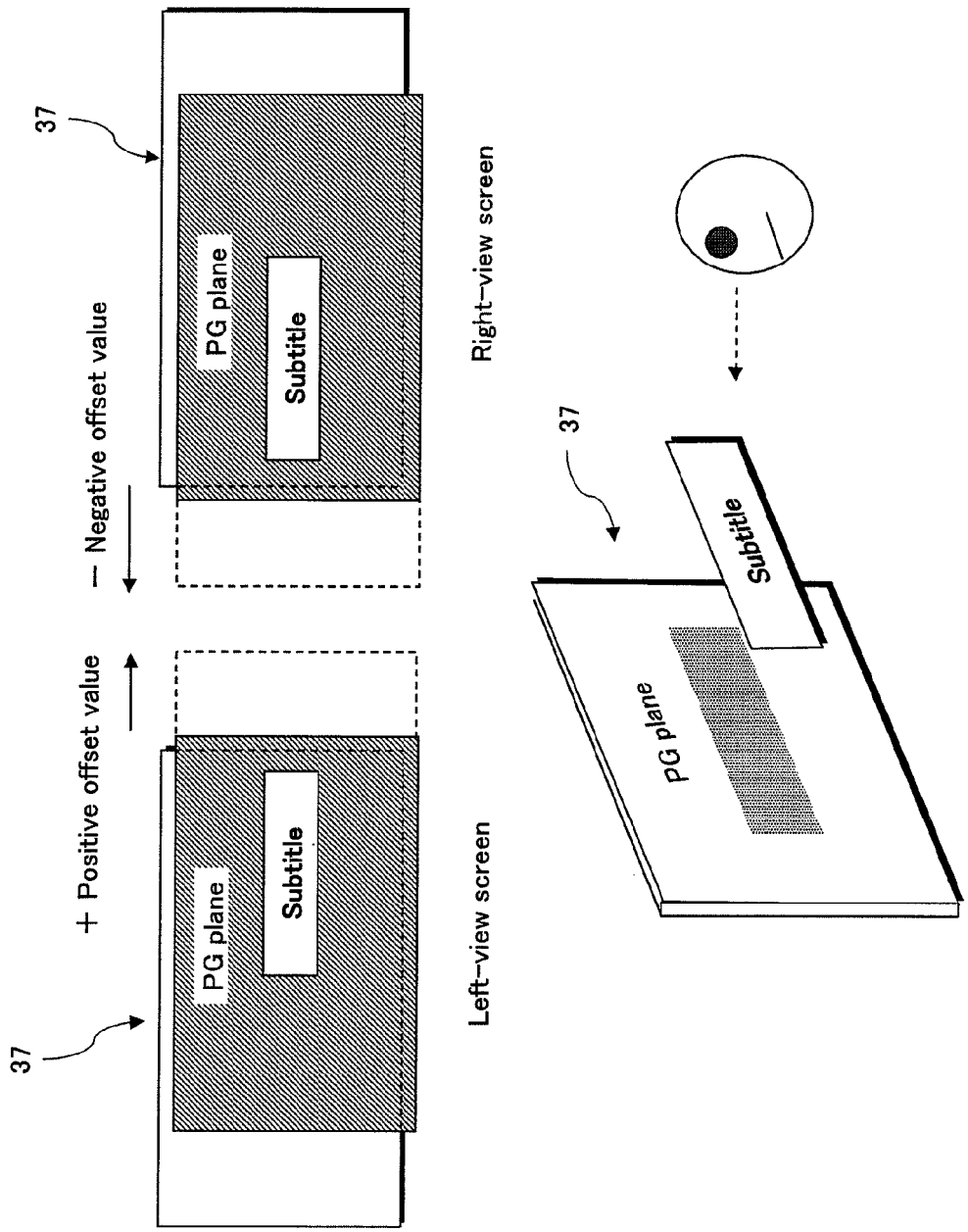
FIG. 29 schematically shows how the image planes are displayed to the user, after being cropped and superposed with use of the offset values.

FIG. 29 shows how the image planes are displayed to the user, after being cropped and superposed with use of the offset values. By shifting and cropping the image planes with use of the offset values, it is possible to create parallax images for the left and right eyes. This makes it possible to give depth to a planar image. When the image has such a depth, the user will see the planar image pop up from the screen of the display device.

This completes the description of the plane synthesizing. Next, a description is given of the internal structure of the register set 10 and the detail of the playback control engine 7b.

Figure 30:
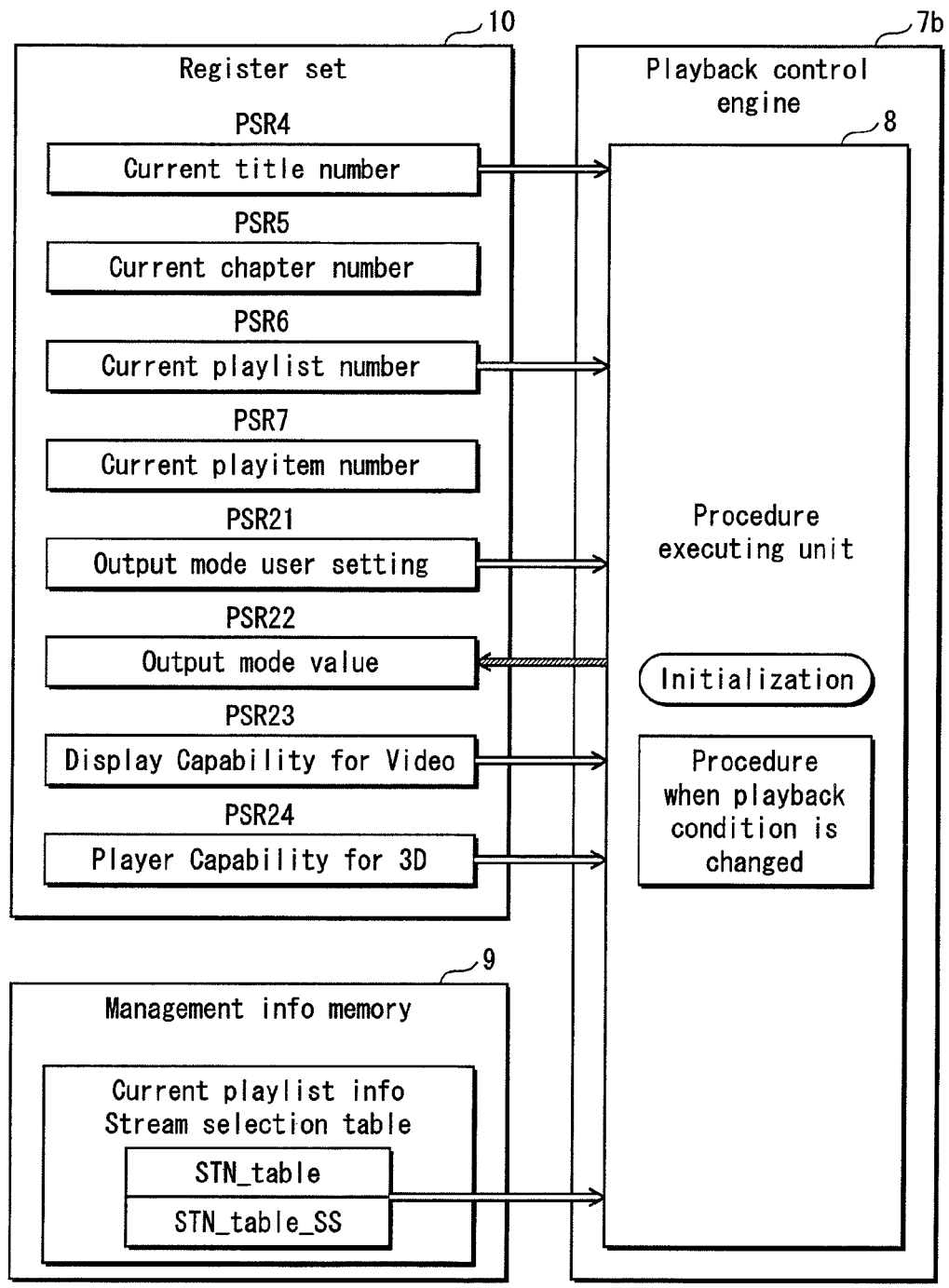
FIG. 30 shows the internal structures of the register set 10 and the playback control engine 7b.

FIG. 30 shows the internal structures of the register set 10 and the playback control engine 7b.

The left-hand side of FIG. 30 shows the internal structures of the register set 10, and the right-hand side shows the internal structures of the playback control engine 7b.

The values stored in the PSRs shown in FIG. 30 are referenced and updated by the movie object and the BD-J object as necessary. As understood from this, the values stored in the PSRs are parameters referenced by the movie object and the BD-J object, and thus are also called system parameters.

First, representative ones among a plurality of PSRs will be described.

PSR1 is a stream number register for the audio stream, and stores a current audio stream number.

PSR2 is a stream number register for the PG stream, and stores a current PG stream number.

PSR4 is set to a value in the range from "1" through "100" to indicate a current title number.

PSR5 is set to a value in the range from "1" through "999" to indicate a current chapter number; and is set to a value "0xFFFF" to indicate that the chapter number is invalid in the playback device.

PSR6 is set to a value in the range from "0" through "999" to indicate a current playlist number.

PSR7 is set to a value in the range from "0" through "255" to indicate a current playitem number.

PSR8 is set to a value in the range from "0" through "0xFFFFFFFF" to indicate a current playback time point (current PTM) with the time accuracy of 45 KHz.

PSR10 is a stream number register for the IG stream, and stores a current IG stream number.

PSR21 indicates whether or not the user intends to perform the stereoscopic playback.

PSR22 indicates an output mode value.

PSR23 is used for the setting of "Display Capability for Video". This indicates whether or not a display device connected to the playback device has a capability to perform the stereoscopic playback.

PSR24 is used for the setting of "Player Capability for 3D". This indicates whether or not the playback device has a capability to perform the stereoscopic playback.

On the other hand, the playback control engine 7b includes a procedure executing unit 8 for determining the output mode of the current playlist by referring to the PSR4, PSR6, PSR21, PSR23, and PSR24, and the stream selection table of the current playlist information in the management information memory 9.

The "Player Capability for 3D" stored in PSR24 means the capability of playback device regarding the 3D playback as a whole. Thus it may be simply denoted as "3D-Capability".

Figure 31:
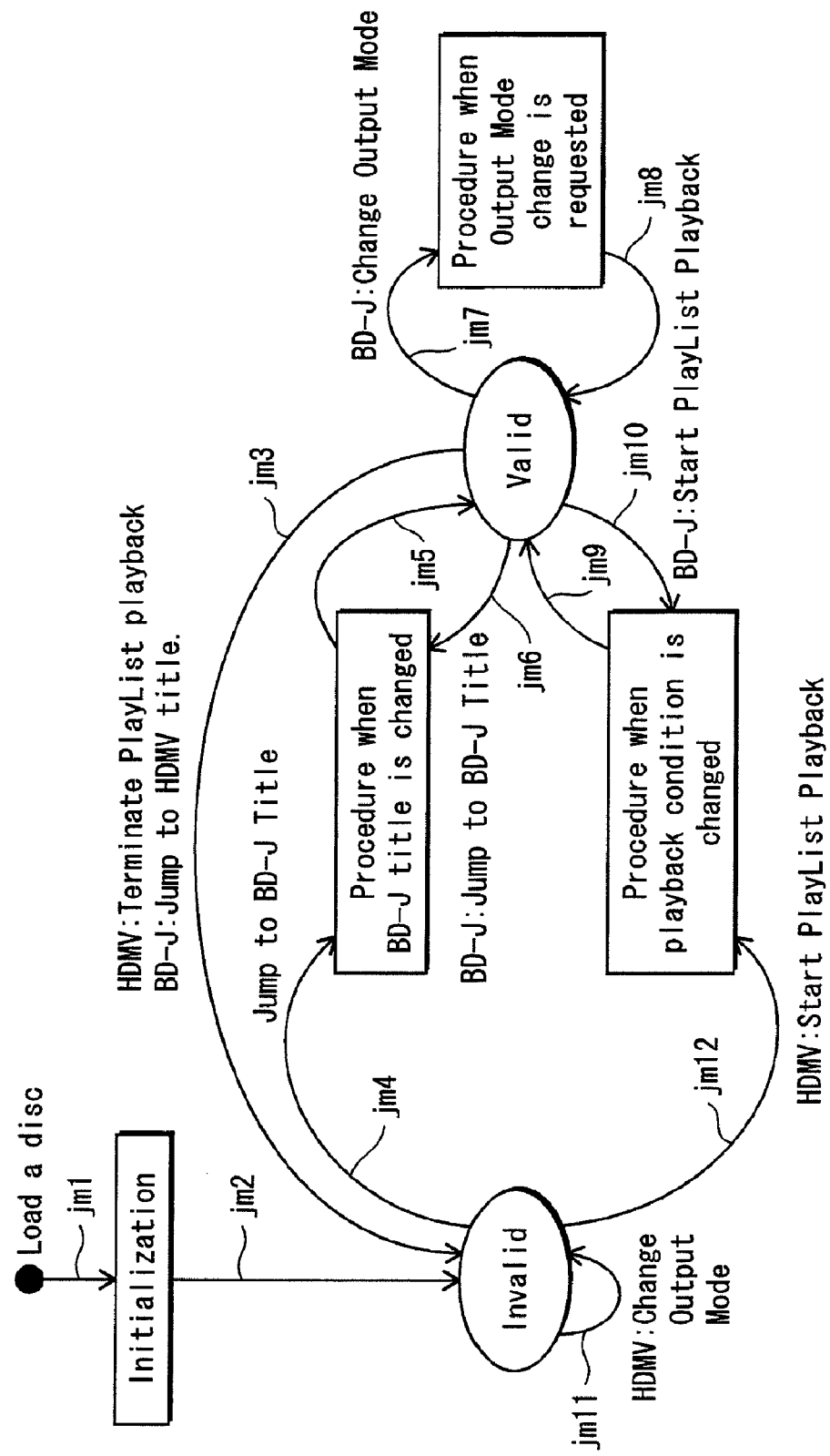
FIG. 31 shows the state transition of the selection model of the output mode.

PSR23 defines the output mode, and the selection model of the state transition is defined as shown in FIG. 31.

FIG. 31 shows the state transition of the selection model of the output mode. There exist two general states in this selection model. The two general states are represented by "invalid" and "valid" in the ovals. The "invalid" indicates that the output mode is invalid, and the "valid" indicates that the output mode is valid.

The general state is maintained unless a state transition occurs. The state transition is caused by a start of playlist playback, a navigation command, an output mode change requested by a BD-J application, or a jump to a BD-J title. When a state transition occurs, a procedure for obtaining a preferable output mode is executed.

The arrows jm1, jm2, jm3, . . . shown in FIG. 31 represent events that trigger state transitions. The state transitions in FIG. 31 include the following.

The "Load a disc" means the state in which the BD-ROM has been loaded.

The "Start presentation" means to "start playlist playback" in the HDMV mode. In the BD-J mode, it means to branch to a BD-J title. This is because, in the BD-J mode, branching to a BD-J title does not necessarily mean that a playlist starts to be played back.

The "Jump to BD-J title" means to branch to a BD-J title. More specifically, it indicates that a title (BD-J title), which is associated with a BD-J application in the index table, becomes a current title.

The "Start Playlist Playback" means that a playlist number identifying a playlist is set to a PSR, and the playlist information is read out onto the memory as the current playlist information.

The "Change Output Mode" means that the output mode is changed when the BD-J application calls the API.

The "Terminate Presentation", in the HDMV mode, means that a playback of a playlist is completed; and in the BD-J mode, means that a BD-J title jumps to a title (HDMV title) that is associated with a movie object in the index table.

When a disc is loaded, the state of the output mode transits to a temporary state "Initialization". After this, the state of the output mode transits to the invalid state.

The output mode selection state is maintained to be "invalid" until the playback start (Start Presentation) is made active. The "Start Presentation", in the HDMV mode, means that a playlist has been started to be played back; and in the BD-J mode, means that a BD-J title has been started to be played back, and some operation of a BD-J application has been started. It does not necessarily mean that a playlist has been started to be played back.

When Start Presentation is made active, the state of the output mode transits to a temporary state "Procedure when playback condition is changed" The output mode transits to "Valid" depending on the result of "Procedure when playback condition is changed". The output mode transits to "Invalid" when the output mode is effective and Start Presentation is completed.

The navigation command in the movie object should be executed before a playlist starts to be played back because the content provider sets a preferable output mode with the command.

When the navigation command in the movie object is executed, the state transits to "invalid" in this model.

Figure 32:
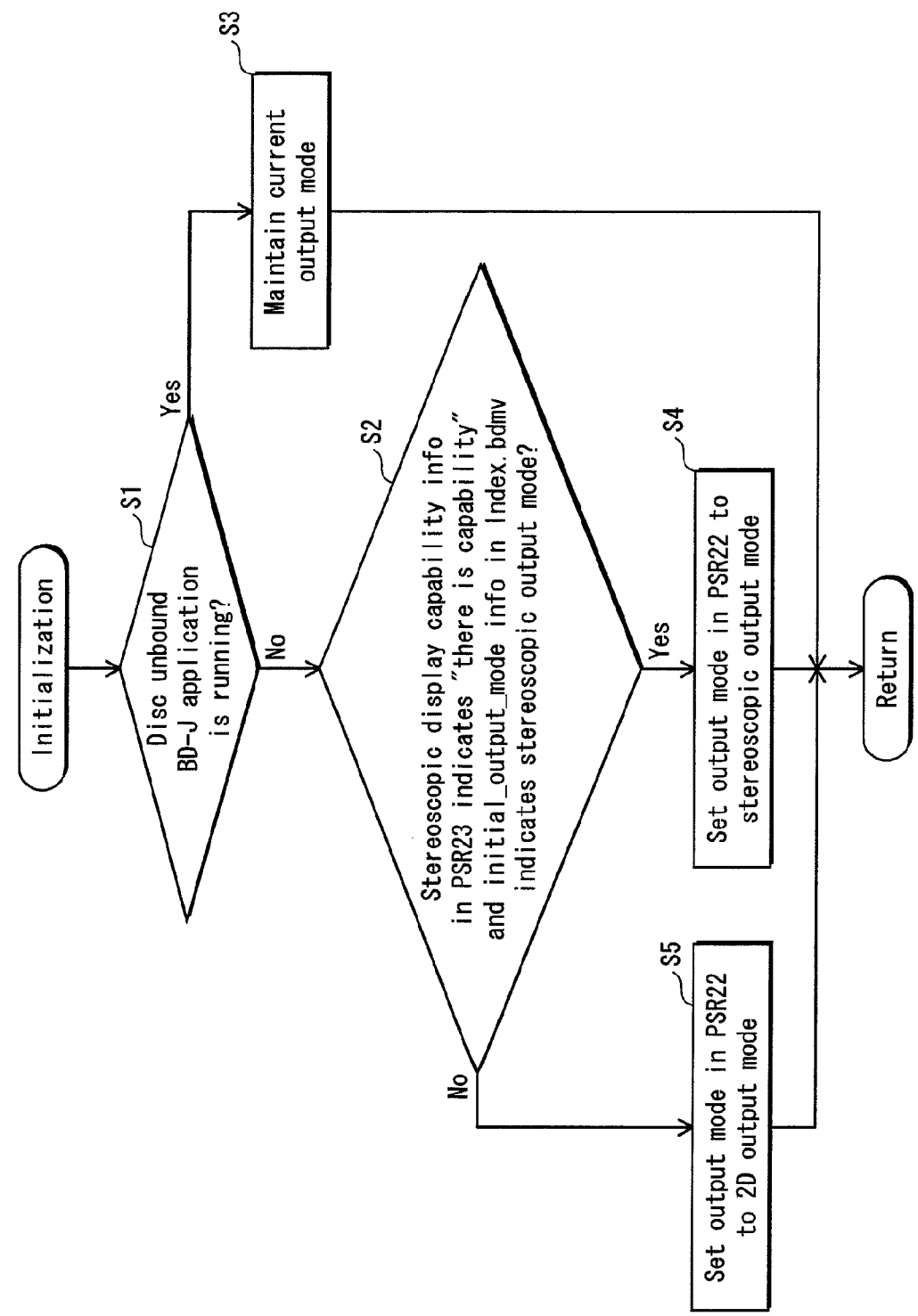
FIG. 32 is a flowchart showing the procedure for the initialization process.

FIG. 32 is a flowchart showing the procedure for the initialization process.

In step S1, it is judged whether or not a disc unbound BD-J application is running. In step S2, it is judged whether or not the stereoscopic display capability information in PSR23 indicates "there is capability" and the initial_output_mode information in Index.bdmv indicates the "stereoscopic output mode".

When it is judged as Yes in step S1, the current output is maintained in step S3. When it is judged as No in step S1 and Yes in step S2, the output mode in PSR22 is set to the stereoscopic output mode in step S4. When it is judged as No in step S1 and No in step S2, the output mode in PSR22 is set to the 2D output mode in step S5.

Figure 33:
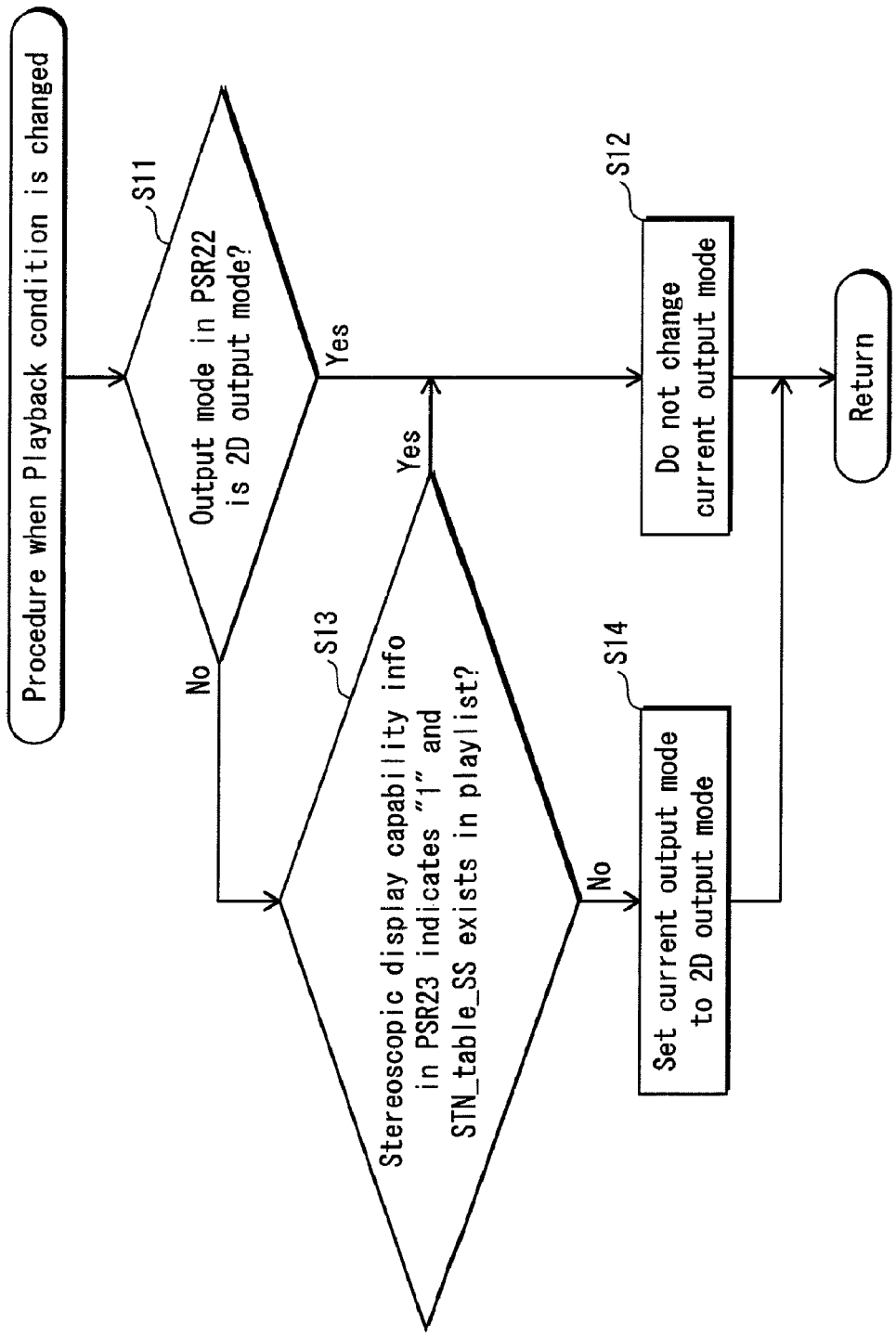
FIG. 33 shows the "Procedure when playback condition is changed"

FIG. 33 shows the "Procedure when playback condition is changed". In step S11, it is judged whether or not the output mode in PSR22 is the 2D output mode. In step S13, it is judged whether or not the stereoscopic display capability information in PSR23 indicates "1" and STN_table_SS exists in the playlist.

When it is judged as Yes in step S11, the current output mode is not changed in step S12. When it is judged as No in step S11 and Yes in step S13, the current output mode is not changed (step S12). When it is judged as No in step S11 and No in step S13, the current output mode is set to the 2D output mode (step S14).

What should be taken into account when a playlist starts to be played back is that PES streams that can be played back in respective playitems are defined in the stream selection tables of the respective playitems. For this reason, when the current playitem starts to be played back, first, it is necessary to select an optimum one for playback from among PES streams that are permitted to be played back in the stream selection table of the current playitem. The procedure for this selection is called "stream selection procedure".

Figure 34:
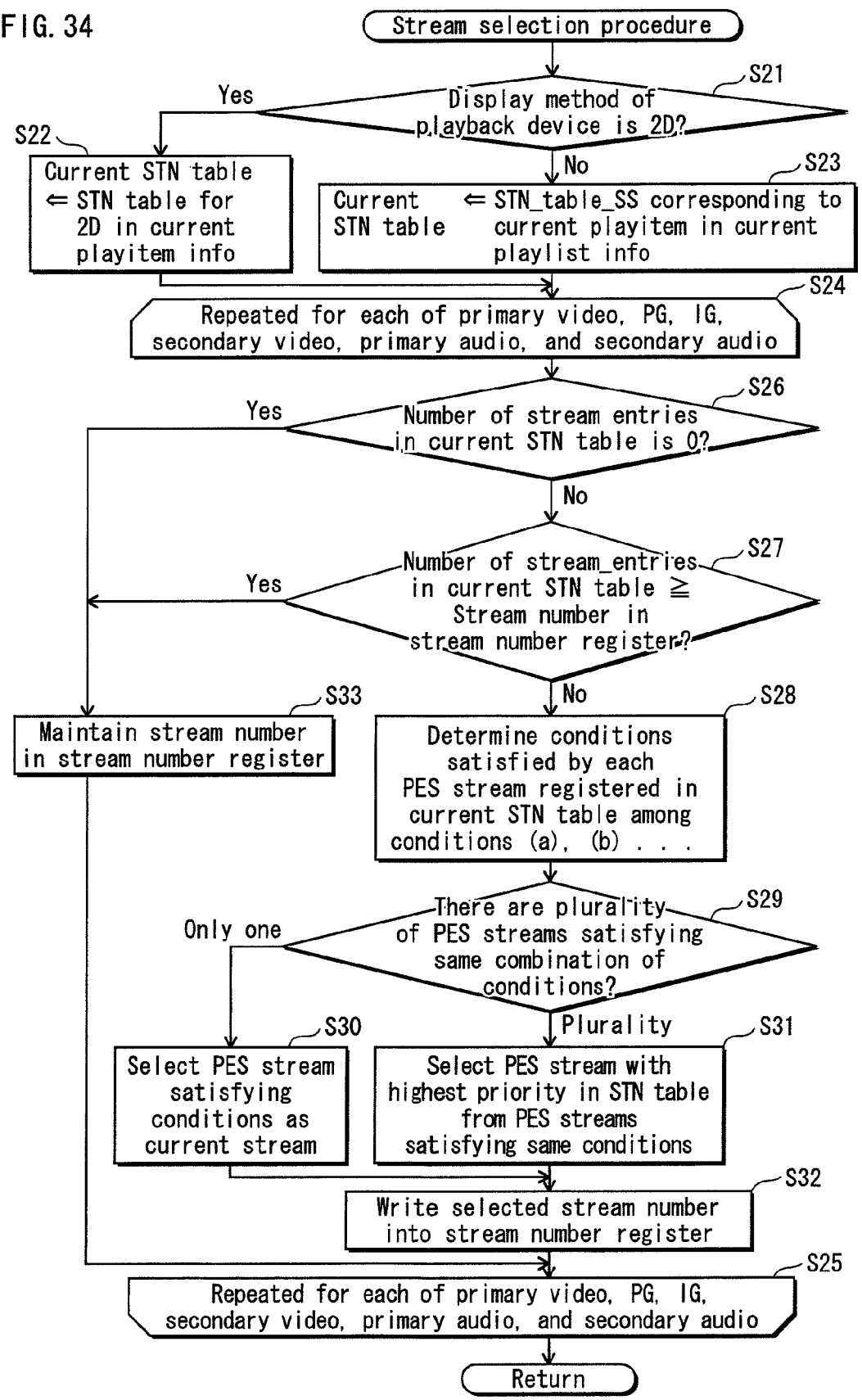
FIG. 34 is a flowchart showing the stream selection procedure.

FIG. 34 is a flowchart showing the stream selection procedure. In step S21, it is judged whether or not the display method of the playback device is 2D. When it is judged as Yes in step S21, the STN_table for 2D in the current playitem information is set to the current STN_table (step S22). When it is judged as No in step S21, the STN_table_SS corresponding to the current playitem, among the STN_table_SSs existing in the extension data in the current playlist information, is set to the current STN_table (step S23). After this, the process of steps S24 through S33 is performed. The process of steps S24 through S33 is repeated for each of the primary video stream, PG stream, IG stream, secondary video stream, primary audio stream, and secondary audio stream. In step S26, it is judged whether or not the number of stream entries, corresponding to the stream x, in the current STN_table is 0. In step S27, it is judged whether or not the number of stream entries, corresponding to the streamx, in the current STN_table is greater than or equal to the stream number stored in the stream number register.

When it is judged as Yes in either step S26 or step S27, the control goes to step S33 in which the stream number stored in the stream number register is maintained.

When it is judged as No in both steps S26 and S27, it is determined which ones among a plurality of conditions are respectively satisfied by the PES streams registered in the current STN_table (step S28). It is then judged whether or not there are a plurality of PES streams satisfying a same combination of conditions (step S29).

When there is only one PES stream satisfying the conditions, the PES stream satisfying the conditions is selected as the current stream (step S30).

When there are a plurality of PES streams satisfying a same combination of conditions, a PES stream having the highest priority in the STN_table is selected from among the PES streams plurality of PES streams satisfying the conditions (step S31). After this, the selected stream number, corresponding to the stream entry of the PES stream, is written into the PSR as the stream number register (step S32).

After the output mode and PES stream that should be played back in the current playitem are determined through the above-described procedures, it is necessary to start playing back the current playitem. The procedure for playing back the current playitem corresponds to the output mode that has been determined through the Procedure when playback condition is changed. The following is the description of the procedure for playing back the playitem which corresponds to the output mode, with reference to FIG. 35.

Figure 35:
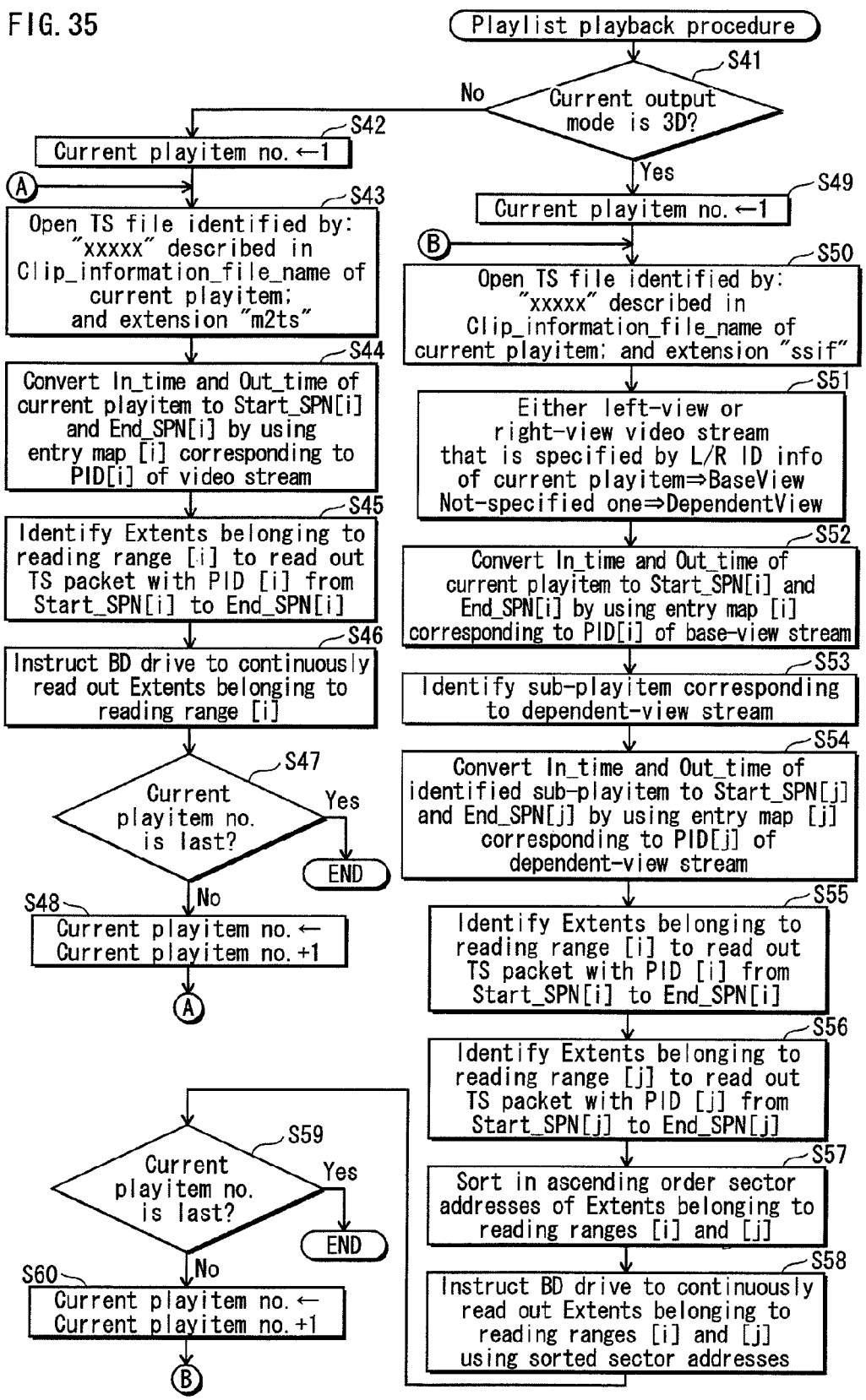
FIG. 35 is a flowchart showing the playitem playback procedure.

FIG. 35 is a flowchart showing the playitem playback procedure.

In step S41, it is judged whether or not the current output mode is the 3D output mode. When the current output mode is the 2D output mode, the current playitem number is initialized to "1" in step S42, and then a loop constituted from steps S43 through S48 is performed.

In this loop, the process of steps S43 through S46 is performed onto the current playitem, and then the current playitem number is incremented (step S48). The loop is repeated until the last current playitem number is detected (Yes in step S47). The steps S43 through S46 are performed as follows.

In step S43, the TS file, which is identified by: "xxxxx" described in Clip_information_file_name of the current playitem; and extension "m2ts", is opened. In step S44, the "In_time" and "Out_time" of the current playitem are converted into "Start_SPN[i]" and "End_SPN[i]" by using the entry map corresponding to the packet ID of the video stream.

In step S45, the Extents belonging to the reading range [i] are identified to read out the TS packet with PID [i] from the Start_SPN[i] to the End_SPN[i]. In step S46, the BD drive is instructed to continuously read out the Extents belonging to the reading range [i].

When the current output mode is the stereoscopic output mode (Yes in step S41), the current playitem number is initialized to "1" in step S49, and then a loop constituted from steps S50 through S60 is performed.

In this loop, the process of steps S50 through S58 is performed onto the current playitem, and then the current playitem number is incremented (step S60). The loop is repeated until the last current playitem number is detected (Yes in step S59). The steps S50 through S58 are performed as follows.

In step S50, the transport stream file, which is identified by: "xxxxx" described in the Clip_information_file_name of the current playitem; and extension "ssif", is opened. In step S51, either the left-view or right-view video stream that is specified by the left-view/right-view identification information of the current playitem information is set to the base-view video stream. The left-view or right-view video stream that is not set to the base-view video stream is set to the dependent-view stream.

In step S52, the "In_time" and "Out_time" of the current playitem are converted to "Start_SPN[i]" and "End_SPN[i]" by using the entry map corresponding to the packet ID of the base-view video stream.

In step S53, the sub-playitem corresponding to the dependent-view stream is identified. In step S54, the "In_time" and "Out_time" of the identified sub-playitem are converted into "Start_SPN[j]" and "End_SPN[j]" by using the entry map [j] corresponding to the packet ID [j] of the dependent-view stream.

The Extents belonging to the reading range [i] are identified to read out the TS packet having the packet ID [i] from "Start_SPN[i]" to "End_SPN[i]" (step S55). The Extents belonging to the reading range [j] are identified to read out the TS packet having the packet ID [j] from "Start_SPN[j]" to "End_SPN[j]" (step S56). Following this, in step S57, the Extents belonging to the reading ranges [i] and [j] are sorted in the ascending order. In step S58, the BD drive is instructed to continuously read out the Extents belonging to the reading ranges [i] and [j] using the sorted addresses.

In the HDMV mode, when playback of a playlist stops, nothing is displayed on the screen, while in the BD-Jmode, even if playback of a playlist stops, something may be displayed on the screen because the BD-J application can perform the screen rendering. In such a case, a mismatch will occur if the BD-J application performs the screen rendering for the planar view while the playback control engine side realizes the stereoscopic view.

After a playlist starts to be played back, it is necessary to convert the menu or graphics to 3D or 2D, depending on whether the playlist provides 3D images or 2D images. In view of this, in the present embodiment, the middleware outputs an event to the BD-J application to urge the screen rendering for the stereoscopic viewing.

Here, a description is given of a mechanism for notifying a program, which is recorded on a disc and is running on the playback device, with the timing at which a switch occurs between a 2D image and a 3D image.

Figure 36:
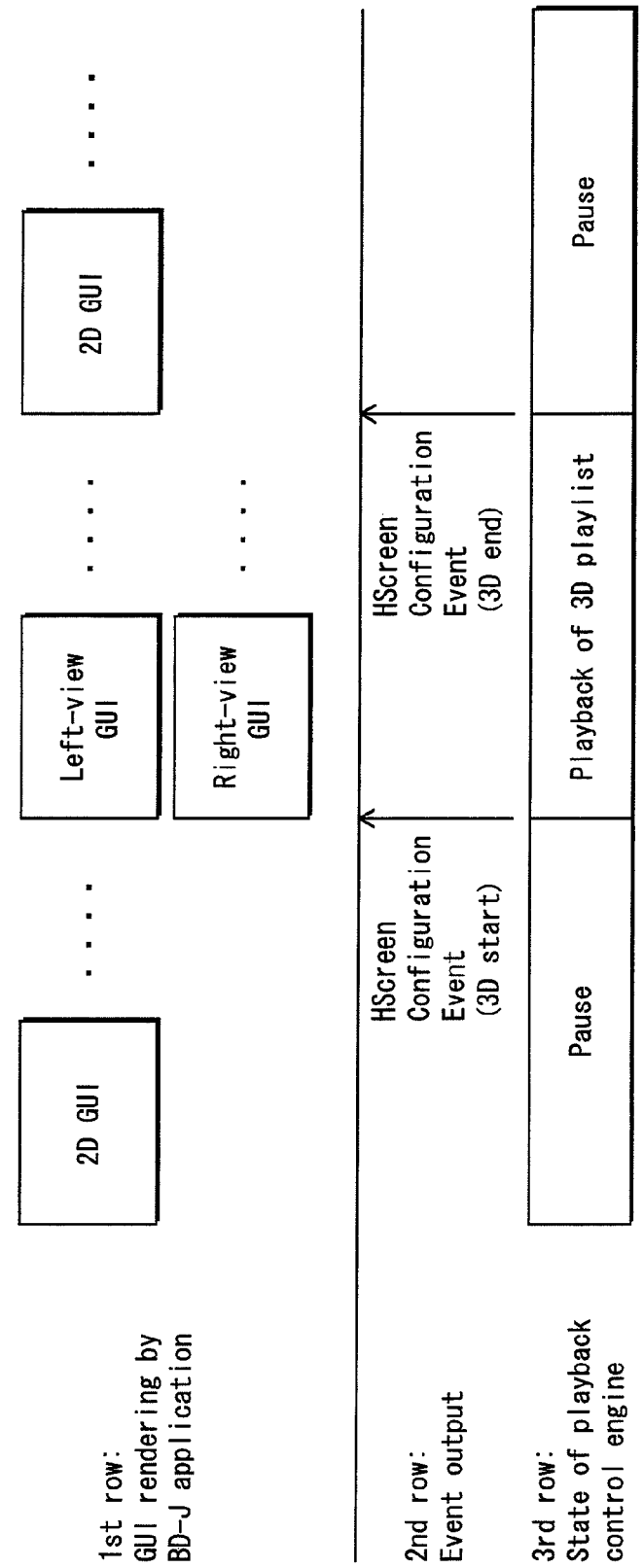
FIG. 36 shows what event is output to the BD-J application when the state of the playback control engine changes from pause to the 3D playlist.

According to the state transition shown in FIG. 31, when a playlist starts to be played back during a playback of a BD-J title, the "Procedure when playback condition is changed" is executed. When this happens, the start of the playlist must be notified to the BD-J application by some means. FIG. 36 shows how to notify the BD-J application of the start of the playlist.

FIG. 36 shows what event is output to the BD-J application when the state of the playback control engine changes from "Pause" to "Playback of 3D playlist".

The first row of FIG. 36 shows the GUI rendered by the BD-J application. The third row shows the state of the playback control engine. The second row shows the HscreenConfiguration event that is output from the middleware to the BD-J application.

According to the third row of FIG. 36, the state of the playback control engine changes as: "Pause"–>"Playback of 3D playlist"–>"Pause". Also, the HscreenConfiguration event indicating the 3D start is output at the timing when the state of the playback control engine changes from "Pause" to "Playback of 3D playlist", and the HscreenConfiguration event indicating the 3D end is output at the timing when the state of the playback control engine changes from "Playback of 3D playlist" to "Pause".

As shown in the first row of FIG. 36, the GUI that is rendered by the BD-J application while the playback control engine pauses is the 2D GUI. On the other hand, the GUI that is rendered by the BD-J application while the 3D playlist is played back is the 3D GUI. This is because the BD-J application changes the GUI targeted for the rendering, in response to the output of the event.

Figure 37:
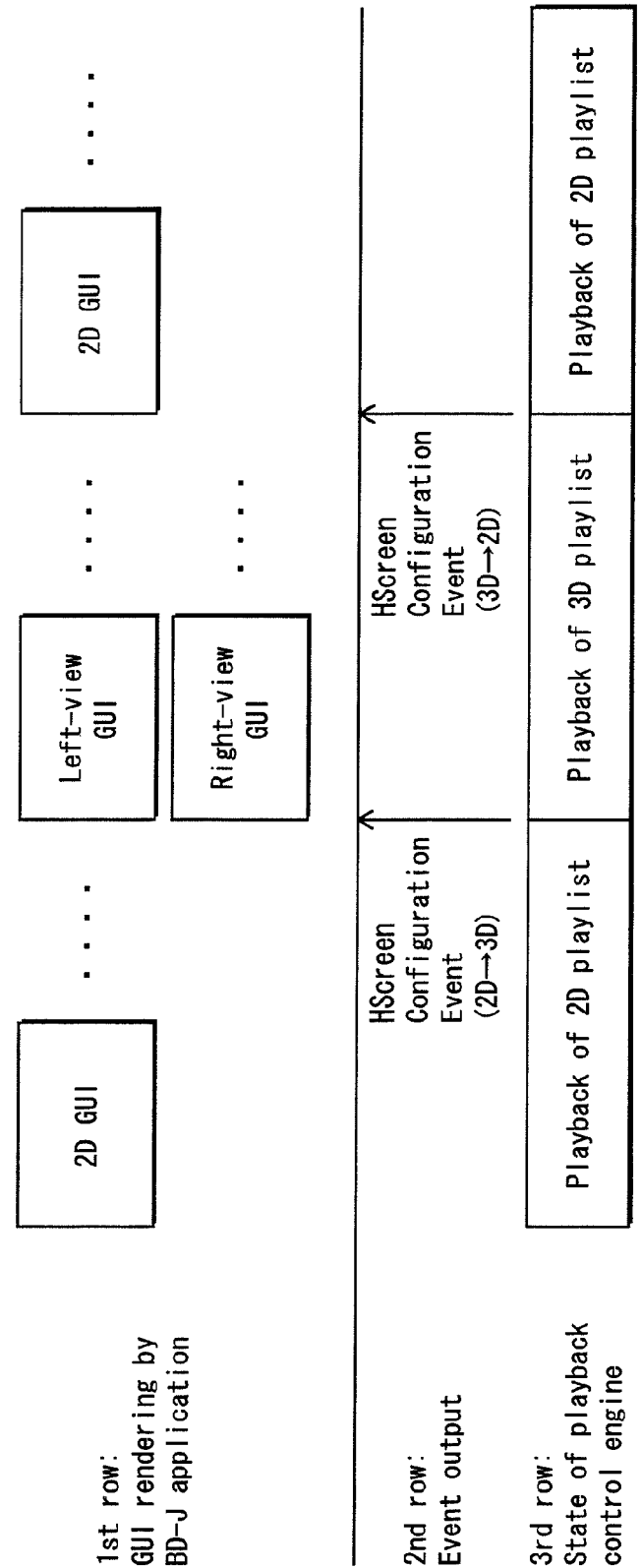
FIG. 37 shows what event is output to the BD-J application when the state of the playback control engine changes from "Playback of 2D playlist" to "Playback of 3D playlist"

Next is a description of a case in which the playback control engine 7b changes the target of playback from a 2D playlist to a 3D playlist in the middle of the playback, a case different from the above-described one in which a playback is started after a pause. FIG. 37 shows what event is output to the BD-J application when the state of the playback control engine changes from "Playback of 2D playlist" to "Playback of 3D playlist".

The first row of FIG. 37 shows the GUI rendered by the BD-J application. The third row shows the state of the playback control engine. The second row shows the HscreenConfiguration event that is output from the middleware to the BD-J application.

According to the third row of FIG. 37, the state of the playback control engine changes as: "Playback of 2D playlist"–>"Playback of 3D playlist"–>"Playback of 2D playlist". Also, the HscreenConfiguration event indicating the 3D start is output at the timing when the state of the playback control engine changes from "Playback of 2D playlist" to "Playback of 3D playlist", and the HscreenConfiguration event indicating the 3D end is output at the timing when the state of the playback control engine changes from "Playback of 3D playlist" to "Playback of 2D playlist".

As shown in the first row of FIG. 37, the GUI that is rendered by the BD-J application while the playback control engine plays back the 2D playlist is the 2D GUI. On the other hand, the GUI that is rendered by the BD-J application while the 3D playlist is played back is the 3D GUI. This is because the BD-J application changes the GUI targeted for the rendering, in response to the output of the event.

Next is a description of a case in which the user instructs the playback device to change the subtitle or audio while the playback control engine plays back a 3D playlist. In this case, the stream targeted for the playback is changed. The following describes the case of changing the stream, with reference to FIG. 38.

Figure 38:
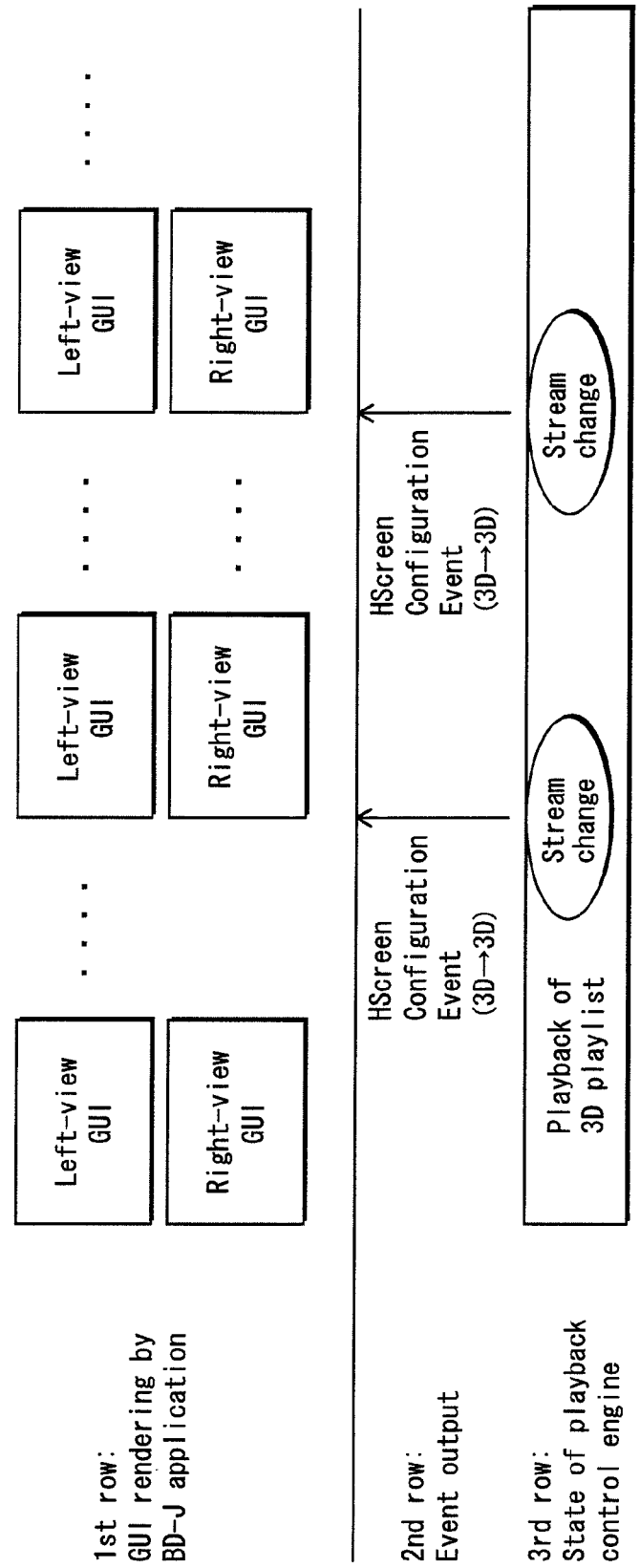
FIG. 38 shows what event is output to the BD-J application when the stream targeted for the playback is changed while the playback control engine plays back a 3D playlist.

FIG. 38 shows what event is output to the BD-J application when the stream targeted for the playback is changed while the playback control engine plays back a 3D playlist.

The first row of FIG. 38 shows the GUI rendered by the BD-J application. The third row shows the state of the playback control engine. The second row shows the HscreenConfiguration event that is output from the middleware to the BD-J application.

According to the third row of FIG. 38, the state of the playback control engine is the playback of 3D playlist, but during which a switch occurs between streams. Also, the HscreenConfiguration event is output at the timing when a switch occurs from a first stream to a second stream, and at the timing when a switch occurs from the second stream to the first stream.

As shown in the first row of FIG. 38, the GUI that is rendered by the BD-J application while the playback control engine plays back the 3D playlist is the 3D GUI.

When a playback of a 3D image is started or ended at the timing when the playitem or the playlist changes, or at the timing when the user changes the stream, an event is output. This makes it possible to detect the timing at which a switch occurs between a 2D image and a 3D image and to change the menu graphics to an appropriate one.

As described above, according to the present embodiment, when the output mode of the playback device is the stereoscopic playback mode, Extents constituting a transport stream file in the interleave format, which is identified by a combination of (i) the Clip_Information_file_name included in the playlist information and (ii) an extension indicating that it is a transport stream file in the interleave format, are read out and played back. This allows Extents constituting a transport stream file in the interleave format to be read out and played back only when the output mode is set to the stereoscopic playback mode. With this structure, 2D playback devices cannot read out Extents constituting a transport stream file in the interleave format. This prevents the 2D playback devices from suffering from an erroneous operation or an unstable operation due to the change of the ATS value unique to the transport stream file in the interleave format, namely the repetitive, irregular change of the ATS value of increase and decrease.

Also, it is possible to preliminarily describe a predetermined piece of file reference information in the playlist information so as to readout and play back, in the 3D playback, a stream file in the interleave format having (i) a file name that is the same as the predetermined piece of file reference information and (ii) an extension indicating that it is a transport stream file in the interleave format, and in the 2D playback, a transport stream file having (i) a file name that is the same as the predetermined piece of file reference information and (ii) an extension indicating that it is normal-format transport stream file. This eliminates the need for creating respectively the 3D playlist information and the 2D playlist information, thus reducing the trouble of authoring. The reduction in the trouble of authoring will contribute to the production of enhanced movie works for the stereoscopic viewing.

Embodiment 2

Figure 39:
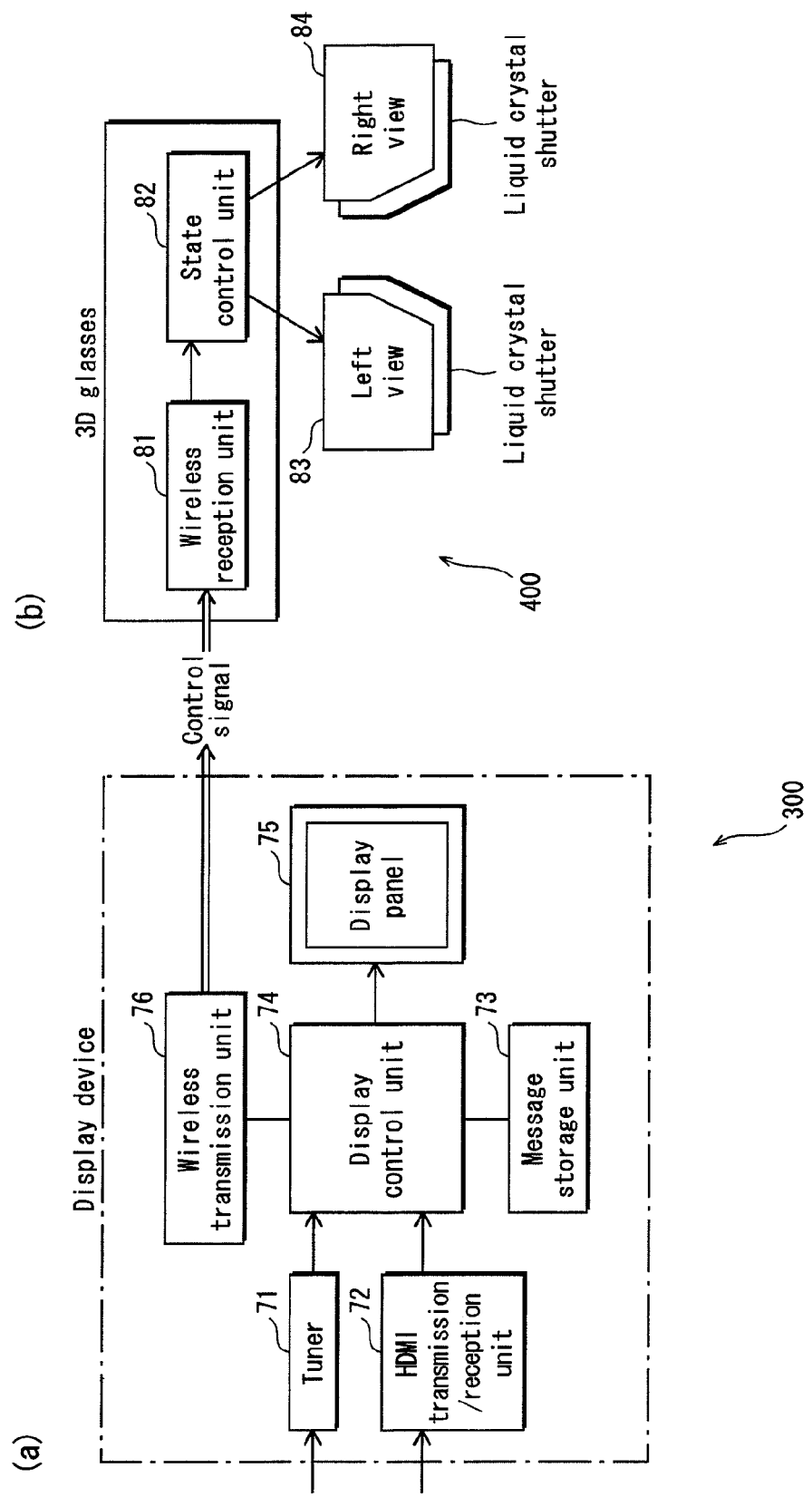
FIG. 39 shows the internal structures of the display device 300 and 3D glasses 400.

Embodiment 2 describes the functions and the internal structures of a display device 300 and 3D glasses 400 with reference to FIG. 39.

Part (a) of FIG. 39 shows the internal structure of the display device 300. As shown in FIG. 39, the display device 300 includes a tuner 71, an HDMI transmission/reception unit 72, a message storage unit 73, a display control unit 74, a display panel 75, and a wireless transmission unit 76.

The tuner 71 receives a multi-channel transport stream transmitted by the digital terrestrial broadcasting or the satellite digital broadcasting, and demodulates the received multi-channel transport stream. In so doing, the tuner 71 can select a plurality of channels simultaneously and output non-compressed pictures.

The HDMI transmission/reception unit 72 receives non-compressed, synthesized picture data transmitted from the playback device via the HDMI.

The message storage unit 73 stores a warning message which is to be displayed in place of a picture.

The display control unit 74 performs a control to display the non-compressed pictures obtained as a result of demodulation by the tuner 71, and performs a control to display the non-compressed, synthesized pictures transmitted from the playback device via the HDMI. In displays, the display control unit 74 can change the display periods with the time accuracy of 1/120 seconds or 1/140 seconds. With use of the time accuracy, it is possible to divide, for example, the display period of 1/24 seconds into smaller display periods such as 1/48 seconds, 1/72 seconds, and 1/92 seconds.

The display panel 75 is a device that emits light in units of pixels by driving the liquid crystal display elements, plasma light-emitting elements, or organic EL elements, and displays non-compressed picture data under control of the display control unit 74.

The wireless transmission unit 76 controls the 3D glasses 400 by the infrared communication method or the wireless LAN method. More specifically, the wireless transmission unit 76 transmits a sync signal that urges the state transition of the 3D glasses 400, at the beginning of each display period in each of the 3D mode and the multi-channel mode. The repetitive transmissions of the sync signal cause the 3D glasses 400 to transit to the light transmission state in the left-view period, to the light block state in the right-view period, and to the light transmission state in the left-view period, for example. The state of the 3D glasses 400 changes as shown in FIGS. 1B and 1C.

In the present embodiment, as a process for the 3D mode, the display control unit 74 divides the display period of 1/24 seconds into three smaller display periods (display periods 1/3, 2/3, and 3/3) each having a time length of 1/72 seconds, and displays different contents in the three smaller display periods 1/3, 2/3, and 3/3, respectively. For example, the left view is displayed in the first display period 1/3, the right view is displayed in the second display period 2/3, and a warning message is displayed in the third display period 3/3. At the beginning of each of the display periods, a sync signal is transmitted to the glasses so that the state of the left view and right view transits.

As a process for the multi-channel mode, the display device 300 demodulates a plurality of channels by the time division. And the display control unit 74 divides the display period of 1/24 seconds into two smaller display periods (display periods 1/2 and 2/2) each having a time length of 1/48 seconds, and displays different contents in the two smaller display periods 1/2 and 2/2, respectively. For example, the channel 1 is displayed in the first display period 1/2 and the channel 2 is displayed in the second display period 2/2. When a display period of a certain channel arrives, the glasses of the user who desires to view the certain channel are caused to transit to the light transmission state, and the glasses of the user who desires to view another channel are caused to transit to the light block state.

Part (b) of FIG. 39 shows the internal structure of the 3D glasses 400.

The 3D glasses 400 include a wireless reception unit 81 for receiving sync signals, which trigger the state transition, from the display device 300, a state control unit 82 causing the state of the liquid crystal shutters to transit between the light transmission state and the light block state, and liquid crystal shutters 83 and 84.

The glasses also have operation modes: 3D mode; and multi-channel mode.

In the 3D mode, the glasses can transit to the light-block-block state, as well as to the light transmission state and the light block state. The light-block-block state is a state in which both the left view and the right view are closed.

In the multi-channel mode, the glasses transit between the light-transmission-transmission state in which both the left view and the right view are opened, and the light-block-block state in which both the left view and the right view are closed.

To realize the stereoscopic display, the present embodiment not only switches between the left view and the right view of the glasses, but also displays a warning message to urge wearing of the 3D glasses 400, preventing the user who has already wearing the 3D glasses from seeing the message. Now, a description is given of how to control the 3D glasses 400 to prevent the user who has already wearing the 3D glasses from seeing the message, with reference to FIG. 40.

Figure 40:
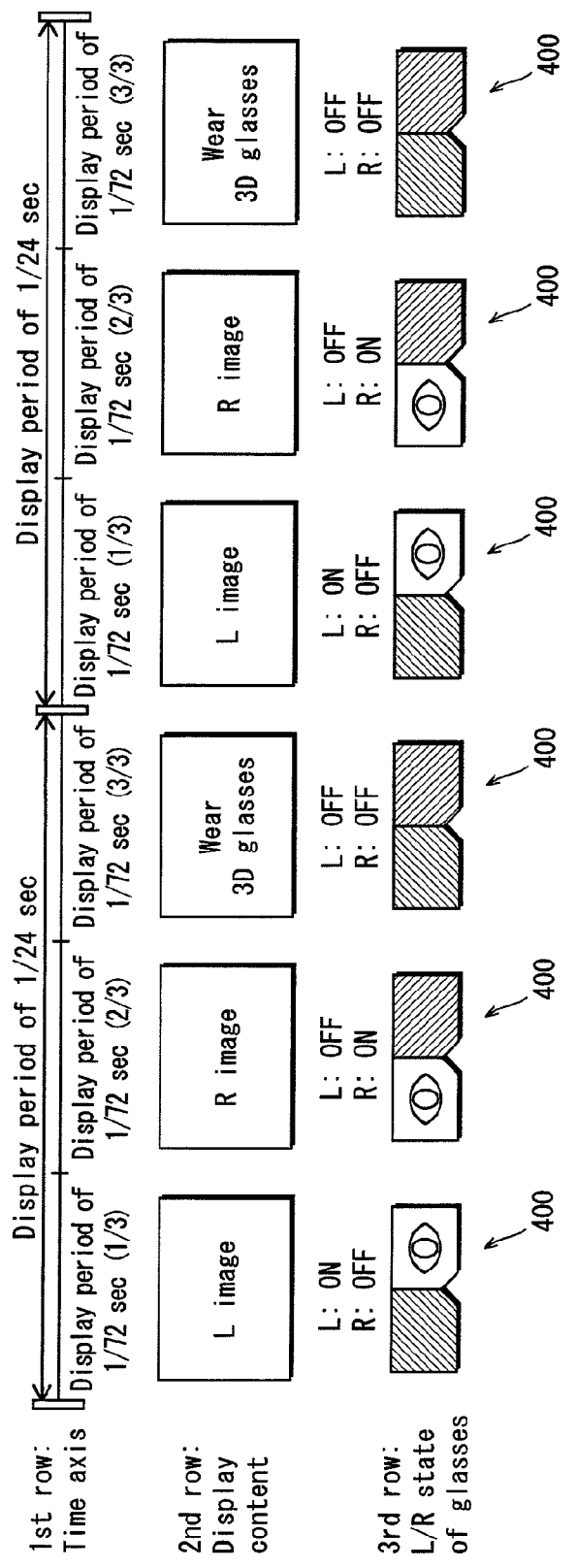
FIG. 40 shows the display contents in the 3D mode and the state of the left and right views of the glasses.

FIG. 40 shows the display contents in the 3D mode and the state of the left and right views of the glasses. The first row of FIG. 40 shows display periods on the playback time axis. The second row shows display contents of the playback device. The third row shows the state of the left and right views of the glasses. Within each display period of 1/24 seconds, in the first display period 1/3 of 1/72 seconds, the left view image is displayed on the display device, and the left view of the glasses is in the light transmission state, and the right view of the glasses is in the light block state. In the next display period 2/3 of 1/72 seconds, the right view image is displayed on the display device, and the right view of the glasses is in the light transmission state. And in the last display period 3/3 of 1/72 seconds, a warning screen is displayed on the display device to urge wearing of the 3D glasses, and both the left view and the right view of the glasses are in the light block state.

In the last display period 3/3 among the three display periods of 1/72 seconds obtained by dividing the display period of 1/24 seconds, the user who is wearing the glasses cannot see the warning message displayed on the screen. The message "Wear 3D glasses" displayed on the screen can only be seen by users who are not wearing the glasses, but cannot be seen by users who are wearing the glasses. In this way, a message suitable for the situation is displayed.

In the multi-channel display, the display device uniquely control the shutters equipped with the two pairs of glasses, not merely switching between the left and right shutters. The unique control will be described with reference to FIG. 41.

Figure 41:
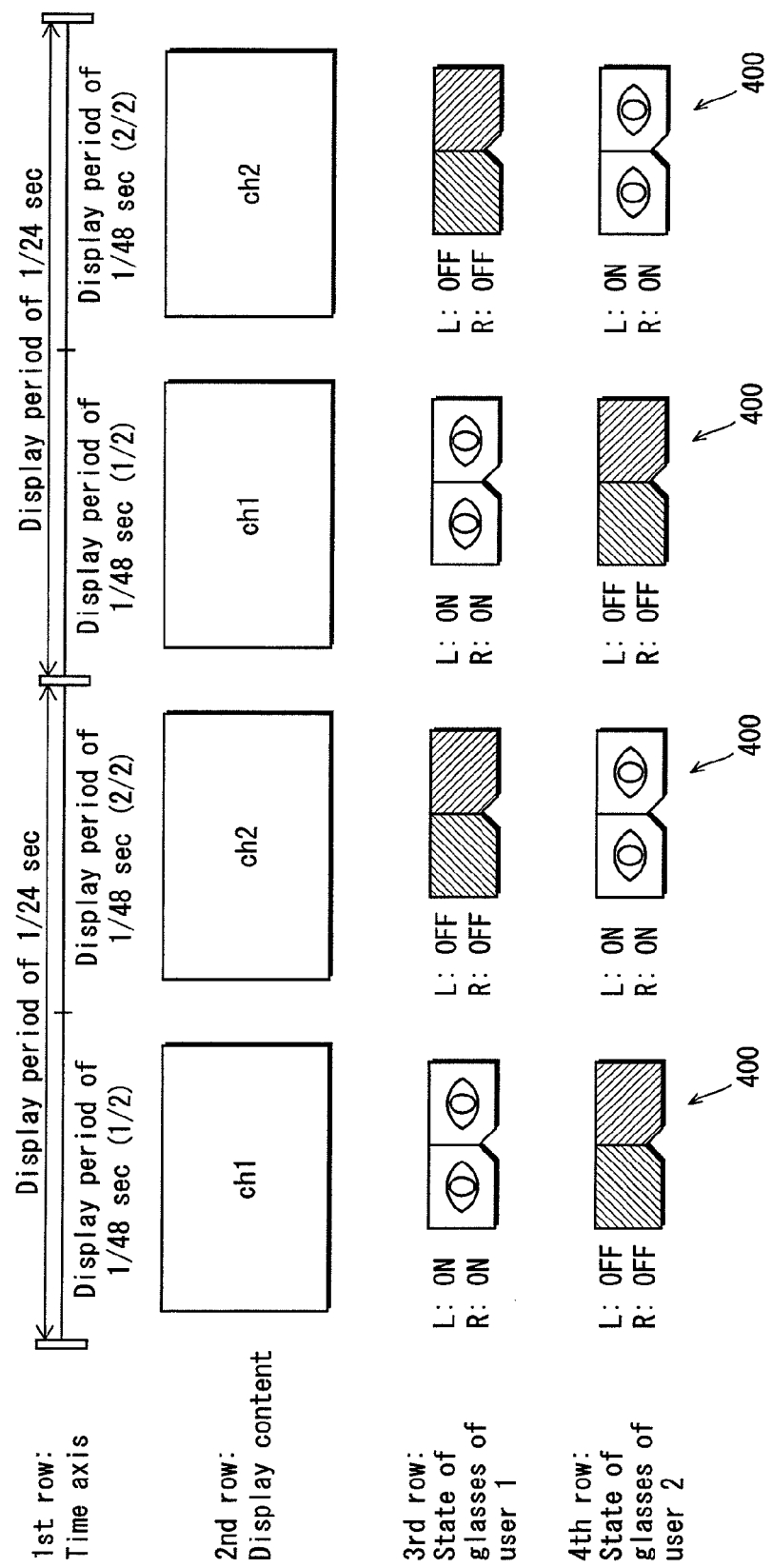
FIG. 41 shows the display content in the 3D mode and the states of the glasses of two users when the display device uniquely control the shutters equipped with the two pairs of glasses, not merely switching between the left and right shutters.

FIG. 41 shows the display content in the 3D mode and the states of the glasses of two users when the display device uniquely control the shutters equipped with the two pairs of glasses, not merely switching between the left and right shutters. The first row of FIG. 41 shows the display periods on the playback time axis, the second row shows the display content of the display device, and the third and fourth rows show the states of the glasses of the two users.

Within each display period of 1/24 seconds, in the first display period 1/2, the glasses worn by the user 1 are in the light-transmission-transmission state, and the user 1 can view Channel 1 (ch1).

In the first display period 1/2, the glasses worn by the user 2 are in the light-block-block state, and the user 2 cannot view Channel 1 (ch1).

In the second display period 2/2, the glasses worn by the user 1 are in the light-block-block state, and the user 2 cannot view Channel 2 (ch2). In the second display period 2/2, the glasses worn by the user 2 are in the light-transmission-transmission state, and the user 2 can view Channel 2 (ch2). With this usage, two persons can watch different channels simultaneously on one screen.

Also, each person wearing a pair of 3D glasses can use an earphone embedded in the glasses to independently enjoy the video and audio. This expands the application: for example, preventing a fight over favorite channel in the living room; and playing a versus game on one screen. Also, increasing the steps will make it possible to display three or more channels on one screen.

As described above, with the present embodiment, a plurality of users viewing the display device can view different, desired channels respectively, by wearing the 3D glasses 400. Since the users can watch their favorite programs respectively even if there are not as many display devices as the users, it is possible to use efficiently the living room of the users' home.

Embodiment 3

Embodiment 3 relates to negotiation between the playback device and the display device. Because the home theater systems built in the users' homes are unique to each other, it is necessary for the playback device to negotiate with the display device when they are connected, to determine what playlist should be prepared for the playback.

Embodiment 3 describes an improvement of simultaneously outputting digital data for 3D and analog data for a conventional display device.

With respect to BD-ROMs storing 3D images, consideration should be taken so that they are normally played back in 2D playback devices which are already widespread and there are enormous number of them. One of the methods for realizing it is to control it by the program on the BD-ROM, as described in Embodiment 1. However, a bug in the program may lead to an incorrect selection, causing an inappropriate image to be played back. This may damage the user's health or place such an excessive burden on the playback device to destroy it. Therefore, some mechanism is required to prevent a playback of an inappropriate image.

The following describes the connection with a 2D TV.

In the first place, conventional analog devices do not support 3D images, and thus cannot output 3D images. In view of this, while the playback device is playing back a 3D image, a message such as "3D image is currently provided. Please watch this on a 3D-supporting display" is displayed through an analog output to let the user know that he/she is connecting with a wrong terminal or a display device that does not support 3D images. It is further preferable that after this, the playback is automatically switched to a 2D playlist when the display device connected to the playback device is a 2D display device.

Next, a description is given of the case where a 2D display device and a 3D display device are connected to the playback device, and image signals are output to these display devices simultaneously. When a 2D display device and a 3D display device are connected to the playback device, and image signals are output to them simultaneously, either the left-view or right-view of the 3D image is output to the 2D display device.

What is called 2D output priority image information is information that defines which of the left-view and right-view video streams is to be output for the analog display when image signals of the playlist are output simultaneously. The 2D output priority image information is provided preliminarily in the playlist, and images signals are output to the 2D display device and the 3D display device simultaneously in conformance with the 2D output priority image information in the current playlist. With this structure, it is possible to output image signals simultaneously to the two display devices even if 2D and 3D images cannot be decoded simultaneously or even if 2D and 3D playlists are not used independently.

Similarly, when an OSD (system built-in menu) display is performed, a 3D-supporting OSD display is performed on the 3D display device, and a 2D image dedicated to the 2D display device or only the left view or the right view is output to the output such as the analog output that supports only the 2D.

When it is difficult to perform outputs for the 3D and the 2D, it is preferable that a sub-display unit is provided on the remote control, and the images are displayed on the sub-display unit.

Figure 42:
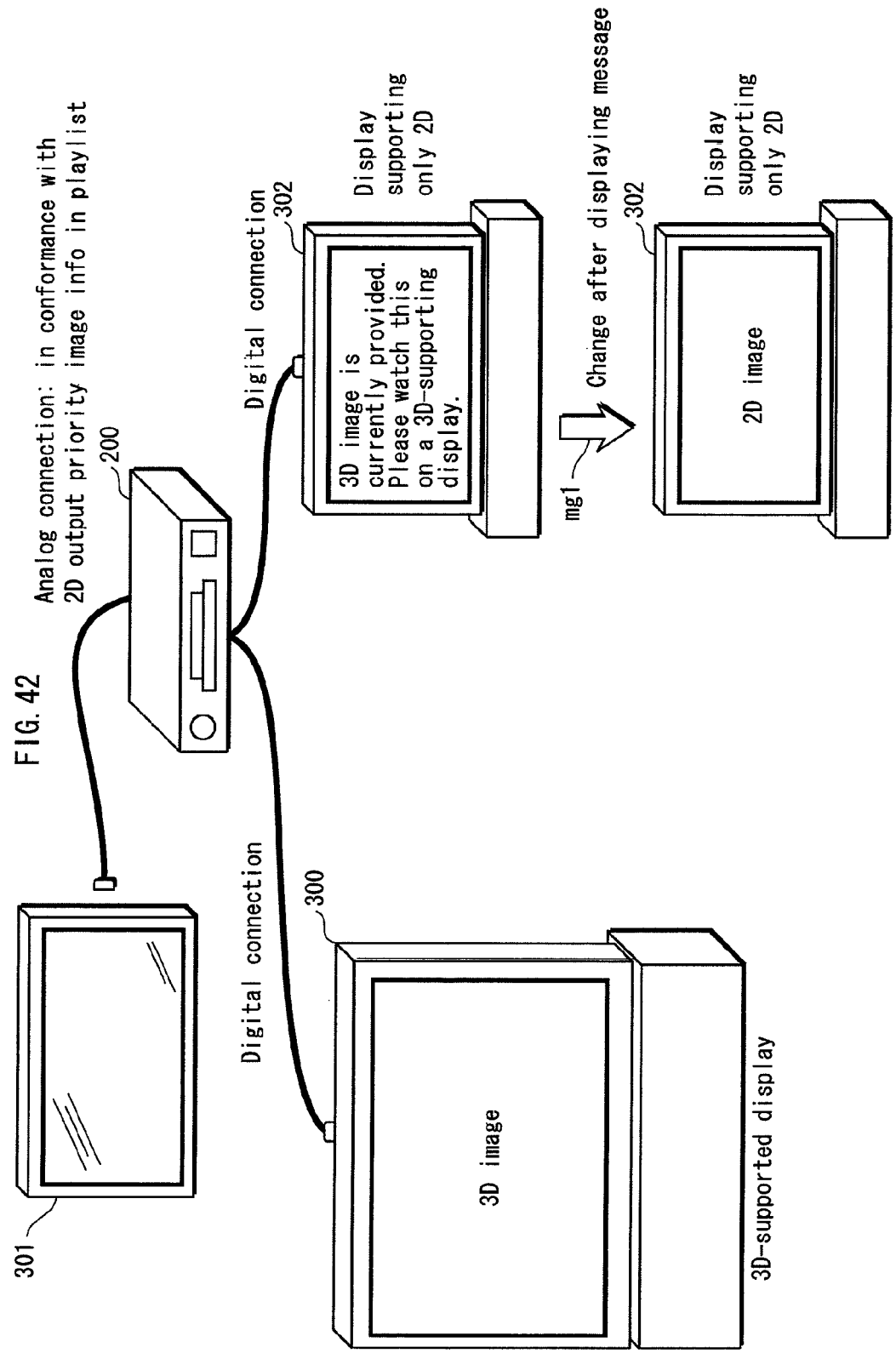
FIG. 42 shows a connection format between the playback device and the display device.

These will be described in more detail with reference to FIG. 42. FIG. 42 shows a connection format between the playback device and the display device. The upper part of FIG. 42 shows a display device with an analog connection. The lower-left part shows a display device 300 that supports the 3D and is digitally connected, and the lower-right part shows a 2D display device 302 that is digitally connected.

When the playback device is connected with the 3D display device and the 2D display device, the playback device tries to negotiate with these display devices. When the playback device finds out that it cannot negotiate with a display device since it is connected analog with the display device, it plays back either the left-view or right-view video stream that is indicated in the 2D output priority image information. With this arrangement, when the playback device is connected analog with a display device, it is possible to play back a playlist that a person in charge of authoring intends to play back.

On the other hand, when the playback device is connected with two display devices digitally and the negotiation is successful, the playback device checks whether each of the display devices is a 3D display device or a 2D display device.

When it is found by the negotiation that the display device connected with the playback device is a 2D display device, the playback device causes the 2D display device to display the message and image as indicated by the arrow mg1 shown in FIG. 42.

The arrow mg1 indicates the transition of the contents displayed on the screen of the 2D display device. In the case of the digital connection, a message "3D image is currently provided. Please watch this on a 3D-supporting display" is displayed, and then a 2D image is displayed.

Also, in the negotiation, it is necessary to switch among a plurality of right-views. One of the reasons for this is the difference in size among the display devices. Each person is considered to have a similar distance between the left and right eyes even when the individual variability is taken into account. In contrast, display devices vary in size, for example, from a 20-inch size to 150-inch size. For example, when a user views an image, that was created assuming a 50-inch size display device and a distance of 6.5 cm between the eyes, on a 150-inch size display device, the distance between the eyes suitable for recognizing the image as a 3D image becomes triple and should be 19.5 cm. In view of this, various combinations of a left view video stream and a right view video stream may be stored in correspondence with various sizes of the display devices, so that the difference of 6.5 cm between the left view and the right view can be obtained in each of the various sizes of the display devices. With this structure, it is possible to select an optimum combination of a left view video stream and a right view video stream for any size of the display device.

There are various sizes of display devices such as 150-inch and 50-inch. Even if they have the same number of pixels in the horizontal direction, the distance on the screen is different among them. This will be described with reference to FIG. 43.

FIG. 43 shows the relationships between (i) the difference in the number of pixels between L and R images and (ii) the distance on the screen of the display devices.

On the left-hand side of FIG. 43, combinations of a right-view picture and a left-view picture are shown, where the combinations have different offsets in the horizontal direction.

In the middle column of FIG. 43, distances on the screen of a 50-inch display are shown. On the right-hand side of FIG. 43, distances on the screen of a 150-inch display are shown. As shown in the drawing, when the difference between the right and left pictures in the horizontal direction is 50 pixels, the distances on the screen of the 50-inch display is 2.0 cm, and the distances on the screen of the 150-inch display is 6.0 cm.

When the difference between the right and left pictures in the horizontal direction is 100 pixels, the distances on the screen of the 50-inch display is 4.0 cm, and the distances on the screen of the 150-inch display is 12.0 cm.

When the difference between the right and left pictures in the horizontal direction is 150 pixels, the distances on the screen of the 50-inch display is 6.0 cm, and the distances on the screen of the 150-inch display is 18.0 cm.

Since 6.0 cm is the optimum distances on the screen of both the 50-inch and 150-inch displays, the 3D Stream Depth Change UO or the 3D Stream Depth Change command is used to change the distance displayed on the screen.

The program can automatically select an optimum combination of the left and right views by using the method for obtaining the screen sizes of display devices, described above with reference to FIG. 43. With this structure, the user does not need to be concerned about the screen size since an optimum stream is automatically selected.

When a plurality of streams with different depths are recorded in correspondence with different screen sizes, streams with different pixel differences of the local storage may be recorded in the recording medium, and the user itself may select a depth by using a UO or a command for switching among the streams As described up to now, according to the present embodiment, when the playback device is connected with a display device, it is ensured that a more appropriate playback output is performed in terms of the relationship with the display device.

Embodiment 4

Embodiment 4 relates to an improvement of selecting PG and IG streams appropriately for a corresponding video stream for the stereoscopic viewing.

The image to be played back in the 2D playback device is a 2D image, and the corresponding subtitle and menu image are 2D. Similarly, the image to be played back in the 3D playback device is a 3D image, and it is preferable that the corresponding subtitle and menu image are also 3D. This is because when a 2D PG or a 2D IG is displayed together with a corresponding 3D image, the special composition would be different from what was originally intended. When this happens, the user becomes unable to recognize the space normally, and may injure his/her health in the worst case.

Also, even when using a 3D playback device, the user has an option to select a 2D image. In that case, the corresponding subtitle or menu image should be automatically changed from 3d to 2D.

A combination of a 2D image and a subtitle or the like and a combination of a 3D image and a subtitle or the like may be selected by a program. However, by preliminarily storing information that indicates such combinations, it is also possible for the playback device to exclude inappropriate combinations. The mechanism for realizing this will be described in the following.

As described in Embodiment 1, the playlist for 3D includes the STN_table for 2D and the STN_table_SS for 3D, which are divided from the stream selection table. Further, the image, audio, PG, and IG streams that are used only in the 2D playbacks and those used only in the 3D playbacks are registered in different entry groups. When a 2D image is selected, the audio, PG, and IG having been prepared for 3D cannot be selected. Similarly, when a 3D image is selected, the audio, PG, and IG having been prepared for 2D cannot be selected.

It is also possible to divide the management table further so as to manage independently the left view and the right view, from the stream registration of the title/menu image that are associated with the left view and the right view.

A PG stream created for 2D differs from a PG stream created for 3D in the presence of depth, position, and angle. Therefore, the person in charge of authoring must prevent that, while a 3D video stream is played back, a PG stream for 2D is selected and played back together with the 3D video stream.

Figure 44A:
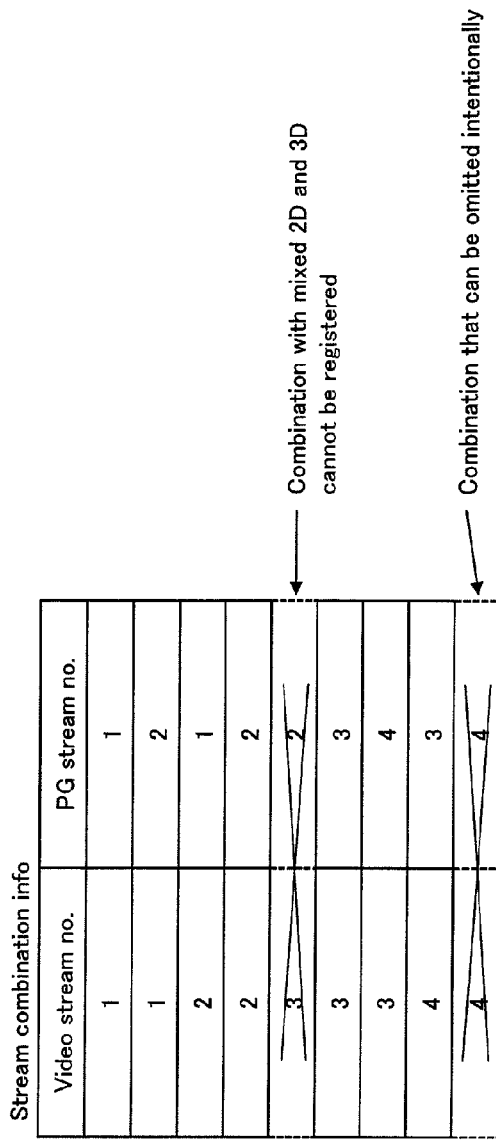
FIGS. 44A and 44B show an example of how the stream combination information is written to indicate combinations of a video stream and a PG stream.
Figure 44B:
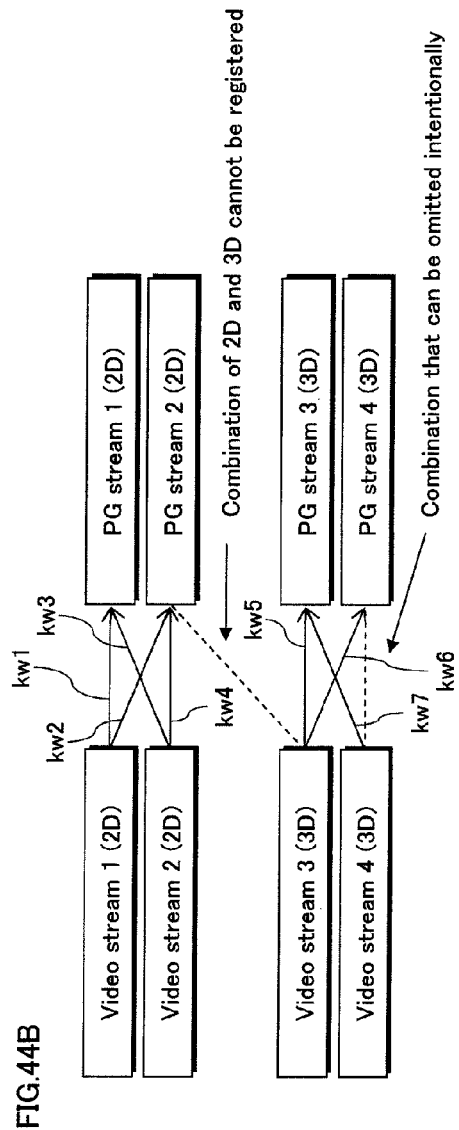

To prevent this, stream combination information is included in the STN_table_SS. FIGS. 44A and 44B show an example of how the stream combination information is written to indicate combinations of a video stream and a PG stream.

As shown in FIG. 44A, the stream combination information in the stream selection table permits the video stream number "1" to be combined with the PG stream numbers "1" and "2".

Also, the stream combination information in the stream selection table permits the video stream number "2" to be combined with the PG stream numbers "1" and "2". Further, the stream combination information permits the video stream number "3" to be combined with the PG stream numbers "3" and "4", and permits the video stream number "4" to be combined with the PG stream numbers "3" and "4".

FIG. 44B is a schematic diagram of permitted combinations of a video stream and a PG stream, which are defined in the stream combination information shown in FIG. 44A.

The left-hand side of FIG. 44B shows video streams with video stream numbers "1" to "4". Of these, video streams with video stream numbers "1" and "2" are for 2D, and video streams with video stream numbers "3" and "4" are for 3D.

The right-hand side of FIG. 44B shows PG streams with PG stream numbers "1" to "4". Of these, PG streams with PG stream numbers "1" and "2" are for 2D, and PG streams with video stream numbers "3" and "4" are for 3D.

The solid lines kw1 to kw4 connecting the video streams with the PG streams schematically indicate the permitted combinations of a video stream and a PG stream that are defined in the stream combination information. As indicated schematically by the solid lines, 2D images cannot be combined with 3D subtitles, nor are combined 3D images with 2D subtitles. Also, certain permitted combinations may be omitted intentionally.

With the above-described structure in which the stream combination information preliminarily indicates combinations of a video stream and a PG stream, and when a video stream is selected, a PG stream for the video stream is selected in accordance with the stream combination information, it is possible to ensure that a PG stream optimum for a video stream is selected.

Figure 45:
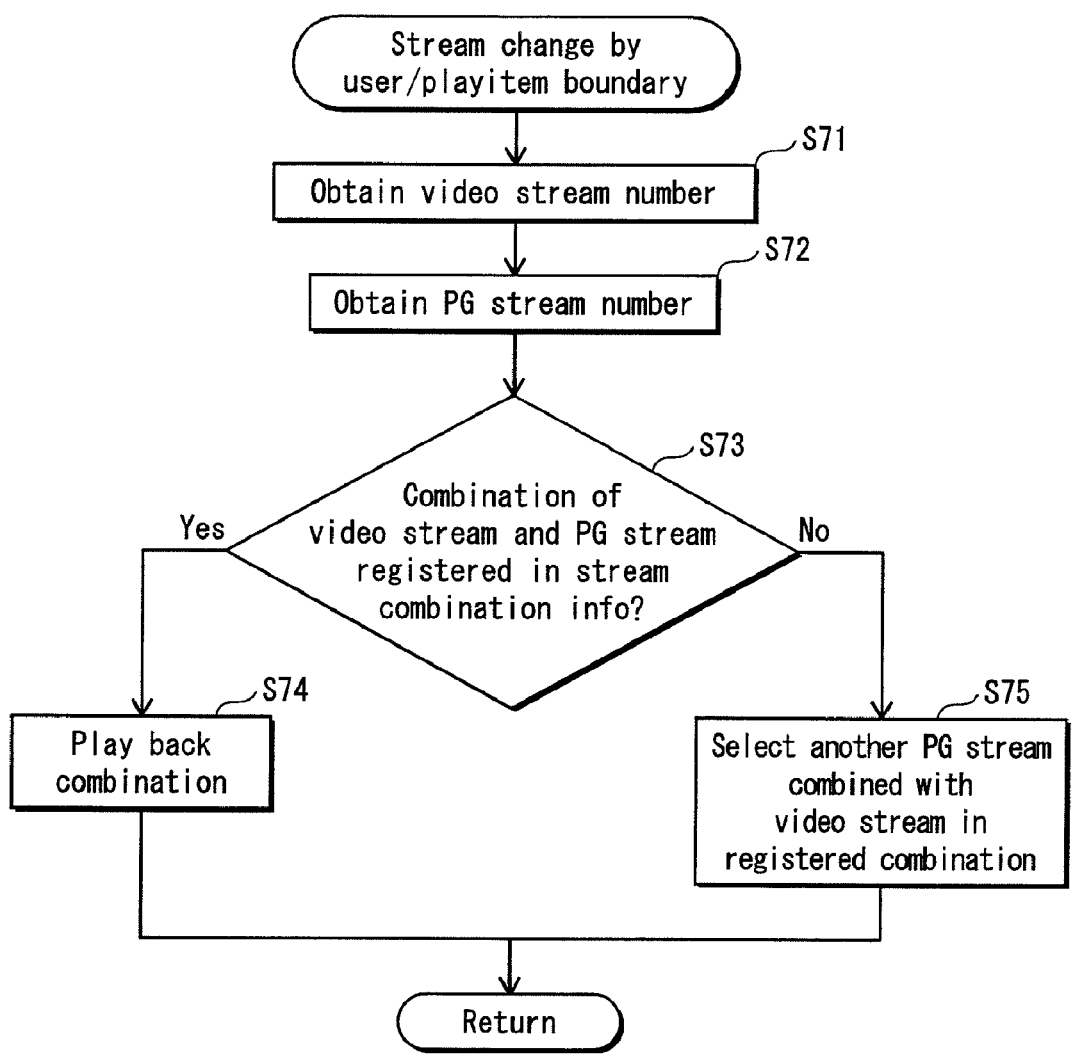
FIG. 45 is a flowchart showing the processing procedure with which the playback device selects a stream in accordance with the stream combination information.

FIG. 45 is a flowchart showing the processing procedure with which the playback device selects a stream in accordance with the stream combination information. The stream selection process shown in FIG. 45 is performed when the user switches streams or when there is a possibility that the stream structure may change, such as at a playitem boundary, such that the combination of a video stream and a PG stream matches one of those registered in the stream combination information.

In step S71, a video stream number is obtained. In step S72, a PG stream number is obtained. In step S73, it is judged whether or not the combination of the video stream and the PG stream is registered in the stream combination information. When the combination is registered, the combination is played back in step S74. When the combination is not registered, another PG stream combined with the video stream in the registered combination according to the stream combination information is selected and played back.

Embodiment 5

As described in the beginning of Embodiment 1, there are various principles for realizing the stereoscopic view, and accordingly stereoscopic products that are and will be on the market are considered to be made based on various 3D systems. Also, since each display device supports a predetermined 3D system, it is preferable that the playback device has system parameters indicating a plurality of 3D systems. The present embodiment deals with, for example, the following 3D playback systems: the two-screen stereo playback system in which videos for two screens are sent independently; the side-by-side system; the horizontally double system; and the 2D+depth information system. When there are other 3D systems that can be supported by display devices, the bit assignment to the PSRs is determined to be able to indicate whether or not the other 3D systems can be used.

FIG. 46 shows a bit assignment to the PSRs covering a plurality of 3D systems.

The PSR24 shown in FIG. 46 is composed of four bits (b3, b2, b1, and b0). Each of the bits, from the most significant bit b3 to the least significant bit b0, is associated with a corresponding 3D playback system. When the playback device supports the 3D playback system, the corresponding bit is set to "1", and when the playback device does not support, the bit is set to "0". When all the bits of PSR24 are "0", the playback device is a 2D playback device; and when one or more of the bits are "1", the playback device is a 2D/3D playback device that supports the corresponding 3D playback systems.

The bits constituting the PSR24, from the most significant bit b3 to the least significant bit b0, respectively indicate where or not the playback device supports, as the 3D display system, the two-screen stereo playback system, the side-by-side system, the horizontally double system, and the 2D+depth information system.

The two-screen stereo playback system is the 3D display system that has been described so far in the embodiments.

The side-by-side system is a system in which the resolution of 1920×1080 is divided into 960×1080 and 960×1080, and the left view and the right view are displayed with these resolutions, respectively.

The horizontally double system is a system in which the resolution of 1920×1080 is converted divided into 3840×1080, and each of the left view and the right view is displayed with the resolution of 1920×1080.

The 2D+depth information system is a system for realizing the stereoscopic view by a 2D image and a gray-scale image. The gray-scale image is composed of binarized pixels. The brightness of the binarized pixels indicates the depth of each pixel in the 2D image. The depths of the pixels constituting the 2D image are created based on the brightness of the binarized pixels, and then a stereoscopic image is built.

When a BD-J application on the BD-ROM is to access the values of the player setting register, it can also access these as a system property of the playback device.

When the display device is connected with the playback device by a transmission system such as HDMI in which the performance/supporting system of display device can be transmitted to the playback device, the values of the PSR24 are automatically set in correspondence with the performance of the playback device and the system supported by the display device. In this case, the values of the PSR24 vary depending on the display device connected to the playback device even if the playback device is the same.

When the display device cannot transmit the performance of the own device, it is preferable that the user set it manually.

When the playback device can obtain the supporting system of the display device, the playback device may obtain further information on the 3D playback such as the size of the display device, resolution, and a distance between the screen of the display device and the viewer, and store the obtained information in the PSR24. The information can be used when the program selects an optimum playback system.

There may be a case where how the 3D is supported cannot be represented by one bit. In that case, a plurality of bits should be used. For example, when it is recognized that up to the image size of 1920×1080 can be supported, but that a playback is not available for a higher resolution due to insufficient performance of the decoder or the like, two bits may be adopted so that, for example, "00b" represents a non-support; "01b" represents a support of up to 1920×1080; and "10b" represents a support of higher than 1920×1080. This makes it possible to indicate the supporting state in more detail by using the system parameter.

Figure 47:
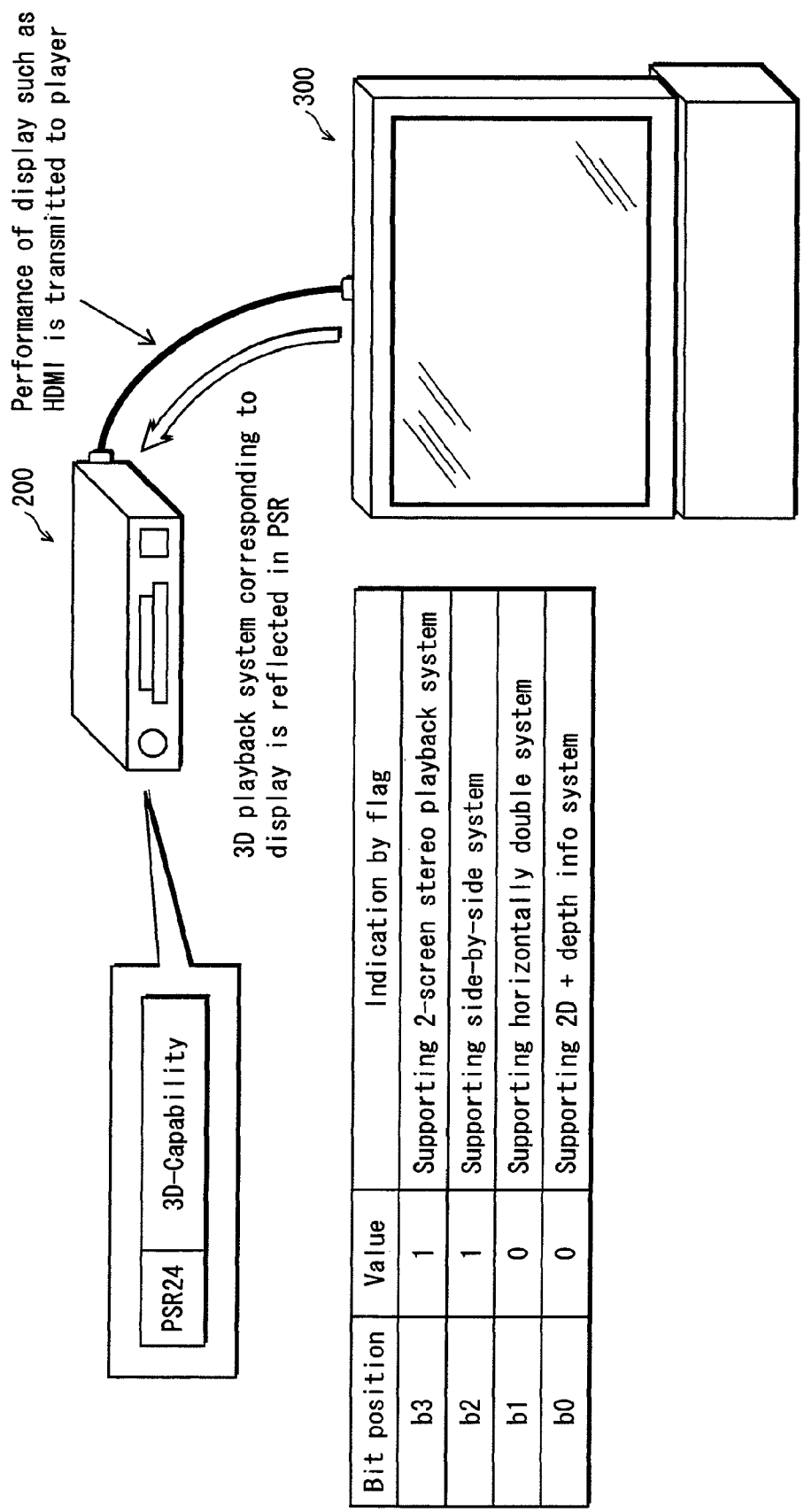
FIG. 47 shows how the 3D playback system supported by the display device is reflected on the setting register of the playback device.

It is possible, by defining a bit assignment to the PSRs covering a plurality of 3D systems, to use any display device to realize a stereoscopic playback, regardless of the 3D system that is supported by the display device connected with the playback device. FIG. 47 shows how the 3D playback system supported by the display device is reflected on the setting register of the playback device. With use of a system parameter representing "3D-Capability" that indicates the 3D playback capability that has been described earlier, it is possible to inhibit the 2D playback device from selecting a 3D video stream. When the user is to select a 3D video stream at the beginning of a program or a playitem, it can be judged whether or not the to-be-selected stream can be played back by the playback device, by referring to the player setting register to confirm the 3D system supported by the playback device, and obtaining the information of the to-be-selected stream from the stream selection table.

Since 2D playback devices cannot play back 3D images, this process prevents the selection itself, and can prevent an inappropriate image from being displayed on the screen.

When this arrangement is combined with the mechanism of automatically obtaining the 3D system supported by the display device that is described in the previous embodiment, the selection is limited to either a stream of the 3D system supported by the display device connected with the playback device, or a 2D stream. This also prevents an inappropriate image from being displayed on the screen.

The following describes the process of the program when the above-described process is realized.

The BD program file, which is executed after a title is selected by the user, checks whether the playback device supports the 3D image playback, and if so, whether the user has selected the 3D image playback, and according to the check results, switches to a playlist to be played back.

When a plurality of 3D playback systems should be supported, playlists corresponding to the to-be-supported 3D playback systems are prepared. And then, when the playback device supports a playlist stored in the BD-ROM, a 3D playlist corresponding to the supported playlist is selected, and when the playback device does not support a playlist stored in the BD-ROM, a 2D playlist is selected.

Next is a description of the structure of the FirstPlay title.

A playlist constituting the FirstPlay title, namely, a playlist that is played back when the disc is inserted into the device, should be a 2D image in any playback device without fail, for the sake of safety.

A program stored in the BD-ROM is created on the authoring side, and when the playback device supports a plurality of 3D formats, which among the 3D playback systems has a priority to be selected depends on the intention of the authoring side.

Here, the selection of a 3D playlist will be described.

For example, when "3D system 1" is the two-screen stereo playback system and "3D system 2" is the side-by-side system, and the playback device supports only the side-by-side system, the program selects a 3D playlist "00005.mpls" conforming to the side-by-side system that can be played back by the playback device, and plays back the selected 3D playlist.

The following describes the relationships between Index.bdmv and the program.

As shown in FIG. 47, the 3D playback system is reflected on the setting register of the playback device, and the program stored in the BD-ROM is run. This enables the person in charge of authoring to set a 3D system that is optimum for the playback device and the display device, to the setting register of the playback device. To realize such a selection of a 3D playback system, the index table and the BD program file are set as follows.

Figure 48:
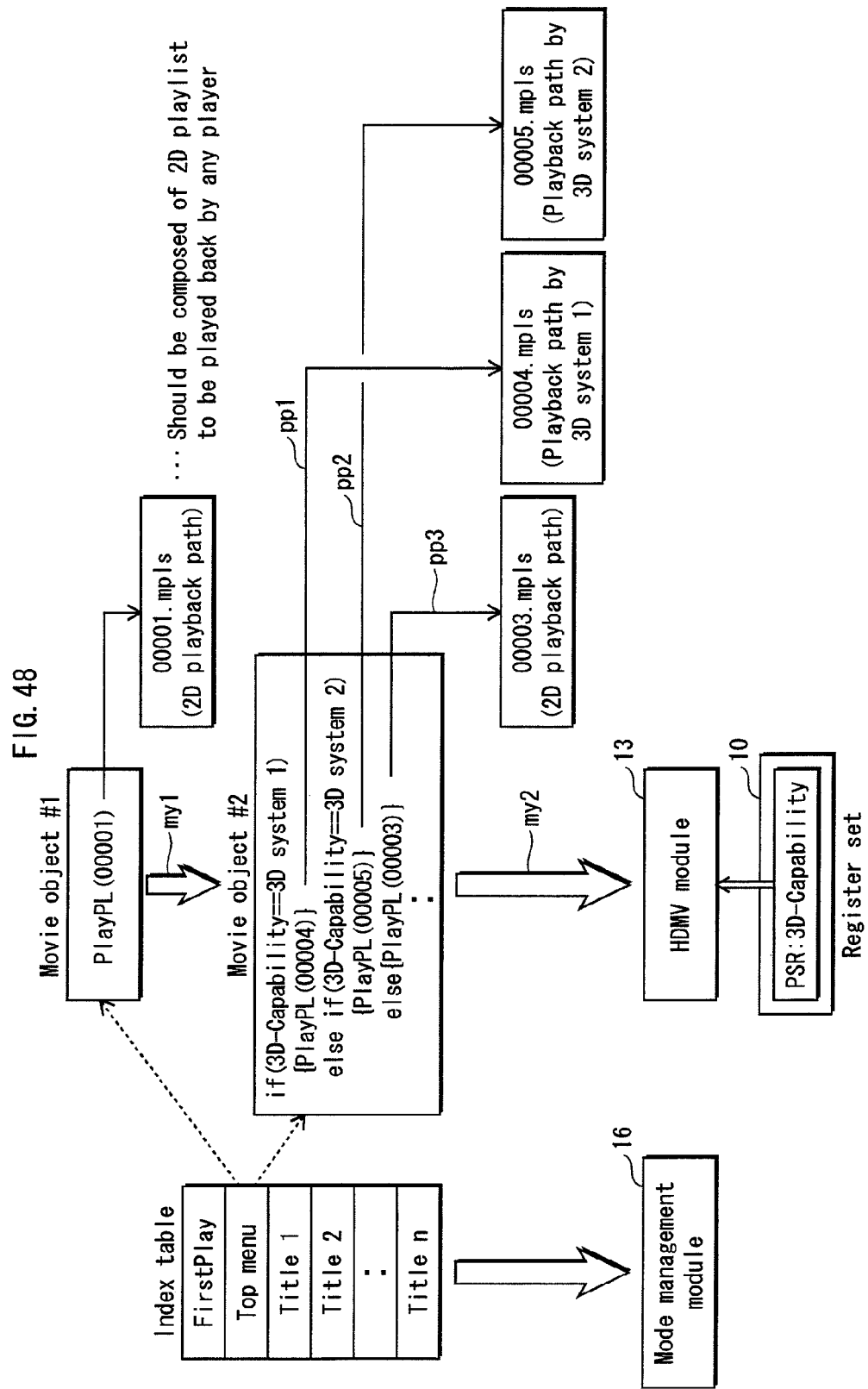
FIG. 48 shows the relationships between the index table and the movie object.

FIG. 48 shows the relationships between the index file (Index.bdmv) and the program file.

The left-hand side of FIG. 48 shows the index table and the mode management module 16 that decodes the index table. As described above, the index table includes entries that respectively correspond to the FirstPlay title, top menu, title 1, title 2, and title 3.

The right-hand side of FIG. 48 shows four playlist files that are selectively played back in accordance with the setting of the output mode in the playback device.

The four playlist files are: "00001.mpls", "00003.mpls" describing the 2D image playback paths; "00004.mpls" describing the playback path by the 3D system 1; and "00005.mpls" describing the playback path by the 3D system 2.

The middle part of FIG. 48 shows two movie objects: "movie object #1" and "movie object #2".

The movie object #1 instructs to play back "00001.mpls". The "00001.mpls" defines a 2D playlist. This is because the playlist to be played back by the FitstPlay title needs to be played back in any output mode.

The movie object #2 instructs to play back "00004.mpls" when the "3D-Capability" indicated in the PSR24 is the 3D system 1, and instructs to play back "00005.mpls" when the "3D-Capability" indicated in the PSR24 is the 3D system 2, and instructs to play back "00003.mpls" when the "3D-Capability" does not match any 3D system. The arrows pp1, pp2, and pp3 shown in FIG. 48 schematically show the playlist playback instructions issued by the movie objects.

The arrows my1 and my2 shown in FIG. 48 indicate that these movie objects are subjected to the decoding by the HDMV module 13. The figure shows that, when the HDMV module 13 executes these movie objects, the above-mentioned three playlist files are selectively subjected to the playback, depending on the "Capability" of the playback device.

Figure 49:
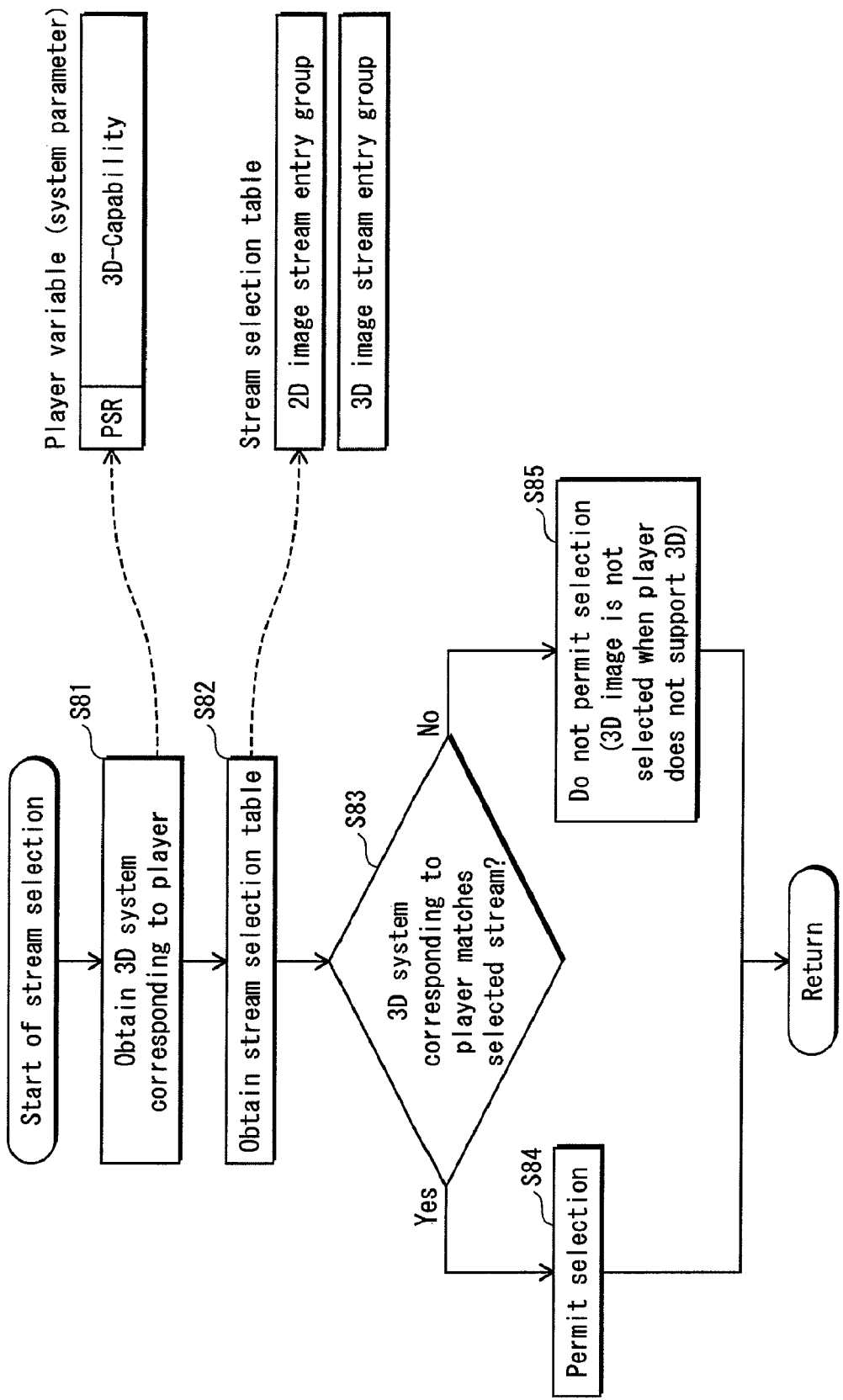
FIG. 49 is a flowchart of the stream selection procedure.

When PG streams that can be combined with the video stream are preliminarily defined in the stream combination information, the stream selection procedure conforms to the flowchart shown in FIG. 49.

FIG. 49 is a flowchart of the stream selection procedure. In step S81, the 3D system corresponding to the playback device is obtained. In step S82, the stream selection table is obtained. In step S83, it is judged whether or not the 3D system corresponding to the playback device matches the selected stream. When the judgment result in step S83 is "Yes", the selection is permitted in step S84. When the judgment result in step S83 is "No", the selection is not permitted in step S85.

Embodiment 6

Embodiment 6 describes a recording device for performing the recording method described in Embodiment 1.

When the recording method is to be realized by the real-time recording technology, the recording device for performing the recording method creates an AV clip in real time, and stores the AV clip into the BD-RE, BD-R, hard disk, or semiconductor memory card.

In this case, the AV clip may be a transport stream that is obtained as the recording device encodes an analog input signal in real time, or a transport stream that is obtained as the recording device partializes a digital input transport stream.

The recording device for performing the real-time recording includes: a video encoder for obtaining a video stream by encoding a video signal; an audio encoder for obtaining an audio stream by encoding an audio signal; a multiplexor for obtaining a digital stream in the MPEG2-TS format by multiplexing the video stream, audio stream and the like; and a source packetizer for converting TS packets constituting the digital stream in the MPEG2-TS format into source packets. The recording device stores an MPEG2 digital stream having been converted into the source packet format, into an AV clip file, and writes the AV clip file into the BD-RE, BD-R, or the like. When the digital stream is written, the control unit of the recording device performs a process of generating the clip information and the playlist information in the memory. More specifically, when the user requests a recording process, the control unit creates an AV clip file and an AV clip information file in the BD-RE or the BD-R.

After this, when the starting position of GOP in the video stream is detected from the transport stream which is input from outside the device, or when the GOP of the video stream is created by the encoder, the control unit of the recording device obtains (i) the PTS of the intra picture that is positioned at the start of the GOP and (ii) the packet number of the source packet that stores the starting portion of the GOP, and additionally writes the pair of the PTS and the packet number into the entry map of the clip information file, as a pair of EP_PTS entry and EP_SPN entry. After this, each time a GOP is generated, a pair of EP_PTS entry and EP_SPN entry is written additionally into the entry map of the clip information file. In so doing, when the starting portion of a GOP is an IDR picture, an "is_angle_change" flag having been set to "ON" is added to a pair of EP_PTS entry and EP_SPN entry. Also, when the starting portion of a GOP is not an IDR picture, an "is_angle_change" flag having been set to "OFF" is added to a pair of EP_PTS entry and EP_SPN entry.

Further, the attribute information of a stream in the clip information file is set in accordance with the attribute of the stream to be recorded. After the clip and the clip information are generated and written into the BD-RE or the BD-R, the playlist information defining the playback path via the entry map in the clip information is generated and written into the BD-RE or the BD-R. When this process is executed with the real-time recording technology, a hierarchical structure composed of the AV clip, clip information, and playlist information is obtained in the BD-RE or the BD-R.

This completes the description of the recording device for performing the recording method by the real-time recording. Next is a description of the recording device for performing the recording method by the pre-format recording.

The recording device described here is used by the authoring staff in a production studio for distributing movie contents. The use form of the recording device of the present invention is as follows: a digital stream representing a movie title is generated by compress-encoding in compliance with the MPEG standard, a scenario describing how the movie title should be played is generated, and a volume bit stream for BD-ROM including these data is generated.

Figure 50:
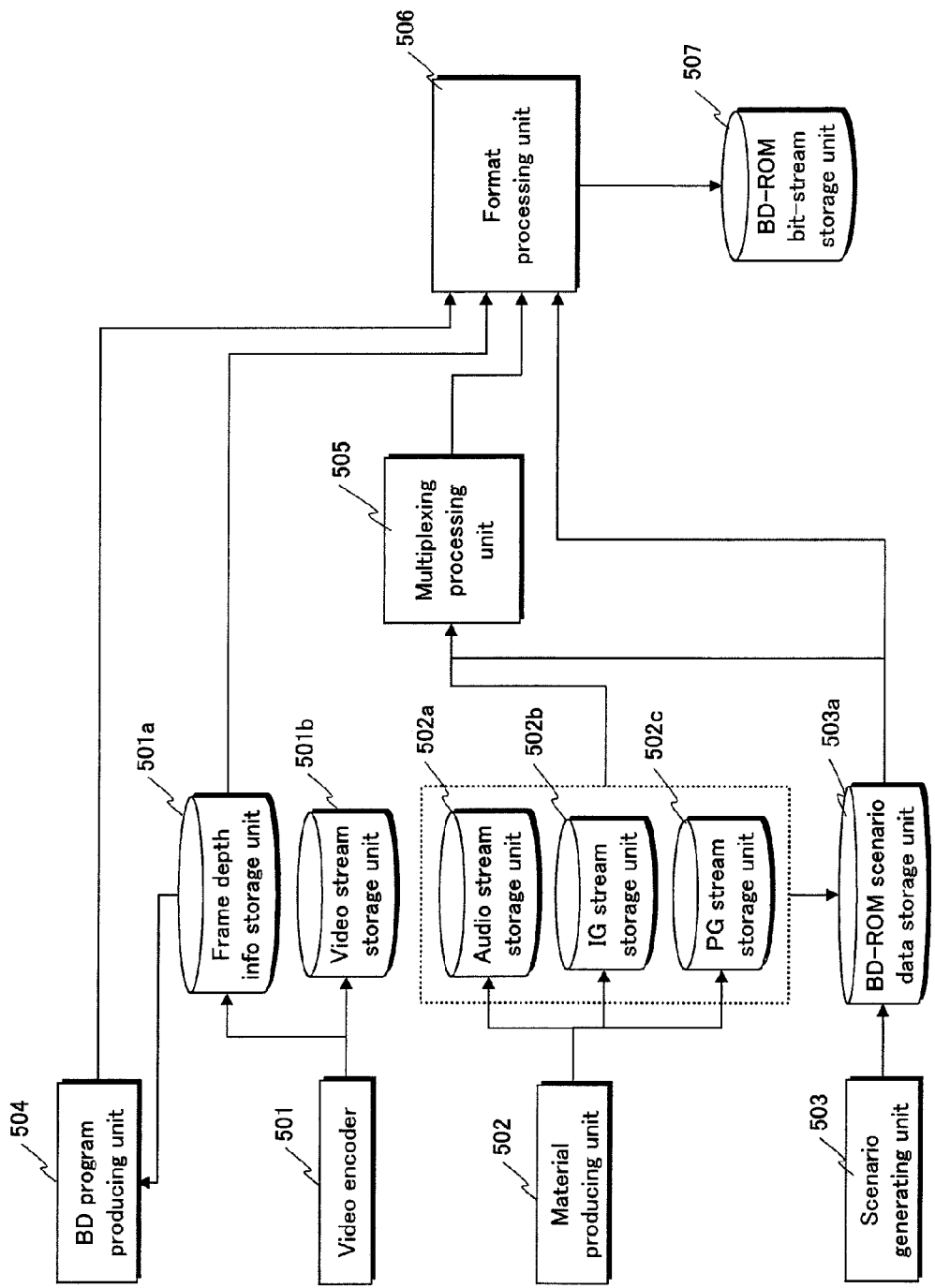
FIG. 50 shows the internal structure of the recording device.

FIG. 50 shows the internal structure of the recording device. As shown in FIG. 50, the recording device includes a video encoder 501, a material producing unit 502, a scenario generating unit 503, a BD program producing unit 504, a multiplexing processing unit 505, and a format processing unit 506.

The video encoder 501 generates left-view and right-view video streams by encoding left-view and right-view non-compressed bit map images in accordance with a compression method such as the MPEG4-AVC or the MPEG2. In so doing, the right-view video stream is generated by encoding frames that correspond to the left-view video stream, by the inter-picture prediction encoding method. In the process of the inter-picture prediction encoding, the depth information for 3D image is extracted from the motion vectors of the left-view and right-view images, and the depth information is stored into a frame depth information storage unit 501a. The video encoder 501 performs an image compression using the relative characteristics between pictures by extracting the motion vectors in units of macro blocks of 8×8 or 16×16.

In the process of extracting the motion vectors in units of macro blocks, a moving image whose foreground is a human being and background is a house is determined as a target of extracting the motion vector. In this case, an inter-picture prediction is performed between a left-eye image and a right-eye image. With this process, no motion vector is detected from the portion of the image corresponding to the "house", but a motion vector is detected from the portion of the image corresponding to the "human being".

The detected motion vector is extracted, and the depth information is generated in units of frames when the 3D image is displayed. The depth information is, for example, an image having the same resolution as the frame having the depth of eight bits.

The material producing unit 502 generates streams such as an audio stream, interactive graphics stream, and a presentation graphics stream, and writes the generated streams into an audio stream storage unit 502a, an interactive graphics stream storage unit 502b, and a presentation graphics stream storage unit 502c.

When generating an audio stream, the material producing unit 502 generates the audio stream by encoding a non-compressed LinearPCM audio by a compression method such as AC3. Other than this, the material producing unit 502 generates a presentation graphics stream in a format conforming to the BD-ROM standard, based on the subtitle information file that includes a subtitle image, a display timing, and subtitle effects such as fade-in and fade-out. Also, the material producing unit 502 generates an interactive graphics stream in a format for the menu screen conforming to the BD-ROM standard, based on the menu file that describes bit-map images, transition of the buttons arranged on the menu, and the display effects.

The scenario generating unit 503 generates a scenario in the BD-ROM format, in accordance with the information of each stream generated by the material producing unit 502 and the operation input by the authoring staff via the GUI. Here, the scenario means a file such as an index file, movie object file, or playlist file. Also, the scenario generating unit 503 generates a parameter file which describes which stream each AV clip for realizing the multiplexing process is constituted from. The file generated here such as an index file, movie object file, or playlist file has the data structure described in Embodiments 1 and 2.

The BD program producing unit 504 generates a source code for a BD program file and generates a BD program in accordance with a request from a user that is received via a user interface such as the GUI. In so doing, the program of the BD program file can use the depth information output from the video encoder 501 to set the depth of the GFX plane.

The multiplexing processing unit 505 generates an AV clip in the MPEG2-TS format by multiplexing a plurality of streams described in the BD-ROM scenario data, such as the left-view video stream, right-view video stream, video, audio, subtitle, and button. When generating this, the multiplexing processing unit 505 also generates the clip information file that makes a pair with the AV clip.

The multiplexing processing unit 505 generates the clip information file by associating, as a pair, (i) the entry map 20, generated by the multiplexing processing unit 505 itself and (ii) attribute information that indicates an audio attribute, image attribute and the like for each stream included in the AV clip. The clip information file has the structure that has been described in each embodiment so far.

The format processing unit 506 generates a disc image in the UDF format by arranging, in a format conforming to the BD-ROM standard, the BD-ROM scenario data generated by the scenario generating unit 503, the BD program file produced by the BD program producing unit 504, the AV clip and clip information file generated by the multiplexing processing unit 505, and directories and files in a format conforming to the BD-ROM standard, where the UDF format is a file system conforming to the BD-ROM standard.

In so doing, the format processing unit 506 generates the 3D metadata for the PG stream, ID stream, and secondary video stream by using the depth information output from the video encoder 501. Also, the format processing unit 506 sets by automation the arrangement of an image on the screen so as not to overlap with an object in the 3D image, and adjusts the offset value so that depths do not overlap each other. The file layout of the disc image generated in this way is set to have the data structure of the file layout described in Embodiments 1 and 2. The generated disc image is converted into the data for BD-ROM press, and the press process is performed onto the data. The BD-ROM is produced in this way.

(Embodiment as Recording Device for Realizing Managed Copy)

The recording device may have a function to write a digital stream by the managed copy.

The managed copy is a technology that, when a digital stream, playlist information, clip information, or application program is to be copied from a read-only recording medium such as the BD-ROM to another optical disc (BD-R, BD-RE, DVD-R, DVD-RW, DVD-RAM or the like), hard disk, removable medium (SD memory card, memory stick, Compact Flash™, smart medium, multi-media card or the like), has a communication with a server to perform an authentication, and permits the copy only if the authentication results in success. This technology makes it possible to perform controls, such as limiting the number of backups, and permitting the backup only with billing.

When a copy from the BD-ROM to the BD-R or BD-RE is to be performed, and the copy source and the copy destination have the same recording capacity, the managed copy only requires a sequential copy of the bit stream in the BD-ROM from the innermost circumference to the outermost circumference.

When the managed copy is the one that assumes a copy between different types of mediums, a transcode is necessary. Here, the "transcode" means a process for adapting the digital stream recorded in the BD-ROM to the application format of the copy-destination medium by converting the format of the digital stream from the MPEG2 transport stream format to the MPEG2 program stream format or the like, or re-encoding after decreasing the bit rates assigned to the video stream and the audio stream. In the transcode, it is necessary to obtain the AV clip, clip information, and playlist information by performing the above-described real-time recording process.

(Supplementary Notes)

Up to now, the present invention has been described through the best embodiments that the Applicant recognize as of now. However, further improvements or changes can be added regarding the following technical topics. Whether to select any of the embodiments or the improvements and changes to implement the invention is optional and may be determined by the subjectivity of the implementer.

(Stereoscopic Viewing Methods)

According to the parallax image method used in Embodiment 1, the left-eye and right-eye images are displayed alternately in the time axis direction. As a result, for example, when 24 images are displayed per second in a normal two dimensional movie, 48 images, for the combination of the left-eye and right-eye images, should be displayed per second in a three dimensional movie. Accordingly, this method is suitable for display devices that rewrite each screen at relatively high speeds. The stereoscopic viewing using the parallax images is used in the play equipment of the amusement parks, and has been established technologically. Therefore, it may be said that this method is closest to the practical use in the homes. There have been proposed various other technologies such as the two-color separation method, as the methods for realizing stereoscopic viewing using the parallax images. In the embodiments, the sequential segregation method and the polarization glasses method have been used as examples.

However, the present invention is not limited to these methods as far as the parallax images are used.

Also, not limited to the lenticular lens, the display device 300 may use other devices, such as the liquid crystal element, that have the same function as the lenticular lens. It is further possible to realize the stereoscopic viewing by providing a vertical polarization filter for the left-eyepixels, and providing a horizontal polarization filter for the right-eye pixels, and causing the viewer to view the screen through a pair of polarization glasses that is provided with a vertical polarization filter for the left eye and a horizontal polarization filter for the right eye.

(Data Structure of Index.bdmv for Storing 3D Images)

There is another method in which different types of index files, not playlists, are prepared respectively for the 2D playback devices and the 3D playback devices, and 2D playback devices refer to "Index.bdmv" when they start a playback, and 3D playback devices refer to "Index.3dmv" when they start a playback.

(Data Structure for Dealing with Plurality of Streams)

When there are a plurality of streams to be dealt with, the sub-path information may be used as described above, or multi_clip_entries for multi-angle may be used. When the "multi_clip_entries" is used, it is preferable to inhibit the use of the U0 for changing the angle after a stream is selected in correspondence with the size of the display device screen, so that the selected stream is changed to another stream that corresponds to another size of the display device screen.

(Target of Application of Left View and Right View)

The left view and right view may be prepared not only to be applied to the video stream representing the main story, but also to be applied to the thumbnail images. As is the case with the video stream, the 2D playback device displays conventional 2D thumbnail images, but the 3D playback device outputs a left-eye thumbnail image and a right-eye thumbnail image prepared for the 3D, in compliance with a 3D display system.

Similarly, the left view and right view may be applied to menu images, thumbnail images of each scene for chapter search, and reduced images of each scene.

(Structure of Recording Layer)

It is preferable that each recording layer of the BD-ROM is provided with a stereoscopic/planar view shared area, a stereoscopic view dedicated area, and a planar view dedicated area.

The stereoscopic/planar view shared area is an area that is accessed when a stereoscopic image is played back and when a planar image is played, back. The stereoscopic/planar view shared area is a continuous area in which (i) a plurality of Extents belonging to the base-view video stream file and (ii) a plurality of Extents belonging to the dependent-view stream video stream file, are alternately arranged and recorded.

The stereoscopic view dedicated area and the planar view dedicated area follow the stereoscopic/planar view shared area and exist immediately before the boundary of the recording layer.

The stereoscopic view dedicated area is accessed immediately before a long jump that occurs during a playback in the stereoscopic-view output mode. The stereoscopic view dedicated area is an area in which (i) Extents following the Extents belonging to the base-view video stream file recorded in the stereoscopic/planar view shared area and (ii) Extents following the Extents belonging to the dependent-view stream video stream file recorded in the stereoscopic/planar view shared area, are alternately arranged and recorded.

The planar view dedicated area is accessed immediately before a long jump that occurs during a playback in the 2D output mode. The planar view dedicated area is an area in which copies of Extents belonging to the base-view video stream file recorded in the stereoscopic view dedicated area are recorded.

(Producing Program of Each Embodiment)

The application program described in each embodiment of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded on a computer-readable recording medium, and may be provided to the user in this form.

(How to Describe Data Structure)

Among the above-described data structures, a repetitive structure that has a plurality of pieces of predetermined type of information can be defined by setting (i) an initial value for the control variable and (ii) a repeat condition, into the "for" statement. The "Do While" statement may be used as well.

Also, an arbitrary data structure in which predetermined information is defined when a predetermined condition is satisfied, can be defined by describing (i) the condition to be satisfied and (ii) a variable to be set when the condition is satisfied, into the "if" statement. The "switch" statement or the "case" statement may be used as well.

As described above, the data structure of each Embodiment can be described in compliance with the grammar of a high-level programming language. Therefore, the data structure of each Embodiment is subjected to the translation performed by the compiler which includes processes such as the syntax analysis, optimization, resource allocation, and code generation. In an object-oriented language, the data structure described in a high-level programming language is treated as a portion other than the method of the class structure, namely, as an array-type member variable in the class structure, and constitutes a part of the program. That is to say, the data structure of each Embodiment is converted into computer code, then recorded into a computer-readable recording medium, and becomes a member variable of the program. Since it can be treated in this way, the data structure described up to now is substantially a program.

(Playback of Optical Disc)

The BD-ROM drive is equipped with an optical head that includes a semiconductor laser, collimated lens, beam splitter, objective lens, collecting lens, and light detector. The light beams emitted from the semiconductor laser pass through the collimated lens, beam splitter, and objective lens, and are collected on the information surface of the optical disc.

The collected light beams are reflected/diffracted on the optical disc, pass through the objective lens, beam splitter, and collimated lens, and are collected in the light detector. A playback signal is generated depending on the amount of light collected in the light detector.

(Variations of Recording Medium)

The recording medium described in each Embodiment indicates a general package medium as a whole, including the optical disc and the semiconductor memory card. In each Embodiment, it is presumed, as one example, that the recording medium is an optical disc in which necessary data is preliminarily recorded (for example, an existing read-only optical disc such as the BD-ROM or DVD-ROM). However, the present invention is not limited to this. For example, the present invention may be implemented as follows: (i) obtain a 3D content that includes the data necessary for implementing the present invention and is distributed by a broadcast or via a network; (ii) record the 3D content into a writable optical disc (for example, an existing writable optical disc such as the BD-RE, DVD-RAM) by using a terminal device having the function of writing into an optical disc (the function may be embedded in a playback device, or the device may not necessarily be a playback device); and (iii) apply the optical disc recorded with the 3D content to the playback device of the present invention.

(Embodiments of Semiconductor Memory Card Recording Device and Playback Device)

The following describes embodiments of the recording device for recording the data structure of each Embodiment into a semiconductor memory, and the playback device for playing back thereof.

First, the mechanism for protecting the copyright of the data recorded on the BD-ROM will be explained, as a presupposed technology.

Some of the data recorded on the BD-ROM may have been encrypted as necessitated in view of the confidentiality of the data.

For example, the BD-ROM may contain, as encrypted data, the data corresponding to a video stream, an audio stream, or a stream including these.

The following describes decryption of the encrypted data among the data recorded on the BD-ROM.

The semiconductor memory card playback device preliminarily stores data (for example, a device key) that corresponds to a key that is necessary for decrypting the encrypted data recorded on the BD-ROM.

On the other hand, the BD-ROM is preliminarily recorded with (i) data (for example, a medium key block (MKB) corresponding to the above-mentioned device key) that corresponds to a key that is necessary for decrypting the encrypted data, and (ii) encrypted data (for example, an encrypted title key corresponding to the above-mentioned device key and MKB) that is generated by encrypting the key itself that is necessary for decrypting the encrypted data. Note here that the device key, MKB, and encrypted title key are treated as a set, and are further associated with an identifier (for example, a volume ID) written in an area (called BCA) of the BD-ROM that cannot be copied in general. It is structured such that encrypted data cannot be decrypted if these elements are combined incorrectly. Only if the combination is correct, a key (for example, a title key that is obtained by decrypting the encrypted title key by using the above-mentioned device key, MKB, and volume ID) that is necessary for decrypting the encrypted data can be derived. The encrypted data can be decrypted by using the derived key.

When a playback device attempts to play back a BD-ROM loaded in the device, it cannot play back the encrypted data unless the device itself has a device key that makes a pair (or corresponds to) the encrypted title key and MKB recorded on the BD-ROM. This is because the key (title key) that is necessary for decrypting the encrypted data has been encrypted, and is recorded on the BD-ROM as the encrypted title key, and the key that is necessary for decrypting the encrypted data cannot be derived if the combination of the MKB and the device key is not correct.

Conversely, when the combination of the encrypted title key, MKB, device key, and volume ID is correct, the video stream and audio stream are decoded by the decoder with use of the above-mentioned key (for example, a title key that is obtained by decrypting the encrypted title key by using the device key, MKB, and volume ID) that is necessary for decrypting the encrypted data. The playback device is structured in this way.

This completes the description of the mechanism for protecting the copyright of the data recorded on the BD-ROM. It should be noted here that this mechanism is not limited to the BD-ROM, but may be applicable to, for example, a readable/writable semiconductor memory (such as a portable semiconductor memory such as the SD card) for the implementation.

Next, the playback procedure in the semiconductor memory card playback device will be described. In the case in which the playback device plays back an optical disc, it is structured to read out data via an optical disc drive, for example. On the other hand, in the case in which the playback device plays back a semiconductor memory card, it is structured to read out data via an interface for reading out the data from the semiconductor memory card.

More specifically, the playback device may be structured such that, when a semiconductor memory card is inserted into a slot (not illustrated) provided in the playback device, the playback device and the semiconductor memory card are electrically connected with each other via the semiconductor memory card interface, and the playback device reads out data from the semiconductor memory card via the semiconductor memory card interface.

(Embodiments of Receiving Device)

The playback device explained in each Embodiment may be realized as a terminal device that receives data (distribution data) that corresponds to the data explained in each Embodiment from a distribution server for an electronic distribution service, and records the received data into a semiconductor memory card.

Such a terminal device may be realized by structuring the playback device explained in each Embodiment so as to perform such operations, or may be realized as a dedicated terminal device that is different from the playback device explained in each Embodiment and stores the distribution data into a semiconductor memory card. Here, a case where the playback device is used will be explained. Also, in this explanation, an SD card is used as the recording-destination semiconductor memory.

When the playback device is to record distribution data into an SD memory card inserted in a slot provided therein, the playback device first send requests a distribution server (not illustrated) that stores distribution data, to transmit the distribution data. In so doing, the playback device reads out identification information for uniquely identifying the inserted SD memory card (for example, identification information uniquely assigned to each SD memory card, more specifically, the serial number or the like of the SD memory card), from the SD memory card, and transmits the read-out identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in an encrypted state such that the necessary data can be decrypted by using a predetermined key (for example, a title key).

The distribution server, for example, holds a private key so that it can dynamically generate different pieces of public key information respectively in correspondence with identification numbers uniquely assigned to each semiconductor memory card.

Also, the distribution server is structured to be able to encrypt the key (title key) itself that is necessary for decrypting the encrypted data (that is to say, the distribution server is structured to be able to generate an encrypted title key).

The generated public key information includes, for example, information corresponding to the above-described MKB, volume ID, and encrypted title key. With this structure, when, for example, a combination of the identification number of the semiconductor memory card, the public key contained in the public key information which will be explained later, and the device key that is preliminarily recorded in the playback device, is correct, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information stores, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might be played back in an unauthorized manner. The information, for example, is used to uniquely identify the devices, parts of the devices, and functions (programs)) that might be played back in an unauthorized manner, and is composed of, for example, the device key and the identification number of the playback device that are preliminarily recorded in the playback device, and the identification number of the decoder provided in the playback device.

The following describes playing back the encrypted data among the distribution data recorded in the recording area of the semiconductor memory card.

First, it is checked whether or not the decryption key itself can be used, before the encrypted data is decrypted by using the decryption key.

More specifically, the following checks are conducted.

(1) A check on whether the identification information of the semiconductor memory card contained in the public key information matches the identification number of the semiconductor memory card preliminarily stored in the semiconductor memory card.
(2) A check on whether the hash value of the public key information calculated in the playback device matches the hash value included in the signature information.
(3) A check, based on the information included in the device list, on whether the playback device to perform the playback is authentic (for example, the device key shown in the device list included in the public key information matches the device key preliminarily stored in the playback device). These checks may be performed in any order.

After the above described checks (1) through (3), the playback device performs a control not to decrypt the encrypted data when any of the following conditions is satisfied: (i) the identification information of the semiconductor memory card contained in the public key information does not match the identification number of the semiconductor memory card preliminarily stored in the semiconductor memory card; (ii) the hash value of the public key information calculated in the playback device does not match the hash value included in the signature information; and (iii) the playback device to perform the playback is not authentic.

On the other hand, when all of the conditions: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key itself) when the playback device includes anything shown in the list. Therefore, even if the combination of the identification number of the semiconductor memory, the public key itself contained in the public key information, and the device key that is preliminarily recorded in the playback device, is correct, a control is performed not to decrypt the encrypted data. This makes it possible to prevent the distribution data from being used by an unauthentic device.

It is preferable that the identifier of the semiconductor memory card that is preliminarily recorded in the semiconductor memory card is stored in a highly secure recording area. This is because, when the identification number (for example, the serial number of the SD memory card) that is preliminarily recorded in the semiconductor memory card is tampered with, unauthorized copying becomes easy. More specifically, unique, although different identification numbers are respectively assigned to semiconductor memory cards, if the identification numbers are tampered with to be the same, the above-described judgment in (1) does not make sense, and as many semiconductor memory cards as tamperings may be copied in an unauthorized manner.

For this reason, it is preferable that information such as the identification number of the semiconductor memory card is stored in a highly secure recording area.

To realize this, the semiconductor memory card, for example, may have a structure in which a recording area for recording highly confidential data such as the identifier of the semiconductor memory card (hereinafter, the recording area is referred to as a second recording area) is provided separately from a recording area for recording regular data (hereinafter, the recording area is referred to as a first recording area), a control circuit for controlling accesses to the second recording area is provided, and the second recording area is accessible only through the control circuit.

For example, data may encrypted so that encrypted data is recorded in the second recording area, and the control circuit may be embedded with a circuit for decrypting the encrypted data. In this structure, when an access is made to the second recording area, the control circuit decrypts the encrypted data and returns decrypted data. As another example, the control circuit may hold information indicating the location where the data is stored in the second recording area, and when an access is made to the second recording area, the control circuit identifies the corresponding storage location of the data, and returns data that is read out from the identified storage location.

An application, which is running on the playback device and is to record data onto the semiconductor memory card with use of the electronic distribution, issues, to the control circuit via a memory card interface, an access request requesting to access the data (for example, the identification number of the semiconductor memory card) recorded in the second recording area. Upon receiving the request, the control circuit reads out the data from the second recording area and returns the data to the application running on the playback device. It sends the identification number of the semiconductor memory card and requests the distribution server to distribute the data such as the public key information and corresponding distribution data. The public key information and corresponding distribution data that are sent from the distribution server are recorded into the first recording area.

Also, it is preferable that the application, which is running on the playback device and is to record data onto the semiconductor memory card with use of the electronic distribution, preliminarily checks whether or not the application is tampered with before it issues, to the control circuit via a memory card interface, an access request requesting to access the data (for example, the identification number of the semiconductor memory card) recorded in the second recording area. For checking this, an existing digital certificate conforming to the X.509 standard, for example, may be used.

Also, the distribution data recorded in the first recording area of the semiconductor memory card may not necessarily be accessed via the control circuit provided in the semiconductor memory card.

(System LSI)

It is desirable that part of the components of the playback device that is mainly composed of logic devices, such as the system target decoder, playback control unit 7, and program executing unit, is realized as a system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback device 200.

Such a system LSI can be embedded into various types of devices that can play back images, such as a television, game machine, personal computer, one-segment mobile phone, as well as into the playback device 200. The system LSI thus greatly broadens the use of the present invention.

It is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as DART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback device 200 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

This embodiment is realized by middleware and hardware part corresponding to the system LSI, hardware part other than the part corresponding to the system LSI, interface part for the middleware, interface part for the middleware and system LSI, interface with the hardware part other than the part corresponding to the system LSI, and the user interface part, and when these are embedded in a playback device, these operate in cooperation with each other to provide unique functions.

By appropriately defining the interface part for the middleware, and the interface part for the middleware and system LSI, it is possible to develop, independently in parallel, the user interface part, middleware part, and system LSI part of the playback device. This makes it possible to develop the product more efficiently. Note that the interface can be segmented in various ways.

INDUSTRIAL APPLICABILITY

The information recording medium of the present invention stores a 3D image, but can be played back in both 2D-image playback devices and 3D-image playback devices. This makes it possible to distribute movie contents such as movie titles storing 3D images, without causing the consumers to be conscious about the compatibility. This activates the movie market and commercial device market. Accordingly, the recording medium and the playback device of the present invention have high usability in the movie industry and commercial device industry.

DESCRIPTION OF CHARACTERS

100 BD-ROM
200 playback device
300 television
400 3D glasses
500 remote control
1 BD drive
2*a*,2*b* read buffer 4 system target decoder
5a plane memory set
5b plane synthesizing unit
6 HDMI transmission/reception unit
7 playback control unit
9 management information memory
10 register set
11 program executing unit
12 program memory
13 HDMV module
14 BD-J platform
16 mode management module
17 user event processing unit
18 local storage
19 nonvolatile memory
23 PID filter
27 PID filter
31 primary video decoder
32 left-view video plane
33 right-view video plane
34 secondary video decoder
35 secondary video plane
36 PG decoder
37 PG plane
38 IG decoder
39 IG plane
40 primary audio decoder
41 secondary audio decoder
42 mixer Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device for playing back a video stream in accordance with playlist information, comprising:
a reading unit operable to read out a transport stream file from a recording medium, the transport stream file being identified by file reference information included in the playlist information;
a decoder operable to obtain non-compressed picture data by decoding compressed picture data that is included in a video stream stored in the read-out transport stream file;
a mode register storing an output mode of the playback device; and
an output unit operable to output the obtained non-compressed picture data in accordance with the output mode stored in the mode register, wherein
when the output mode is a planar-view output mode, the reading unit reads out a normal-format transport stream file that is identified by a combination of (i) the file reference information included in the playlist information and (ii) a file extension indicating that video streams are stored in a normal manner, and
when the output mode is a stereoscopic-view output mode, the reading unit reads out an interleaved transport stream file that is identified by a combination of (i) the file reference information included in the playlist information and (ii) a file extension indicating that video streams are stored in an interleaved manner.

2. The playback device of claim 1 further comprising:
a register indicating a user setting;
a capability register indicating whether or not a display device connected with the playback device supports a stereoscopic playback; and
a setting unit operable to judge whether or not a plurality of conditions are satisfied, and set the output mode to a stereoscopic output mode when it is judged that the plurality of conditions are satisfied, wherein
a first condition among the plurality of conditions is that the register indicating the user setting indicates that a user desires the stereoscopic playback,
a second condition among the plurality of conditions is that the capability register indicates that the display device connected with the playback device supports the stereoscopic playback, and
the output mode is set to the stereoscopic output mode when the first condition and the second condition are satisfied.

3. The playback device of claim 2, wherein
an operation mode of the playback device includes a first mode in which an operation subject is a command interpreter, and a second mode in which the operation subject is a byte code interpreter, and
when a switch between output modes occurs in the second mode, an event is notified to a byte code application that is executed by the byte code interpreter.

4. A system LSI embedded in a playback device together with a drive device that reads out a transport stream file that is identified by file reference information included in playlist information, the system LSI comprising:
a decoder operable to obtain non-compressed picture data by decoding compressed picture data that is included in a video stream stored in the transport stream file;
a mode register storing an output mode of the playback device; and
a control unit operable to control the playback device to output the obtained non-compressed picture data in accordance with the output mode stored in the mode register, wherein
when the output mode is a planar-view output mode, the control unit controls the drive device to read out a normal-format transport stream file that is identified by a combination of (i) the file reference information included in the playlist information and (ii) a file extension indicating that video streams are stored in a normal manner, and
when the output mode is a stereoscopic-view output mode, the control unit controls the drive device to read out an interleaved transport stream file that is identified by a combination of (i) the file reference information included in the playlist information and (ii) a file extension indicating that video streams are stored in an interleaved manner.

5. The system LSI of claim 4 further comprising:
a register indicating a user setting;
a capability register indicating whether or not a display device connected with the playback device supports a stereoscopic playback, wherein
the control unit judges whether or not a plurality of conditions are satisfied, and sets the output mode to a stereoscopic output mode when it is judged that the plurality of conditions are satisfied,
a first condition among the plurality of conditions is that the register indicating the user setting indicates that a user desires the stereoscopic playback,
a second condition among the plurality of conditions is that the capability register indicates that the display device supports the stereoscopic playback, and
the output mode is set to the stereoscopic output mode when the first condition and the second condition are satisfied.

6. A playback method for performing, on a computer, a process of playing back a video stream in accordance with playlist information, the playback method comprising the steps of:

reading out a transport stream file from a recording medium, the transport stream file being identified by file reference information included in the playlist information;

obtaining non-compressed picture data by decoding compressed picture data that is included in a video stream stored in the read-out transport stream file; and outputting the obtained non-compressed picture data in accordance with an output mode stored in a mode register of the computer, wherein when the output mode is a planar-view output mode, the reading step reads out a normal-format transport stream file that is identified by a combination of (i) the file reference information included in the playlist information and (ii) a file extension indicating that video streams are stored in a normal manner, and when the output mode is a stereoscopic-view output mode, the reading step reads out an interleaved transport stream file that is identified by a combination of (i) the file reference information included in the playlist information and (ii) a file extension indicating that video streams are stored in an interleaved manner.

7. The playback method of claim 6, wherein the computer includes:

a register indicating a user setting;

a capability register indicating whether or not a display device connected with the computer supports a stereoscopic playback, wherein the playback method further comprises the step of judging whether or not a plurality of conditions are satisfied, and setting the output mode to a stereoscopic output mode when it is judged that the plurality of conditions are satisfied, wherein a first condition among the plurality of conditions is that the register indicating the user setting indicates that a user desires the stereoscopic playback, a second condition among the plurality of conditions is that the capability register indicates that the display device supports the stereoscopic playback, and the output mode is set to the stereoscopic output mode when the first condition and the second condition are satisfied.

8. A recording method for recording, onto a recording medium, playlist information and an AV stream including a left-view stream and a right-view stream, the recording method comprising the steps of:

generating the left-view stream including a plurality of extents and the right-view stream including a plurality of extents;

generating a file entry for a transport file in an interleave format, and recording data in which the plurality of extents belonging to the left-view stream and the plurality of extents belonging to the right-view stream are interleaved;

recording the file entry for the transport file in the interleave format;

generating a file entry for a transport file in a normal format, and recording the file entry; and recording the playlist information, wherein the playlist information includes one or more pieces of playback section information, the one or more pieces of playback section information include file reference information that specifies a stream file corresponding to the AV stream, the transport stream file in the interleave format stores both the plurality of extents belonging to the left-view stream and the plurality of extents belonging to the right-view stream, the transport stream file in the interleave format being identified by a combination of (i) an identification number which is equivalent with the file reference information and (ii) a file extension indicating being interleaved, and the transport file in the normal format stores a plurality of extents, which are either the plurality of extents belonging to the left-view stream or the plurality of extents belonging to the right-view stream and belong to a base-view stream which can be played back independently, the transport file in the normal format being identified by a combination of (i) the identification number which is equivalent with the file reference information and (ii) a file extension indicating being the normal format.

9. A recording medium playback system comprising a recording medium and a playback device for playing back the recording medium, the recording medium having playlist information and stream files recorded thereon, wherein the playlist information includes one or more pieces of playback section information, the one or more pieces of playback section information include file reference information that specifies the stream files storing video streams, the stream files are an interleaved transport stream file and a normal-format transport stream file, in the interleaved transport stream file, a plurality of segments belonging to a left-view video stream and a plurality of segments belonging to a right-view video stream are arranged in an interleaved manner, the interleaved transport stream file being identified by a combination of an equivalent identification number and a file extension indicating that video streams are stored in the interleaved manner, the equivalent identification number being equivalent with the file reference information, and the normal-format transport stream file stores a base-view video stream, and is identified by a combination of the equivalent identification number and a file extension indicating that video streams are stored in a normal manner, the base-view video stream being either the left-view video stream or the right-view video stream that can be played back in a planar-view playback, the playback device including:

a reading unit operable to read out a transport stream file from a recording medium, the transport stream file being identified by file reference information included in the playlist information;

a decoder operable to obtain non-compressed picture data by decoding compressed picture data that is included in a video stream stored in the read-out transport stream file;

a mode register storing an output mode of the playback device; and an output unit operable to output the obtained non-compressed picture data in accordance with the output mode stored in the mode register, wherein when the output mode is a planar-view output mode, the reading unit reads out a normal-format transport stream file that is identified by a combination of (i) the file reference information included in the playlist information and (ii) a file extension indicating that video streams are stored in a normal manner, and when the output mode is a stereoscopic-view output mode, the reading unit reads out an interleaved transport stream file that is identified by a combination of (i) the file reference information included in the playlist information and (ii) a file extension indicating that video streams are stored in an interleaved manner.

* * * * *